United States Patent
Mohanram et al.

(10) Patent No.: US 12,489,794 B2
(45) Date of Patent: Dec. 2, 2025

(54) SECURITY POLICY ANALYSIS

(71) Applicant: Palo Alto Networks, Inc., Santa Clara, CA (US)

(72) Inventors: Kartik Mohanram, Pittsburgh, PA (US); Navneet Yadav, Saratoga, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 63 days.

(21) Appl. No.: 18/429,208

(22) Filed: Jan. 31, 2024

(65) Prior Publication Data

US 2024/0348664 A1 Oct. 17, 2024

Related U.S. Application Data

(60) Provisional application No. 63/459,492, filed on Apr. 14, 2023, provisional application No. 63/459,500, filed on Apr. 14, 2023, provisional application No. 63/459,494, filed on Apr. 14, 2023.

(51) Int. Cl.
*H04L 9/40* (2022.01)

(52) U.S. Cl.
CPC ............ *H04L 63/20* (2013.01); *H04L 63/02* (2013.01); *H04L 63/1416* (2013.01); *H04L 63/205* (2013.01)

(58) Field of Classification Search
CPC ..... H04L 63/20; H04L 63/02; H04L 63/1416; H04L 63/205; H04L 63/0263
See application file for complete search history.

(56) References Cited

U.S. PATENT DOCUMENTS

| | | | |
|---|---|---|---|
| 7,681,235 B2 * | 3/2010 | Chesla | G06F 21/552 726/22 |
| 9,104,572 B1 | 8/2015 | Thompson | |
| 10,505,816 B2 | 12/2019 | Mohanram | |
| 10,652,266 B1 | 5/2020 | Tautschnig | |
| 10,911,495 B2 | 2/2021 | Dixit | |
| 10,986,131 B1 * | 4/2021 | Kruse | H04L 63/10 |
| 11,044,273 B2 | 6/2021 | Dixit | |
| 11,171,939 B1 * | 11/2021 | Blank | H04L 63/18 |
| 11,218,508 B2 | 1/2022 | Dixit | |
| 11,415,425 B1 | 8/2022 | Merchant | |
| 11,888,603 B2 | 1/2024 | Dixit | |

(Continued)

FOREIGN PATENT DOCUMENTS

WO  WO-2024194671 A1 * 9/2024 ............. H04L 43/08

OTHER PUBLICATIONS

Author Unknown, Cisco Network Assurance Engine At-a-Glance, Mar. 5, 2021.

(Continued)

*Primary Examiner* — Darren B Schwartz
(74) *Attorney, Agent, or Firm* — Van Pelt, Yi & James LLP

(57) ABSTRACT

Security policy analysis is disclosed. Configuration information, including at least one policy, associated with a live production security appliance, is received. The received configuration information is used to instantiate the policy in a sandbox environment. The sandbox environment is used to evaluate a proposed change to the configuration information, including by building a model using the received configuration information.

23 Claims, 75 Drawing Sheets

(56) References Cited

U.S. PATENT DOCUMENTS

| | | | |
|---|---|---|---|
| 2002/0157021 A1* | 10/2002 | Sorkin | H04L 63/0227 726/4 |
| 2003/0149752 A1 | 8/2003 | Baldwin | |
| 2011/0138441 A1* | 6/2011 | Neystadt | G06F 9/5077 718/1 |
| 2014/0150050 A1 | 5/2014 | Lotem | |
| 2015/0195185 A1 | 7/2015 | Dasgupta | |
| 2015/0207717 A1 | 7/2015 | Djukic | |
| 2016/0191466 A1 | 6/2016 | Pernicha | |
| 2017/0126740 A1* | 5/2017 | Bejarano Ardila | H04L 63/1433 |
| 2017/0353459 A1 | 12/2017 | Lawrence | |
| 2018/0351819 A1 | 12/2018 | Mohanram | |
| 2019/0098025 A1* | 3/2019 | Lim | G06N 20/00 |
| 2019/0124114 A1* | 4/2019 | Purushothaman | H04L 63/1433 |
| 2019/0147068 A1 | 5/2019 | Tuggle | |
| 2019/0173736 A1 | 6/2019 | Ponnuswamy | |
| 2019/0327271 A1 | 10/2019 | Saxena | |
| 2020/0007582 A1 | 1/2020 | Dixit | |
| 2020/0007583 A1 | 1/2020 | Dixit | |
| 2020/0007584 A1 | 1/2020 | Dixit | |
| 2020/0389496 A1* | 12/2020 | Xuan | H04L 63/10 |
| 2021/0150305 A1 | 5/2021 | Amiri | |
| 2021/0152607 A1 | 5/2021 | Dixit | |
| 2021/0306352 A1 | 9/2021 | Narula | |
| 2022/0094596 A1* | 3/2022 | Jagannathan | H04L 41/0895 |
| 2022/0278889 A1 | 9/2022 | Malleshaiah | |
| 2022/0345493 A1 | 10/2022 | Wu | |
| 2023/0011452 A1 | 1/2023 | Barber | |
| 2024/0146774 A1 | 5/2024 | Dixit | |

OTHER PUBLICATIONS

Author Unknown, Cisco Network Assurance Engine Data Sheet, Mar. 3, 2021.

Author Unknown, Cisco Network Assurance Engine Fundamentals Guide, Release 5.0(1), Jul. 24, 2020.

Evang et al., Crosslayer Network Outage Classification Using Machine Learning, ANRW '22, Jul. 25-29, 2022, Philadelphia, PA, USA.

Heiler et al., Identifying the Root Cause of Cable Network Problems with Machine Learning, Mar. 15, 2022, pp. 1-11.

Lei Shi, On Monitoring and Fault Management of Next Generation Networks, Dissertation, 2010.

Sa'di Altamimi, Automating Network Operation Centers using Reinforcement Learning, School of Electrical Engineering and Computer Science University of Ottawa, Thesis submitted in partial fulfillment of the requirements for the PhD degree in Electrical & Computer Engineering, 2023.

Wang et al., Fast Outage Analysis of Large-scale Production Clouds with Service Correlation Mining, Feb. 26, 2021.

* cited by examiner

Application Access Analyzer
Interact and engage using Natural Language to troubleshoot and perform what-if analysis.

Powered by ADEM & AI/ML Analytics ⓘ

New Query

Query Name
Query_11 Dec. 2022 8:17:24 PM

Query
Type or click to create a new query

Submit Query

How to create a query

With the Application Access Analyzer, you can ask queries to help diagnose your networking IT problems.
Here are some of the queries we currently support.

1. User issues

Can mobile user <username> access application <application name> from prisma-access-location <PA location> using device <device name>

2. Site/Location issues

Can mobile users access application <application name> from prisma-access-location <PA location>

Can branch users access application <application name> from branch site <site name> using source-ip prefix <source-ip prefix>

3. Corp VPN Access Issues

Is mobile user <username> connected to corporate VPN using device <device name>

Application Access Analyzer > Query Results
Query Results: QUERY_19 Mar, 2023 1:28:29 PM
Can mobile user iqpatel@paloaltonetworks.com access application 2001:4860:4860::8888 from prism-access-location US West using device M-C02GC1UEMD6M

| Result | Checks | Checks Summary |
|---|---|---|
| No — User iqpatel@paloaltonetworks.com cannot access 2001:4860:4860::8888 at location US West with the device M-C02GC1UEMD6M. Powered by ADEM & AI/ML Analytics ⓘ | ⊘ Endpoint<br>⊘ Gateway<br>⊘ Location<br>⊘ DNS<br>⊘ Application | ⊘ Securit... Policy<br>⊗ Layer 3...warding<br>⊘ Portal<br>⊘ Authentication<br>↳ View Relevant Incidents |

FIG. 5B

| | Issue Type | Description | DataSources |
|---|---|---|---|
| 1 Infrastructure Issue | | | |
| 1.1 | RN, MU GW, SC | Primary/Secondary Node Down | Instance Status Logs |
| | | Primary/Secondary Tunnel Down | Tunnel Status Logs |
| | | Degraded Performance (Latency, Packet drops etc) | Traffic, Instance Metric logs and Infra ADEM Logs. |
| | | Network Reachability | Probe VM ADEM Logs, Routing, FIB data from Firewall |
| 1.2 | MU Portal | MU Portal Down | Instance State, Health and Metrics Logs |
| | | MU Portal Unreachable | Probe VM ADEM Logs, Instance State and Metric Logs |
| 2 Customer Network Service Issue | | | |
| 2.1 | DNS, Auth (Radius etc) Server Issue | Network Reachability | CDL Logs, Probe VM ADEM logs, Routing, FIB data from Firewall |
| | | Degraded performance | Probe VM ADEM logs |
| | | Security Policy Configuration | Traffic logs, Formal Method - Security Policy Analysis |
| | Identity SaaS Service Issues (Hosted AD, MFA etc) | Network Reachability | CDL Logs, Probe VM ADEM logs, Routing/FIB data from Firewall |
| | | Degraded performance | Probe VM ADEM logs |
| | | Security Policy Configuration | Traffic logs, Formal Method - Security Policy Analysis |
| 3 Client Connectivity Issues | | | |
| 3.1 | GP Client | Client Version Mismatch | ADEM Logs |
| | | Client Local Network Down | ADEM Logs |
| | | GP Client Tunnel Down | Tunnel Status Logs |
| | | Explicit Proxy Unreachable | ADEM logs |

FIG. 6B

```
Sources      = {HVAC,RSB,CCA,S1,S2,S3}
Destinations = {HVAC,RSB,CCA,D1}
Ports        = {443,p1,p2}
Actions      = {deny,allow}

P1: src = HVAC,      dst = {HVAC,D1},     port = *,   action = allow;
P2: src = RSB,       dst = {RSB,CCA,D1},  port = 443, action = allow;
P3: src = CCA,       dst = {RSB,CCA},     port = *,   action = allow;
P4: src = {S1,S2,D1},dst = *,             port = 443, action = allow;
P5: src = *,         dst = *,             port = *,   action = deny;
```

FIG. 8

```
typedef enum {deny, allow}                    action_type;
typedef enum {HVAC,RSB,CCA,S1,S2,S3}          src_type;
typedef enum {HVAC,RSB,CCA,D1}                dst_type;
typedef enum {443,p1,p2}                      port_type;

module policy(input clk, input src, input dst, input port, output action);

action_type wire action, p2, p3, p4;
src_type wire src; dst_type wire dst; port_type wire port;

assign action = (src == HVAC && (dst == HVAC || dst == D1))
    allow : p2;
assign   p2   = (src == RSB && (dst == RSB || dst == CCA || dst == D1) && port == 443)
    allow : p3;
assign   p3   = (src == CCA && (dst == RSB || dst == CCA))
    allow : p4;
assign   p4   = ((src == S1 || src == S2 || src == D1) && port == 443)
    allow : deny;
endmodule
```

FIG. 9A

```
assign action = (src == HVAC && (dst == HVAC || dst == D1))
    allow : p2;
assign   p2   = (src == RSB && (dst == RSB || dst == CCA || dst == D1) && port == 443)
    allow : p3;
assign   p3   = (src == CCA && (dst == RSB || dst == CCA))
    allow : p4;
assign   p4a  = (src == S1 && port == 443)
    allow : p5;
assign   p4b  = (src == S2 && port == 443)
    allow : p6;
assign   p4c  = (src == D1 && port == 443)
    allow : deny;
```

FIG. 9B

|    | Source | Destination | Port | Action |
|----|--------|-------------|------|--------|
| P1 | HVAC   | HVAC        | *    | allow  |
|    | HVAC   | D1          | *    | allow  |
| P2 | RSB    | RSB         | 443  | allow  |
|    | RSB    | CCA         | 443  | allow  |
|    | RSB    | D1          | 443  | allow  |
| P3 | CCA    | RSB         | *    | allow  |
|    |        | ...         |      | ...    |

FIG. 9C

|    | Source | Destination | Port | Action |
|----|--------|-------------|------|--------|
| P1 | 000    | 00          | *    | 1      |
|    | 000    | 11          | *    | 1      |
| P2 | 001    | 01          | 00   | 1      |
|    | 001    | 10          | 00   | 1      |
|    | 001    | 11          | 00   | 1      |
| P3 | 010    | 01          | *    | 1      |
|    |        | ...         |      | ...    |

FIG. 9D

| Security Issue | Business Disruption | Operations Complexity | Compliance Violation |
|---|---|---|---|
| Overly Permissive | Inadvertently Blocked | Policy Sprawl | Missing Enforcement |
| Policy 10:<br>group-mktg wiki allow<br><br>Policy 21:<br>Alice wiki deny<br>(Alice is in group- mktg)<br>(Alice is under investigation)<br>(Right policy, wrong order) | Policy 10:<br>Alice sfdc deny<br>(Alice has moved to group-mktg)<br>(Business disruption, future ticket)<br><br>Policy 21:<br>group-mktg sfdc allow | Policy 10:<br>Bob wiki allow<br>(Bob is in group-engg)<br>(Hit count won't catch redundancy)<br><br>Policy 21:<br>group-engg wiki allow<br>(Sprawl creates subtle future security issue) | Policy 10:<br>group-finance box.com allow no-inspection<br>(Missing DLP inspection to check too many sensitive data downloads) |
| Shadow Anomaly | Shadow Anomaly | Redundancy/<br>Generalization Anomaly | Validation Check |

FIG. 10

Firewall Solver

Solver Features:
- Shadow Analysis
- Contra-Shadow Analysis
- Query
- Change Management
- Reset Solver | Exit Solver Solver Log:
```
Added to uber_deny_policy
Policy 10 Policy_10
Added to uber_deny_policy
Policy 11 Policy_11
Added to uber_allow_policy
Policy 12 Policy_12
Added to uber_allow_policy
Policy 13 Policy_13
Added to uber_deny_policy
Policy 14 Policy_14
Added to uber_deny_policy
Policy 15 Policy_15
Added to uber_deny_policy
Policy 16 Policy_16
Added to uber_deny_policy
Policy 17 Policy_17
Added to uber_allow_policy
Policy 18 Policy_18
Added to uber_allow_policy
Policy 19 Policy_19
Added to uber_allow_policy
Policy 20 Policy_20
Added to uber_allow_policy
Policy 21 Policy_21
Added to uber_allow_policy
Policy 22 Policy_22
Added to uber_allow_policy
Policy 23 Policy_23
Added to uber_allow_policy
Policy 24 Policy_24
Added to uber_allow_policy
Policy 25 Policy_25
```

● ● ● 1:1 Shadowee-to-Shadower Policy Comparator

—1:1 Shadowee-to-Shadower Policy Comparator—

Intent Over-Specification

| | Policy_30 | Policy_28 |
|---|---|---|
| Source Zone | The Shadowee | The Shadower |
| Source Address | any | any |
| Source User | 10.140.10.150 | 10.140.10.150 |
| Source HIP Profile | any | any |
| Destination Zone | any | any |
| Destination Address | 10.139.96.219 | 10.139.96.219 |
| | 10.165.64.1 | 10.159.125.34 |
| | 10.165.84.1 | 10.161.243.5 |
| | 10.165.131.254 | 10.161.244.2 |
| | | 10.165.21.254 |
| | | 10.165.25.2 |
| | | 10.165.64.1 |
| | | 10.165.84.1 |
| | | 10.165.131.254 |
| | | 10.161.240.1 |
| | | 10.161.243.1 |
| Application | ssh | ssh |
| Service | application-default | application-default |
| URL Category | any | any |
| Action | Allow | Allow |

Added to uber_allow_policy Policy_26
Added to uber_allow_policy Policy_27
Added to uber_allow_policy Policy_28
Added to uber_allow_policy Policy_29
Added to uber_allow_policy Policy_30
Found shadowed Allow policy Policy_30:
shadow_analysis(0, 29)
shadow_analysis(15, 29)
shadow_analysis(23, 29)
shadow_analysis(27, 29)
shadow_analysis(27, 28)
shadow_analysis(27, 27)
Allow Policy_28 Policy_28 is partially responsible Pause Solver

FIG. 13 (Cont.)

1:1 Shadowee-to-Shadower Comparator

Intent Contradiction

| Source Zone | Policy_63<br>The Shadowee | Policy_61<br>The Shadower |
|---|---|---|
| | any | any |
| | | 10.1.8.57 |
| | | 10.16.237.171 |
| | | 10.20.247.213 |
| | | 10.20.248.207 |
| | | 10.22.15.94 |
| | | 10.22.34.34 |
| | | 10.31.101.98 |
| | | 10.31.101.185 |
| | | 10.31.101.190 |
| | | 10.43.8.246 |
| | | 10.44.72.5 |
| | | 10.45.23.206 |
| | | 10.48.234.31 |
| | | 10.53.37.129 |
| | | 10.53.181.55 |
| | | 10.54.240.20 |
| | | 10.61.206.51 |
| | | 10.61.206.52 |
| | | 10.64.252.94 |
| | | 10.80.64.29 |
| | | 10.80.113.203 |
| | | 10.80.176.20 |
| | | 10.81.205.29 |
| | | 10.135.0.52 |
| | | 10.138.134.100 |
| | | 10.138.134.133 |
| | | 10.138.240.4 |
| | | 10.139.64.37 |
| | | 10.139.66.128 |
| | | 10.139.74.164 |
| | | 10.140.10.150 |
| | | 10.140.10.152 |
| | | 10.140.10.154 |
| | | 10.152.16.17 |
| | | 10.153.16.90 |
| | | 10.161.128.107 |
| | | 10.175.144.164 |
| | | 10.176.19.11 |
| | | 10.176.56.59 |
| | | 10.178.8.80 |
| | | 10.181.64.108 |
| | | 10.181.64.109 |
| | | 10.181.76.85 |

FIG. 14

| Source Address | 10.138.134.100<br>10.139.66.98<br>10.139.66.99/32<br>10.139.66.128<br>10.139.66.129<br>10.185.92.48<br>10.185.92.49<br>10.185.92.50<br>10.185.92.56<br>10.185.92.57/32<br>10.185.92.58/32<br>10.185.92.59/32<br>10.240.92.69<br>10.240.92.255<br>10.240.194.216<br>10.240.216.34<br>10.138.134.112/28<br>10.138.134.128/27<br>10.195.64.192/27<br>10.197.119.16/28<br>10.245.15.128/27<br>10.185.92.69 | 10.185.74.164<br>10.185.75.164<br>10.185.92.48<br>10.185.92.49<br>10.185.92.50<br>10.185.92.56<br>10.185.92.57<br>10.185.92.58<br>10.185.92.59<br>10.186.114.240<br>10.186.114.241<br>10.195.64.116<br>10.195.64.196<br>10.195.64.197<br>10.195.64.198<br>10.195.167.10<br>10.195.167.48<br>10.196.93.228<br>10.196.128.60<br>10.197.119.20<br>10.197.119.21<br>10.240.74.89<br>10.240.74.164<br>10.240.75.164<br>10.240.80.67<br>10.240.92.255<br>10.240.194.216<br>10.245.15.84<br>10.245.15.132<br>10.245.15.134<br>10.245.153.54<br>10.245.153.84<br>10.245.155.14<br>10.245.220.4<br>192.168.50.145<br>10.138.134.100<br>10.139.66.98<br>10.139.66.99/32<br>10.139.66.128<br>10.139.66.129<br>10.185.92.48<br>10.185.92.49<br>10.185.92.50<br>10.185.92.56<br>10.185.92.57/32<br>10.185.92.58/32<br>10.185.92.59/32<br>10.240.92.69 |

FIG. 14 (Cont. 1)

| | | |
|---:|:---:|:---:|
| | 10.240.92.255 | |
| | 10.240.194.216 | |
| | 10.240.216.34 | |
| | 10.138.134.112/28 | |
| | 10.138.134.128/27 | |
| | 10.195.64.192/27 | |
| | 10.197.119.16/28 | |
| | 10.245.15.128/27 | |
| | 10.185.92.69 | |
| | 10.139.66.98 | |
| | 10.240.92.69 | |
| | 10.240.216.34 | |
| | 10.245.15.138 | |
| | 10.185.92.69 | |
| Source User | any | any |
| Source HIP Profile | any | any |
| Destination Zone | any | any |
| Destination Address | 10.0.0.0/8 | 10.0.0.0/8 |
| Application | ping<br>snmp-base<br>snmpv3<br>traceroute | any |
| Service | application-default | any |
| URL Category | any | any |
| Action | Allow | Deny |
Continue
FIG. 14 (Cont. 2)

| 1:1 Shadowee-to-Shadower Policy Comparator Intent Over-Specification | | |
|---|---|---|
| | Policy_64 The Shadowee | Policy_25 The Shadower |
| Source Zone | any ... | any |
| Destination Address | 10.139.70.118/32<br>10.139.70.124/32<br>10.16.137.100/32<br>10.16.137.101/32<br>10.16.137.102/32<br>10.16.137.116/32<br>10.16.137.117/32<br>10.16.137.118/32<br>10.185.20.209/32<br>10.185.20.210/32<br>10.185.20.211/32<br>10.185.20.212/32<br>10.185.20.213/32<br>10.185.20.214/32<br>10.185.20.215/32<br>10.185.20.216/32<br>10.185.20.217/32<br>10.185.20.218/32<br>10.185.70.102/32<br>10.240.191.11/32<br>10.240.198.149/32<br>10.240.198.98/32<br>10.240.20.161/32<br>10.240.20.162/32<br>10.240.20.163/32<br>10.240.20.164/32<br>10.240.20.165/32<br>10.240.20.166/32<br>10.240.20.167/32<br>10.240.20.168/32<br>10.240.20.169/32<br>10.240.20.170/32<br>10.240.20.171/32<br>10.248.20.172/32<br>10.240.20.173/32<br>10.240.20.174/32<br>10.240.20.175/32<br>10.240.20.176/32<br>10.240.20.177/32<br>10.240.20.178/32<br>10.240.20.179/32<br>10.240.20.180/32 | 10.0.0.0/8 |

|  | | |
|---|---|---|
| Application | ping<br>snmp-base<br>snmpv2 | dns<br>i cmp<br>ntp<br>ping<br>snmp-base<br>snmpv1<br>snmpv2<br>snmpv3<br>solarwinds-agent<br>solarwinds-base<br>ssl<br>web-browsing |
| Service | application-default | application-default |
| URL Category | any | any |
| Action | Allow | Allow |

Policy 4 Policy_4
Added to uber_allow_policy
Performing exhaustive query
Continuing query ...
Policy 5 Policy_5
Added to uber_allow_policy
Performing exhaustive query
Continuing query ...
Policy 6 Policy_6
Added to uber_allow_policy
Performing exhaustive query
Continuing query ...
Policy 7 Policy_7
Added to uber_allow_policy
Performing exhaustive query
Continuing query ...
Policy 8 Policy_8
Added to uber_allow_policy
Performing exhaustive query
Continuing query ...
Policy 9 Policy_9
Added to uber_deny_policy
Performing exhaustive query
Continuing query ...
Policy 10 Policy_10

FIG. 17 (Cont.)

```
┌─ 1:1 Policy-to-Query Comparator ─────────────────────────┐
│              Partial Query Contradiction                 │
│                       Policy_59              Query        │
│   Source Zone            any                  trust       │
│                        10.1.8.57                          │
│                       10.16.237.171                       │
│                       10.20.247.213                       │
│                       10.20.248.207                       │
│                       10.22.15.94                         │
│                       10.22.34.34                         │
│                       10.31.101.98                        │
│                       10.31.101.185                       │
│                       10.31.101.190                       │
│                       10.43.8.246                         │
│                       10.44.72.5                          │
│                       10.45.23.206                        │
│                       10.48.234.31                        │
│                       10.53.37.129                        │
│                       10.53.181.55                        │
│                       10.54.240.20                        │
│                       10.61.206.51                        │
│                       10.61.206.52                        │
│                       10.64.252.94                        │
│                       10.80.64.29                         │
│                       10.80.113.203                       │
│                       10.80.176.20                        │
│                       10.81.205.29                        │
│                       10.135.0.52                         │
│                      10.138.134.100                       │
│                      10.138.134.133                       │
│                       10.138.240.4                        │
│                       10.139.64.37                        │
│                       10.139.66.128                       │
│                       10.139.74.164                       │
│                       10.140.10.150                       │
│                       10.140.10.152                       │
│                       10.140.10.154                       │
│                       10.152.16.17                        │
│                       10.153.16.90                        │
│                       10.161.128.107                      │
│                       10.175.144.164                      │
│                       10.176.19.11                        │
│                       10.176.56.59                        │
│                       10.178.8.80                         │
└──────────────────────────┬───────────────────────────────┘
                           ∨                          FIG. 18
```

| Source Address | 10.181.64.108
10.181.64.109
10.181.76.85
10.185.74.164
10.185.75.164
10.185.92.48
10.185.92.49
10.185.92.50
10.185.92.56
10.185.92.57
10.185.92.58
10.185.92.59
10.186.114.240
10.186.114.241
10.195.64.116
10.195.64.196
10.195.64.197
10.195.64.198
10.195.167.10
10.195.167.48
10.196.93.228
10.196.128.60
10.197.119.20
10.197.119.21
10.240.74.89
10.240.74.164
10.240.75.164
10.240.80.67
10.240.92.255
10.240.194.216
10.245.15.84
10.245.15.132
10.245.15.134
10.245.153.54
10.245.153.84
10.245.155.14
10.245.220.4
192.168.50.145
10.138.134.100
10.139.66.98
10.139.66.99/32
10.139.66.128
10.139.66.129
10.185.92.48
10.185.92.49
10.185.92.50 | 10.0.0.0/8 |

FIG. 18 (Cont. 1)

| | | |
|---|---|---|
| | 10.185.92.56 | |
| | 10.185.92.57/32 | |
| | 10.185.92.58/32 | |
| | 10.185.92.59/32 | |
| | 10.240.92.69 | |
| | 10.240.92.255 | |
| | 10.240.194.216 | |
| | 10.240.216.34 | |
| | 10.138.134.112/28 | |
| | 10.138.134.128/27 | |
| | 10.195.64.192/27 | |
| | 10.197.119.16/28 | |
| | 10.245.15.128/27 | |
| | 10.185.92.69 | |
| | 10.139.66.98 | |
| | 10.240.92.69 | |
| | 10.240.216.34 | |
| | 10.245.15.138 | |
| | 10.185.92.69 | |
| Source User | any | any |
| Source HIP Profile | any | any |
| Destination Zone | 1802  any | untrust |
| Destination Address | !10.0.0.0/8<br>!172.16.0.0/12<br>!192.168.0.0/16 | 157.240.229.174 |
| Application | any | instagram |
| Service | any | application-default |
| URL Category | any | any |
| Action | Deny | Allow all |
| | Block & Continue | |

FIG. 18 (Cont. 2)

| 1:1 Policy-to-Query Comparator | | |
|---|---|---|
| | Partial Query Contradiction Policy_101 | Query |
| Source Zone | trust | trust |
| Source Address | any | 10.0.0.0/8 |
| Source User | user/group_19<br>user/group_20  ─1902<br>user/group_21<br>user/group_22 | any |
| Source HIP Profile | Profile_Windows_10_1607<br>Profile_Windows_10_1703 | any |
| Destination Zone | any | untrust |
| Destination Address | any | 157.240.229.174 |
| Application | any | instagram |
| Service | any | application-default |
| URL Category | any | any |
| Action | Deny | Allow all |
| | Block & Continue | |
| | Continuing query ...<br>******************* | |

FIG. 19

| 1:1 Policy-to-Query Comparator | | |
|---|---|---|
| Query Match | | |
| | Policy_248 | Query |
| Source Zone | trust | trust |
| Source Address | any | 10.0.0.0/8 |
| Source User | user/group_271<br>user/group_272<br>user/group_273<br>user/group_274<br>user/group_275<br>user/group_276<br>user/group_277<br>nram@paloaltonetworks.com | nram@paloaltonetworks.com |
| Source HIP Profile | any | any |
| Destination Zone | untrust | untrust |
| Destination Address | any | 157.240.229.174 |
| Application | instagram | instagram |
| Service | application-default | application-default |
| URL Category | any | any |
| Action | Allow | Allow all |

Finish

FIG. 21

| Alert/Incident Code and Display Name | Example Policy Rules | Industry Terminology |
|---|---|---|
| Forward ORDER - No Contradiction ||||

| Alert/Incident Code and Display Name | Example Policy Rules | Industry Terminology |
|---|---|---|
| Code: AL_REDUNDANT_ALLOW _SECURITY_RULE_ COVERED_BY_HIGHER _ORDER_ALLOW_RULE<br><br>Display Name: "Redundant Policy: Allow security rule is covered by a higher order allow security rule" | For MVP, Single Rule at 100 covered by Single Rule at 50<br><br>| Order | Src Subnet | App-id | Action |<br>\|---\|---\|---\|---\|<br>\| 50 \| 10.0.0.0/16 \| wiki \| Allow \|<br>\| 100 \| 10.0.0.0/24 \| wiki \| Allow \| | REDUNDANT |
| Code: AL_REDUNDANT _ALLOW_SECURITY_RULE _COVERED_BY_HIGHER _ORDER_ALLOW_RULE _WITH_SCHEDULE<br><br>Display Name: "Redundant Policy: Allow security rule is covered by a higher order allow security rule with schedule" | -----<br>Post MVP - Rule 100 covered by combination of two rules at 10 and 20<br><br>| Order | Src Subnet | App-id | Action |<br>\|---\|---\|---\|---\|<br>\| 10 \| 10.0.0.0/25 \| wiki \| Allow \|<br>\| 20 \| 10.0.0.128/25 \| wiki \| Allow \|<br>\| 100 \| 10.0.0.0/24 \| wiki \| Allow \| | |
| Code: AL_REDUNDANT_ BLOCK_SECURITY_RULE_ COVERED_BY_HIGHER _ORDER_BLOCK_RULE<br><br>Display Name: "Redundant Policy: Block security rule is covered by a higher order block security rule" | MVP<br><br>| Order | Src Subnet | App-id | Action |<br>\|---\|---\|---\|---\|<br>\| 50 \| 10.0.0.0/16 \| wiki \| Deny \|<br>\| 100 \| 10.0.0.0/24 \| wiki \| Deny \|<br><br>Post MVP: One Rule covered by many rules | |

FIG. 23A

| Code:<br>AL_REDUNDANT_BLOCK<br>_SECURITY_RULE<br>_COVERED_BY_HIGHER<br>_ORDER_BLOCK_RULE<br>_WITH_SCHEDULE<br><br>Display Name: "Redundant Policy: Block security rule is covered by a higher order block security rule with schedule" | | |
|---|---|---|
| Forward ORDER - Contradiction | | |
| Code: AL_SHADOWED<br>_ALLOW_SECURITY_RULE<br>_COVERED_BY_HIGHER<br>_ORDER_BLOCK_RULE<br><br>Display Name: "Shadowed Policy: Allow security rule is covered by a higher order block security rule" | MVP<br><br>| Order | Src Subnet | App-id | Action |<br>|---|---|---|---|<br>| 50 | 10.0.0.0/16 | wiki | Deny |<br>| 100 | 10.0.0.0/24 | wiki | Allow | | SHADOW |
| Code: AL_SHADOWED<br>_ALLOW_SECURITY_RULE<br>_COVERED_BY_HIGHER<br>_ORDER_BLOCK_RULE<br>_WITH_SCHEDULES<br><br>Display Name: "Shadowed Policy: Allow security rule is covered by a higher order block security rule with schedule" | ---<br>Post MVP: One Rule covered by many rules | |

FIG. 23A (Cont.)

| | | |
|---|---|---|
| Code: AL_SHADOWED_BLOCK_SECURITY_RULE_COVERED_BY_HIGHER_ORDER_ALLOW_RULE<br><br>Display Name: "Shadowed Policy: Block security rule is covered by a higher order allow security rule" | <table><tr><th>Order</th><th>Src Subnet</th><th>App-id</th><th>Action</th></tr><tr><td>50</td><td>10.0.0.0 /16</td><td>wiki</td><td>Allow</td></tr><tr><td>100</td><td>10.0.0.0 /24</td><td>wiki</td><td>Deny</td></tr></table><br>One Rule covered by many rules | |
| Code: AL_SHADOWED_BLOCK_SECURITY_RULE_COVERED_BY_HIGHER_ORDER_ALLOW_RULE_WITH_SCHEDULE<br><br>Display Name: "Shadowed Policy: Block security rule is covered by a higher order allow security rule with schedule" | | |
| | REVERSE ORDER - No Contradiction | |
| Code: AL_REDUNDANT_ALLOW_SECURITY_RULE_COVERED_BY_LOWER_ORDER_ALLOW_RULE<br><br>Display Name: "Redundant Policy: Allow security rule is covered by a lower order allow security rule" | <table><tr><th>Order</th><th>Src Subnet</th><th>App-id</th><th>Action</th></tr><tr><td>50</td><td>10.0.0.0 /24</td><td>wiki</td><td>Allow</td></tr><tr><td>100</td><td>10.0.0.0 /16</td><td>wiki</td><td>Allow</td></tr></table><br>One Rule covered by many rules | REDUNDANT |
| Code: AL_REDUNDANT_ALLOW_SECURITY_RULE_COVERED_BY_LOWER_ORDER_ALLOW_RULE_WITH_SCHEDULE<br><br>Display Name: "Redundant Policy: Allow security rule is covered by a lower order allow security rule" | | |
| Code: AL_REDUNDANT_BLOCK_SECURITY_RULE_COVERED_BY_LOWER_ORDER_BLOCK_RULE | | |

FIG. 23B

| | | |
|---|---|---|
| Display Name: "Redundant Policy: Block security rule is covered by a lower order block security rule" | | |
| Code: AL_REDUNDANT_ BLOCK_SECURITY_RULE _COVERED_BY_LOWER _ORDER_BLOCK_RULE _WITH_SCHEDULE<br><br>Display Name: "Redundant Policy: Block security rule is covered by a lower order block security rule" | <table><tr><th>Order</th><th>Src Subnet</th><th>App-id</th><th>Action</th></tr><tr><td>50</td><td>10.0.0.0 /24</td><td>wiki</td><td>Deny</td></tr><tr><td>100</td><td>10.0.0.0 /16</td><td>wiki</td><td>Deny</td></tr></table><br>One Rule covered by many rules | |
| REVERSE ORDER - Contradiction | | |
| Code: AL_GENERALIZED _ALLOW_SECURITY_RULE _COVERED_BY_LOWER _ORDER_BLOCK_RULE<br><br>Display Name: "Generalized Policy: Allow security rule is covered by a lower order block security rule" | | GENERALIZED |
| Code: AL_GENERALIZED _BLOCK_SECURITY_RULE _COVERED_BY_LOWER _ORDER_ALLOW_RULE<br><br>Display Name: "Generalized Policy: Block security rule is covered by a lower order allow security rule" | <table><tr><th>Order</th><th>Src Subnet</th><th>App-id</th><th>Action</th></tr><tr><td>50</td><td>10.0.0.0 /24</td><td>wiki</td><td>Allow</td></tr><tr><td>100</td><td>10.0.0.0 /16</td><td>wiki</td><td>Deny</td></tr></table><br>One Rule covered by many rules | |
| HER_ORDER_BLOCK _RULE_WITH_SCHEDULES<br><br>Display Name: "Shadowed Policy: Allow security rule is covered by a higher order block security rule with schedule" | ---<br>One Rule covered by many rules | |

FIG. 23B (Cont.)

| MATCH - Especially Relevant for User-Group mapping based anomalies | | | | | | PARTIAL |
|---|---|---|---|---|---|---|
| Code: AL_ALLOW_ RULE_PARTIALLY_ MATCHES_LOWER_ ORDER_BLOCK_RULE<br><br>Display Name: "Partial Match: Allow security rule partially matches lower order block security rule" | | Order | User-ID | App-ID | Action | PARTIAL MATCH |
| | | 50 | group-mktg<br><br>(only some users are in both group-engg and group-mktg) | wiki | Allow | |
| | | 100 | group-engg<br><br>(only some users are in both group-engg and group-mktg) | wiki | Deny | |
| Code: AL_BLOCK_ RULE_PARTIALLY _MATCHES_LOWER _ORDER_ALLOW _RULE<br><br>Display Name: "Partial Match: Block security rule partially matches lower order allow security rule" | | Order | User-ID | App-ID | Action | |
| | | 50 | group-mktg<br><br>(only some users are in both group-engg and group-mktg) | wiki | Deny | |
| | | 100 | group-engg<br><br>(only some users are in both group-engg and group-mktg) | wiki | Allow | |

FIG. 23C

New Policy Addition Workflow

| New Policy Addition Analysis | • Should I even add planned policy if my intent is already met? (Avoid Policy Sprawl)<br>• What is the right order at which to add my policy? (Ensure Intent will be met)<br>• What is the most optimized way of adding my policy? (Ensure least number of rules) |
|---|---|

Example IT Workflow for New Policy Addition

SHIFT LEFT a. Run "New Intent Satisfaction Analysis" for New Policy Additions
　　Specify New Policies to add (without order) in AIOps
　　Pull Existing Policy for Device Group into AIOps
　　Decide on exact policy changes based on analysis results (Seven sub-use cases)
b. Make required policy changes in sandbox (AIOps Sandbox - Policy Edit/Add/Delete/Move)
c. Run "New Policy Anomaly/BPA Analysis"
　　Iterate as needed.
　　Fix Errors in Sandbox each round till sufficient
d. Open Change Ticket, Get Change Approval

SHIFT RIGHT e. Production Push in Change Window to Config Tool (Panorama/Cloud Mgmt)
f. See Policy Anomalies post production push

FIG. 27A

Periodic Current Policy Cleanup - Optimization and Hardening

| Current Policy Optimization & Hardening | • Can I identify and remove redundancies in current policies? | (Maintain tight security posture) |
| --- | --- | --- |
| | • Can I identify and resolve contradictions in current policies? | (Maintain clean policy) |
| | • Can I do iterative analysis of my cleanup before rollout? | (Shift Left - Catch cleanup errors before rollout) |
| | • Can I find if other admins have pushed out changes with errors? | (Continuous production policy analysis) |

Example IT Workflow for Periodic Policy Cleanup

SHIFT LEFT
a. Pull Existing Policy for Device Group into AIOps
b. Run "Existing Policy Anomaly/BPA/Hit Count Analysis"
   Decide on exact policy changes based on analysis results
c. Make required policy changes in sandbox (AIOps Sandbox - Policy Edit/Add/Delete/Move)
d. Run "New Policy Anomaly/BPA Analysis"
   Iterate as needed.
   Fix Errors in sandbox each round till sufficient
e. Run "New Policy Application Query/Segmentation Analysis) (Policy Testing esp for crown jewel requirements)
   Iterate as needed.
   Fix Errors in sandbox each round till sufficient
f. May need to do rounds of analysis and testing and may even do combined d. and e. in single round
g. Open Change Ticket. Get Change Approval

SHIFT RIGHT
h. Production Push in Change Window to Config Tool (Panorama/Cloud Mgmt)
i. See Policy Anomalies post production push

FIG. 27B

Complex New Policy Changes for Application Rollout or other Business/Security Needs

| New Policy Optimization & Hardening | • Can I find and remove redundancies in planned policy changes? (Shift Left - Maintain tight security posture)<br>• Can I find and resolve contradictions in planned policy changes? (Shift Left - Maintain clean policy)<br>• Can I do iterative analysis of planned policy changes before rollout? (Shift Left - Catch cleanup errors before rollout) |
|---|---|

Example IT Workflow for Complex Policy Changes

SHIFT LEFT
a. Pull Existing Policy for Device Group into AIOps
b. Make required policy changes in sandbox (AIOps Sandbox - Policy Edit/Add/Delete/Move)
c. Run "New Policy Anomaly/BPA Analysis"
   Iterate as needed.
   Fix Errors in sandbox each round till sufficient
d. Run "New Policy Application Query/Segmentation Analysis) (Policy Testing for New Application + crown jewel)" Iterate as needed
   Fix Errors in sandbox each round till sufficient
e. May need to do rounds of compilation and testing and may even do combined d. and e. in single round
f. Open Change Ticket, Get Change Approval

SHIFT RIGHT
g. Production Push in Change Window to Config Tool (Panorama/Cloud Mgmt)
h. See Policy Anomalies post production push

FIG. 27C

Policy Incidents Resolution

Policy Incidents
- Post Production Rollout of Policy
  - Can I catch dynamic resolution (EDL, User-Group etc) resulting in policy redundancies/contradictions errors?
  - Can I catch human errors resulting in policy redundancies/contradictions?
  - When I work to fix these errors due to above can do an iterative analysis of my fixes before roll out?
  - Can I test my planned policy changes against crown jewel access/segmentation (Reduce business risk)

SHIFT LEFT
a. Pull Existing Policy for Device Group into AIOps
b. Make required policy changes in sandbox (AIOps Sandbox - Policy Edit/Add/Delete/Move) to resolve the incidents of interest
c. Provide the Incident IDs and run "Incident Resolution Analysis"
   Iterate as needed
   Fix errors in sandbox till incidents of interest are resolved.
d. Run "New Policy Anomaly/BPA Analysis"
   Iterate as needed.
   Fix Errors in sandbox each round till sufficient
e. Run "New Policy Application Query/Segmentation Analysis) (Policy Testing for New Application + crown jewel) Iterate as needed
   Fix Errors in sandbox each round till sufficient
f. May need to do rounds of analysis and testing and may even do combined c., d. and e. in single round
g. Open Change Ticket, Get Change Approval

SHIFT RIGHT
h. Production Push in Change Window to Config Tool (Panorama/Cloud Mgmt)
i. See Policy Anomalies post production push

FIG. 27D

| Rules | Source User | Action | Covered or Covering or Neither | Incident Anomaly Name | Existing Incident/ Anomaly Code | Potential Business Impact or Operational Impact Usually about the covered rule |
|---|---|---|---|---|---|---|
| R1 | group-engg | Allow | Covering | | | Security Issue or Sprawl |
| R2 | group-rajesh, group-manish \| group-rajesh \| group-rajesh, gjohn \| jghon, thirumal \| thirumal | Deny | Covered | Deny R2 covered by higher order Allow R1 | Yes | |
| R1 | group-engg, group-mktg | Deny | Covering | | | Business Disruption or Sprawl |
| R2 | group-rajesh, group-manish \| group-rajesh \| group-rajesh, gjohn \| jghon, thirumal \| thirumal | Allow | Covered | Allow R2 covered by higher order Deny R1 | Yes | |
| R1 | group-rajesh, group-manish \| group-rajesh, gjohn \| jghon, thirumal \| thirumal | Allow | Covered | Allow covered by lower order Deny | | Policy by Design - Pinhole allow. Or Sprawl. Or Security Issue |
| R2 | group-engg, group-mktg | Deny | Covering | | Yes | |
| R1 | group-rajesh, group-manish \| group-rajesh, gjohn \| jghon, thirumal \| thirumal | Deny | Covered | Deny covered by lower order Allow | | Policy by Design - Pinhole allow. Or Business Disruption. Or Security Issue |
| R2 | group-engg, group-mktg | Allow | Covering | | Yes | |
| R1 | group-engg, group-mktg | Allow | Covering | | | Sprawl. Or Security Issue. |
| R2 | group-rajesh, group-manish \| group-rajesh, gjohn \| jghon, thirumal \| thirumal | Allow | Covered | Allow covered by higher order Allow | Yes | |

FIG. 28

| | | | | | |
|---|---|---|---|---|---|
| R1 | group-engg, group-mktg | Deny | Covering | | Sprawl. Or Business Disruption |
| R2 | group-rajesh, group-manish \| group-rajesh, gjohn \| jghon, thirumal \| thirumal | Deny | Covered | Deny covered by higher order Deny | Yes |
| R1 | group-rajesh, group-manish \| group-rajesh, gjohn \| jghon, thirumal \| thirumal | Allow | Covered | | Sprawl. Or Security Issue |
| R2 | group-engg | Allow | Covering | Allow covered by lower order Allow | Yes |
| R1 | group-rajesh, group-manish \| group-rajesh, gjohn \|jghon, thirumal \| thirumal | Deny | Covered | Block Rule R1 is covered by lower order Block Rule R2 | Yes |
| R2 | group-engg | Deny | Covering | | Sprawl. Or Businss Disruption |
| R1 | group-mktg(thirumal in group-mktg)(only some users | Allow | Neither | Allow rule R1 partially matches lower order Block rule R2 | New Code | Potential Security Issue. Or IAM issue (thirumal should not be in both groups). Or Not a problem, policy by design. |
| R2 | group-engg(thirumal in group-engg)(only some users | Deny | Neither | | | |
| R1 | group-mktg(thirumal in group-mktg)(only some users | Deny | Neither | Block rule R1 partially matches lower order Allow | New Code | Potential Security Issue. Or IAM issue (thirumal should not be in both groups). Or Not a problem, policy by design. |
| R2 | group-engg(thirumal in group-engg)(only some users | Allow | Neither | | | |

FIG. 28 (Cont.)

Security Policy Analysis > Analysis-XYZ

Timezone PST (+08:00 GMT) ⌄ | Auto-Refresh every 1 minute ⌄
| Last Update 8:43:26pm ↻

Analysis Report: Analysis-XYZ
Define the parameters of your new policy below. The Analysis Report will determine if existing policies already met the specified intent.

[ Export to PDF ]

Intent Satisfaction Results    Security Policy Anomaly/BPA/Hit Count Results    Policy Validation Results

Analysis Info ⌄

| | | | |
|---|---|---|---|
| Name | Analysis-XYZ | Existing Security Policy snapshot time | Sep 29, 2021, 10:00am PST |
| Description | Check for intent satisfaction on new security rule additions lorem ipsum lorem ipsum | Analysis Start Time | Sep 29, 2021, 12:59pm PST |
| | | Completion Time | Sep 29, 2021, 2:00pm PST |
| Submitting Operator | Peter Gibbons | Analysis Runtime | 1 hour 1 minute |

Security Policy Incident Resolution

ANALYSIS SUMMARY

| INCIDENT RESOLUTION ANALYSIS BREAKDOWN | INCIDENTS ANALYZED (2) | | |
|---|---|---|---|
| | Incident Subcategory | Incident ↓ | Resolution Status |
| 73 Incidents Analyzed | Security Policy | Security-Rule-A shadowed by other security rules at higher priority | ● Will Be Resolved |
| ● 23 Will Be Resolved | Security Policy | Security-Rule-B shadowed by other security rules at higher priority | ⊗ Will Not Be Resolved |
| ⊗ 50 Will Not Be Resolved | Security Policy | Security-Rule-C shadowed by other security rules at higher priority | ● Will Be Resolved |
| (73) | Security Policy | Security-Rule-D shadowed by other security rules at higher priority | ⊗ Will Not Be Resolved |

FIG. 31A

2. Security-Rule-B shadowed by other security rules at higher priority

INCIDENT INFORMATION

| Incident Subcategory | Incident | Incident ID | Incident State |
|---|---|---|---|
| Security Policy | Security-Rule-B shadowed by other security rules at higher priority | INC-09817398 | Raised |

INCIDENT RESOLUTION RESULTS

⊗ Will Not Be Resolved  Your proposed changes will not resolve this incident.

| # | Type | Security Rule ↓↑ | Source User ↓↑ | Source Zone | Source URL | Source Device | Destination Zone | Application Group | Actio |
|---|---|---|---|---|---|---|---|---|---|
| 4 | Shadowee | Security-Rule-B | Tom | Zone 1 | URL ABC | windows-10... | Tom | wiki | allow |
| 2 | Shadower | Existing-Policy-B | group-Barbara | Zone 1 | URL ABC | mac-laptop1... | group-engg | slack | allow |
| 1 | Shadower | Shadowee-Security-Rule-A | group-engg | Zone 1 | URL ABC | windows-10... | Tom | wiki | allow |

SUGGESTED NEXT STEPS ⌄

3. Security-Rule-C contradicted by other security rules at a higher priority

INCIDENT INFORMATION

| Incident Subcategory | Incident | Incident ID | Incident State |
|---|---|---|---|
| Security Policy | Security-Rule-B shadowed by other security rules at higher priority | INC-09817398 | Raised |

INCIDENT RESOLUTION RESULTS

● Will Be Resolved  Good news! Your proposed changes will resolve this incident.

| Type | Security Rule ↓↑ | Source User ↓↑ | Source Zone | Source URL | Source Device | Destination Zone | Application Group | Actio |
|---|---|---|---|---|---|---|---|---|
| Not Contradicted | Security-Rule-C | Tom | Zone 1 | URL ABC | windows-10... | Tom | wiki | allow |

FIG. 31B

SUGGESTED NEXT STEPS ˅

4. Security-Rule-D contradicted by other security rules at a higher priority

INCIDENT INFORMATION

| Incident Subcategory | Incident | Incident ID | Incident State |
|---|---|---|---|
| Security Policy | Security-Rule-D shadowed by other security rules at higher priority | INC-09817398 | Raised |

INCIDENT RESOLUTION RESULTS

⊗ Will Not Be Resolved  Your proposed changes will not resolve this incident.

| # | Type | Security Rule ⇅ | Source User ⇅ | Source Zone | Source URL | Source Device | Destination Zone | Application Group | Action |
|---|---|---|---|---|---|---|---|---|---|
| 4 | Contradicted | Security-Rule-B | Tom | Zone 1 | URL ABC | windows-10... | Tom | wiki | allow |
| 2 | Contradictor | Existing-Policy-B | Marie | Zone 1 | URL ABC | mac-laptop1... | group-engg | slack | deny |
| 1 | Contradictor | Shadowee-Security-Rule-A | Tom | Zone 1 | URL ABC | windows-10... | Tom | wiki | deny |

SUGGESTED NEXT STEPS ˅

FIG. 31B (Cont.)

1.1 New-Policy-A  ⌄  ● Intent Fully Met by existing policy with exceptions 1.2 New-Policy-B  ⌄  ● Intent Fully Met with contradictions 1.3 New-Policy-C  ⌄  △ Intent Partially Met by existing policy with exceptions 1.4 New-Policy-D  ⌄  △ Intent Partially Met by existing policy 1.5 New-Policy-E  ⌄  ⊗ Intent Not Met by existing policy with partial contradictions 1.6 New-Policy-F  ⌄  ⊗ Intent Not Met by existing policy with full contradictions 1.7 New-Policy-G  ⌄  ⊗ Intent Not Met by existing policy due to Default Deny Displaying 7 of 7 results      Rows [10 ⌄]   Page [1 ⌄] of 801 [<][>]

FIG. 32 (Cont.)

1.2 New-Policy-A

SPECIFIED NEW SECURITY RULE

◎ Intent Fully Met by existing policy with exceptions

| Rule Name | Source | | | | Destination | | | | Service | Action |
|---|---|---|---|---|---|---|---|---|---|---|
| | Policy Layer | Zone | Address | User | Zone | Address | URL Category | Application | | |
| New-Policy-B | Prisma Access Pre-Rule | any | any | Tom, Marie | any | any | any | wiki | any | ⊘ allow |

INTENT SATISFACTION RESULTS

◎ Intent Fully Met by existing policy with exceptions

Good news! An existing policy or set of policies already meet your new security rule intent. See results below.

| Order | Rule Name | Satisfaction Status | Policy Layer | Source | | | | Destination | | | | Service | Action |
|---|---|---|---|---|---|---|---|---|---|---|---|---|---|
| | | | | Zone | Address | User | Zone | Address | URL Category | Application | | | |
| 10 | Existing-Policy-A | ✗ Contradicts New Security Rule Intent | Prisma Access Pre-Rule | any | any | Tom | any | any | any | wiki | any | ⊘ deny |
| 11 | Existing-Policy-B | ✓ Meets new security rule intent | Remote Workforce | any | any | group-barbara | any | any | any | wiki | any | ⊘ allow |
| 11 | Existing-Policy-B | ✓ Meets new security rule intent | Prisma Access Post-Rule | any | any | group-satish | any | any | any | wiki | any | ⊘ allow |

SUGGESTED NEXT STEPS ⌄

- Option 1) You can remove the contradicting rules to satisfy your intent.
  Note: Removal of rules should be carefully evaluated for overall security posture impact.
- Option 2) You can add your new rule intent at higher order than the contradicting rules
  Note: Adding new rules can result in policy sprawl.

FIG. 33

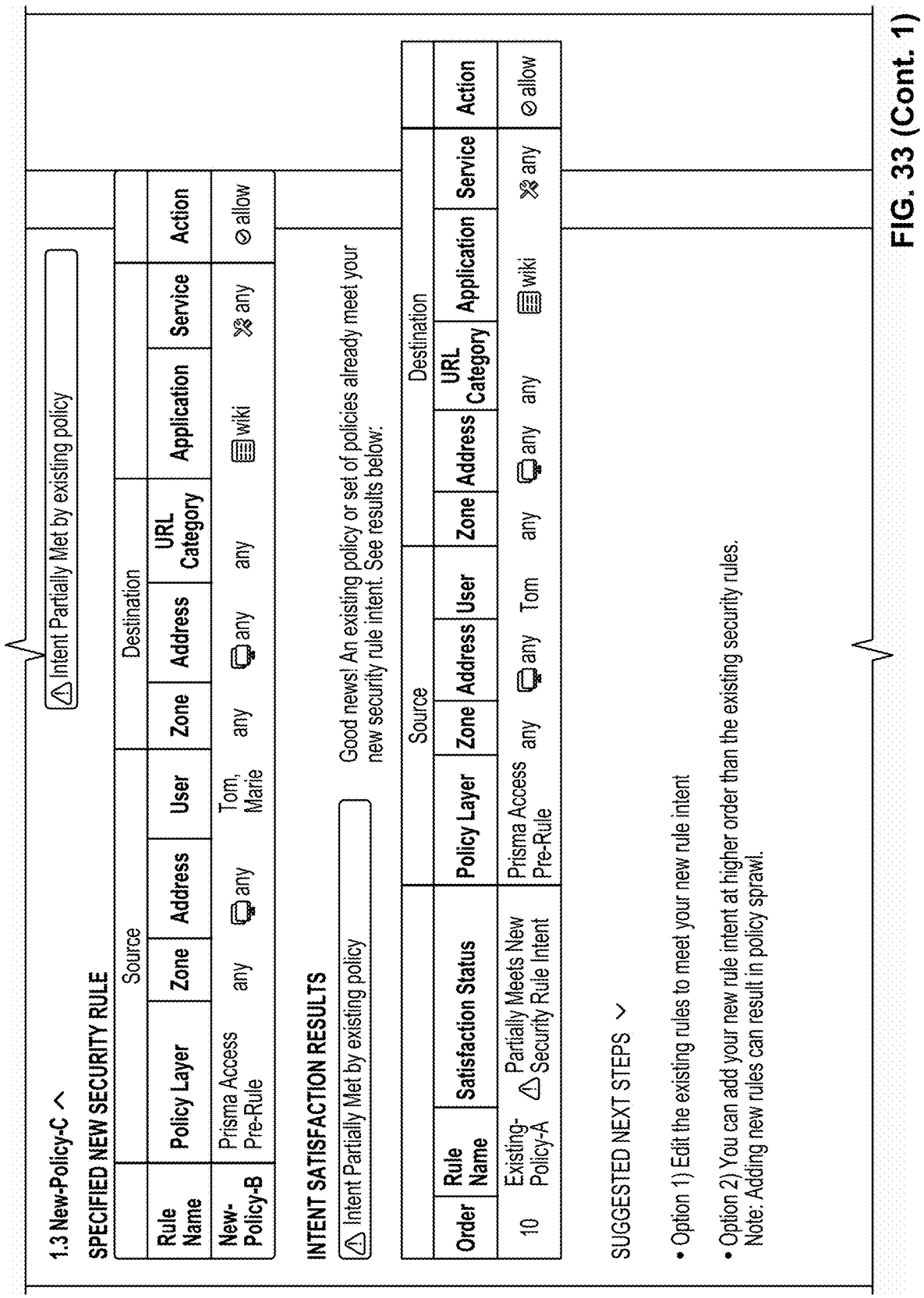
FIG. 33 (Cont. 1)

1.4 New-Policy-D

SPECIFIED NEW SECURITY RULE

⚠ Intent Partially Met by existing policy with exceptions

| Rule Name | Source | | | | Destination | | | | |
|---|---|---|---|---|---|---|---|---|---|
| | Policy Layer | Zone | Address | User | Zone | Address | URL Category | Application | Service | Action |
| New-Policy-B | Prisma Access Pre-Rule | any | 🖥 any | Tom, Marie | any | 🖥 any | any | 📄 wiki | ✻ any | ⊘ allow |

INTENT SATISFACTION RESULTS

⚠ Intent Partially Met by existing policy with exceptions

Good news! An existing policy or set of policies already meet your new security rule intent. See results below:

| Order | Rule Name | Satisfaction Status | Policy Layer | Source | | | | Destination | | | | |
|---|---|---|---|---|---|---|---|---|---|---|---|---|
| | | | | Zone | Address | User | Zone | Address | URL Category | Application | Service | Action |
| 10 | Existing-Policy-A | ⚠ Partially Meets New Security Rule Intent | Prisma Access Pre-Rule | any | 🖥 any | group-barbara | any | 🖥 any | any | 📄 wiki | ✻ any | ⊘ deny |
| 20 | Existing-Policy-B | ⚠ Partially Meets New Security Rule Intent | Prisma Access Post-Rule | any | 🖥 any | group-satish | any | 🖥 any | any | 📄 wiki | ✻ any | ⊘ allow |

SUGGESTED NEXT STEPS ⌄

- Option 1) You can remove the contradicting rules and edit the rules partially meeting your intent to fully meet your new rule intent.
  Note: Removal of rules should be carefully evaluated for overall security posture impact.
- Option 2) You can change the action of the contradicting rules to that of your new intent rule and further edit that and other rules partially meeting your intent to full meet your new rule intent
  Note: Change of action on existing rules should be carefully evaluated for overall security posture impact.
- Option 3) You can add your new rule intent at higher order than the existing security rules.
  Note: Adding new rules can result in policy sprawl.

FIG. 33 (Cont. 2)

Analysis completed successfully (selected)

| Status ↓↑ | Security Policy ↓↑ | Anomaly Breakdown | Anomalies ↓ |
|---|---|---|---|
| Search | | | 🔍 |
| ✓ | Remote Networks | ▬▬▬▬▬ | 55 |
| ✓ | Explicit Proxy | ▬▬▬ | 35 |
| ⋯ | Remote Workforce (GlobalProtect) | | - |

Anomaly Breakdown/Hit Count: REMOTE NETWORKS
✓ Analysis complete: View Analysis Information (55)

- 55 Security Policy Anomalies/Incidents Found
- ⊗ 25 Shadowed Rules
- ⊗ 10 Redundant Rules
- ⚠ 20 Generalized Rule

5
RULES WITH ZERO HIT COUNT IN PAST 30 DAYS

---

Analysis for a policy is in-progress (selected)

| Status ↓↑ | Security Policy ↓↑ | Anomaly Breakdown | Anomalies ↓ |
|---|---|---|---|
| Search | | | 🔍 |
| ✓ | Remote Networks | ▬▬▬▬▬ | 55 |
| ✓ | Explicit Proxy | ▬▬▬ | 35 |
| ⋯ | Remote Workforce (GlobalProtect) | | - |

Anomaly Breakdown/Hit Count: REMOTE NETWORKS
⟳ Analysis in progress: View Analysis Information (◯)

In-progress
Analysis still in progress- stay tuned!

---

(selected) analysis complete / 2nd is zero anomalies / 3rd is error

| Status ↓↑ | Security Policy ↓↑ | Anomaly Breakdown | Anomalies ↓ |
|---|---|---|---|
| Search | | | 🔍 |
| ✓ | Remote Networks | ▬▬▬▬▬ | 55 |
| ✓ | Explicit Proxy | | 0 |
| ✗ | Remote Workforce (GlobalProtect) | | 17 |

Anomaly Breakdown/Hit Count: REMOTE NETWORKS
✓ Analysis complete: View Analysis Information (55)

- 55 Security Policy Anomalies/Incidents Found
- ⊗ 25 Shadowed Rules
- ⊗ 10 Redundant Rules
- ⚠ 20 Generalized Rule

5
RULES WITH ZERO HIT COUNT IN PAST 30 DAYS

FIG. 34A

Interactions: Breakdown Card (Prisma Access)

Clicking a Security Policy from the list on the left will:
1. change the data shown in the Anomaly Breakdown donut chart on the right
2. update the selected Security Policy in the Analysis Results section title

---

I. ANOMALY ANALYSIS RESULTS:Remote Networks ⌄

Security Rule Anomaly Details (10 of 8,001)
Expand an accordion to view results details for each Security Policy Rule, or Expand All

| 🔍 Search | | Anomaly Type All ⌄ | Security Policy Rule All ⌄ | ▽ Add Filter | Reset ⚙ |

Hover on Status column to see status (In-Progress, Complete, Failed/Error)

| Status ⇅ | Security Policy ⇅ | Anomaly Breakdown | Anomalies ↓ |
|---|---|---|---|
| 🔍 Search | | | |
| ✓ | Remote Networks | ▬▬▬▬▬ | 55 |
| Analysis Failed ✕ | Explicit Proxy | ▬ | 0 |
| ✕ | Remote Workforce (GlobalProtect) | ▬▬▬ | 17 |

| Analysis Failed ✕ | Analysis in Progress ✕ | Analysis Complete ✓ |

FIG. 34B

Security Policy Anomaly/Hit Count Results
Select a Policy Device Group to display breakdown of the Anomaly results and details for each below.

ANALYSIS RESULTS SUMMARY

| Status ↕ | Security Policy ↕ | Anomaly Breakdown | Anomalies ↓ |
|---|---|---|---|
| | Search 🔍 | | |
| ✓ | Remote Networks | ▬▬▬▬▬ | 55 |
| ✓ | Explicit Proxy | ▬▬▬ | 35 |
| ⋮⋮⋮ | Remote Workforce (GlobalProtect) | | - |

Anomaly Breakdown/Hit Count: REMOTE NETWORKS
✓ Analysis complete. View Analysis Information 55 Security Policy Anomalies/Incidents Found
- ⊕ 25 Shadowed Rules
- ⊗ 10 Redundant Rules
- △ 20 Generalized Rule

55

| RULES WITH ZERO HIT COUNT IN PAST 30 DAYS |
|---|
| 5 |

ANALYSIS RESULTS: Remote Networks ⌄

Analysis Result Details
Expand an accordion to view results details for each Security Policy Rule, or Expand All Security Rule Anomaly Details (10 of 8,001)  [Anomaly Type All ⌄]  Rules with Zero Hit Count in Past 30 Days (5)

🔍 Search | Security Policy Rule Name ↕↓ | Hit Count ↕↓ | Anomaly Result ↕↓ | [Security Policy Rule All ⌄] | [Hit Count Non-Zero ✕] | ▽ Add Filter | Reset ⚙

∧ 1.1 Existing-Security-Rule-A     0     ⊗ Redundant Rule: Allow security rule is covered by a higher order allow security rule

| Rule Type | Rule Name | Order | Hit Count (Past 30 Days) | Action | Source | | | | Destination | | | Application | Service | Security Profiles | Options | Tag |
|---|---|---|---|---|---|---|---|---|---|---|---|---|---|---|---|---|
| | | | | | Zone | Address | User | Zone | Address | URL Category | | | | | | |
| Covered Rule | Existing-Policy-A | Higher | 10 | ⊙ allow | Zone 1 | 🖥 any | group-barbara | any | 🖥 any | any | 📄 wiki | ✂ any | ✂ any | ⊕📗⊞⊞⊗ | Firewall |
| Covering Rule | Existing-Policy-P | Lower | 100 | ⊙ allow | Zone 2 | 🖥 any | group-Tom | any | 🖥 any | any | 📄 wiki | ✂ any | ✂ any | ⊕📗⊞⊞⊗ | Microsoft |

FIG. 35

SUGGESTED NEXT STEPS ∨
- Option 1) --
- Option 2) --
- Note: --

1.1.2 Existing-Policy-B ∧   30   ⊗ Redundant Rule: Block security rule is covered by a higher order block security rule

| Rule Type | Rule Name | Order | Hit Count (Past 30 Days) | Action | Source Zone | Source Address | Source User | Destination Zone | Destination Address | Destination URL Category | Application | Service | Security Profiles | Options | Tag |
|---|---|---|---|---|---|---|---|---|---|---|---|---|---|---|---|
| Covered Rule | Existing-Policy-B | Lower | 10 | ⊘ deny | Zone 1 | any | Marie | any | any | any | wiki | any | ⊘⊕⊠⊞⊠ | ⊠⊞⊠∞ | Firewall |
| Covering Rule | Existing-Policy-Q | Higher | 100 | ⊘ deny | Zone 2 | any | group-satish | any | any | any | wiki | any | ⊘⊕⊠⊞⊠ | ⊠⊞⊠∞ | Microsoft |

SUGGESTED NEXT STEPS ∨
- Option 1) --
- Option 2) --
- Note: --

1.1.3 Existing-Policy-C ∧   5   ⊘ Shadowed Rule: Allow security rule is covered by a higher order block security rule

| Rule Type | Rule Name | Order | Hit Count (Past 30 Days) | Action | Source Zone | Source Address | Source User | Destination Zone | Destination Address | Destination URL Category | Application | Service | Security Profiles | Options | Tag |
|---|---|---|---|---|---|---|---|---|---|---|---|---|---|---|---|
| Covered Rule | Existing-Policy-C | Higher | 10 | ⊘ deny | Zone 1 | any | Tom | any | any | any | wiki | any | ⊘⊕⊠⊞⊠ | ⊠⊞⊠∞ | Firewall |
| Covering Rule | Existing-Policy-R | Lower | 100 | ⊘ allow | Zone 2 | any | group-barbara | any | any | any | wiki | any | ⊘⊕⊠⊞⊠ | ⊠⊞⊠∞ | Microsoft |

SUGGESTED NEXT STEPS ∨
- Option 1) --
- Option 2) --
- Note: --

FIG. 35 (Cont.)

Incidents & Alerts

NGFW
Incidents & Alerts [99+]

PRISMA ACCESS
Incidents & Alerts [25]

---

← Allow Security Rule covered by higher order Rules [Disable] [Clear]

Incident Management

| | |
|---|---|
| Incident Category | Security |
| Incident Subcategory | Security Policy Allow Security Rule covered by higher order Rules |
| Incident Code | |
| Incident Severity | ① Critical |
| Incident State | Cleared |
| Incident ID | IDC0001 |

OPERATIONS

| | |
|---|---|
| Acknowledgment Status | [⊙ Acknowledge] |
| Created | Sep 20, 2019 12:40 PM |
| Last Updated | Sep 21, 2019 2:45 PM |

IMPACTED OBJECTS

| | |
|---|---|
| Tunnel Name | Tunnel 1, Tunnel 2, Tunnel 3, Tunnel 4 |
| Site Name | Site 1, Site 2 |
| BGP Peer Name | Lorem ipsum |

Impact

SECURITY POLICY: MOBILE USERS GLOBALPROTECT any-to-panw-services
Covered Rule | Rule Relative Order: Lower
Hit Count (10.7K) (↑10.2k) | Lifetime ③ | At incident creation internal-to-panw-services
Covering Rule | Rule Relative Order: Lower
Hit Count ⓪ | Lifetime ⓪ | At incident creation any-to-internal-panw-services
Covering Rule | Rule Relative Order: Lower
Hit Count ⓪ | Lifetime ⓪ | At incident creation internal-to-panw-services
Covering Rule | Rule Relative Order: Lower
Hit Count ⓪ | Lifetime ⓪ | At incident creation

Remediation Playbook

Play 1: Restart your machine
Restart your machine in safe mode.

Play 2: Change configuration settings
Restart your machine in safe mode.

Play 3: Login to Cortex Data Lake
Click to login to your Cortex Data Lake account.

Play 4: Enter your key
Restart your machine in safe mode.

Play 5: Restart your machine
Restart your machine in safe mode.

Play 6: Restart your machine

---

Impacted Primary and Related Object Details

SECURITY POLICY DIAGNOSIS Allow Security Rule is being covered by one or more higher order Allow rules

SECURITY POLICY RULE COMPARISION

FIG. 36A

| Field | Covered Security Rule | Covering Security Rule | Covering Security Rule | Covering Security Rule |
|---|---|---|---|---|
| Security Policy | Mobile Users GlobalProtect | Mobile Users GlobalProtect | Mobile Users GlobalProtect | Mobile Users GlobalProtect |
| Rule Name | any-to-panw-services | internal-to-panw-services | internal-to-panw-services | internal-to-panw-services |
| Relative Order | Lower | Higher | Lower | Higher |
| Hit Count | 23 | 0 | 0 | 0 |
| Action | Allow | Allow | Allow | Allow |
| Policy Layer | Shared Pre Rules | Mobile Users GlobalProtect | Shared Pre Rules | Mobile Users GlobalProtect |
| Source Zone | any | Zone 1 | Zone 1 | Zone 2 |
| Source Address | 10.0.0.0/8 | 10.0.0.0/8 | 10.0.0.0/8 | 10.0.0.0/8 |
| Source User | any | any | any | any |

*Minimize Menu* ˅

Detection Details

CORRELATED ALERTS (2)

| Generated ↓↑ | Severity ↓↑ | Alert Name ↓↑ | Alert ID ↓↑ | Alert Status ↓↑ |
|---|---|---|---|---|
| Feb 24th 2021 12:04pm PST | ⊘ Critical | Cortex Data Lake connection terminated unexpected... | AO11111 | Raised |
| Feb 22th 2021 01:02pm PST | △ Warning | US North has a misconfigured IP address | AO22222 | Raised |

Activity   All Activity ˅

● ○
○ ○ History

| | |
|---|---|
| 21:00:00 | • Clear Reason added by Peter Gibbons |
| 20:46:07 | ⊘ Incident Auto-Cleared by system |
| 16 Feb 2021 20:45:45 | • Child Incident Generated RN Bandwidth will exceed 90% threshold in 28 days |
| 20:46:07 | • Child Incident Generated RN Bandwidth will exceed 90% threshold in 1 month |

FIG. 36A (Cont. 1)

≡ System Identified
@ User Identified

Related Incidents ①

CHILD INCIDENTS (4)
@ IDC04421: Users in UK are unable to access Webex Application
@ IDC03421: Prisma Access connectivity to Cortex Data Lake servic...
@ IDC04421: Users in UK are unable to access Webex Application
@ IDC04421: Users in UK are unable to access Webex Application

PREVIOUS INCIDENT (1)
@ IDC04421: Users in UK are unable to access Webex Application

PARENT INCIDENTS (4)
@ IDC04421: Users in UK are unable to access Webex Application
@ IDC04421: Users in UK are unable to access Webex Application
@ IDC04421: Users in UK are unable to access Webex Application
@ IDC04421: Users in UK are unable to access Webex Application

LINKED INCIDENTS (3)
@ IDC04421: Users in UK are unable to access Webex Application
@ IDC03421: Prisma Access connectivity to Cortex Data Lake servic...
@ IDC04421: Users in UK are unable to access Webex Application

| Time | Event |
|---|---|
| 20:46:07 | • Incident Linked — RN Bandwidth will exceed 90% threshold in 1 month |
| 20:46:07 | • Incident Acknowledged by Michael Bolton |
| 20:45:45 | • Notification sent to "IT Dept" Notification Profile |
| 20:44:02 | ⊕ Incident #IDC00001 created |
| 20:45:45 | • Alert #AL04421 Generated — Users in UK are unable to access Webex Application |
| 20:45:45 | • Alert #AL04421 Generated — Users in UK are unable to access Webex Application |

Incidents & Alerts

NGFW
- Incidents & Alerts [99+]

PRISMA ACCESS
- Incidents & Alerts [25]

← Allow Security Rule contradicted by higher order Block rules          [Disable] [Clear] ⋮

Incident Management

| | |
|---|---|
| Incident Category | Security |
| Incident Subcategory | Security Policy Allow Security Rule contradicted by higher order Block rules |
| Incident Code | higher order Block rules |
| Incident Severity | ① Critical |
| Incident State | Cleared |
| Incident ID | IDC0001 |

OPERATIONS
| | |
|---|---|
| Acknowledgment Status | [⊙ Acknowledge] |
| Created | Sep 20, 2019 12:40 PM |
| Last Updated | Sep 21, 2019 2:45 PM |

IMPACTED OBJECTS
| | |
|---|---|
| Tunnel Name | Tunnel 1, Tunnel 2, Tunnel 3, Tunnel 4 |
| Site Name | Site 1, Site 2 |
| BGP Peer Name | Lorem ipsum |

Impact

DEVICE GROUP: MU-INTERNAL

Shadowed Rule
any-to-panw-services
Policy #6

( 0 )

POLICY HITS

Shadowing Rule
internal-to-panw-services
Policy #5

( 23 )

POLICY HITS

Remediation Playbook

Play 1: Restart your machine
Restart your machine in safe mode.

Play 2: Change configuration settings
Restart your machine in safe mode.

Play 3: Login to Cortex Data Lake
Click to login to your Cortex Data Lake account.

Play 4: Enter your key
Restart your machine in safe mode.

Play 5: Restart your machine
Restart your machine in safe mode.

Play 6: Restart your machine

---

Impacted Primary and Related Object Details

POLICY DIAGNOSIS    Allow Security Rule is being contradicted by one or more higher order Block rules

POLICY COMPARISON

| Criteria | Contradicted Security Rule | Contradicting Security Rule |
|---|---|---|
| Device Group | MU-Internal | MU-Internal |
| Policy Name | any-to-panw-services ✎ | internal-to-panw-services ✎ |
| Relative Order | Lower | Higher |
| Action | Allow | Block |
| Policy Layer | Shared Pre Rules | Device Group Post Rules |
| Source Zone | any | any |
| Source Address | 10.0.0.0/8 | 10.0.0.0/8 |
| Source User | any | any |
| Source HIP Profile | any | any |

*Minimize Menu* ⌄

Detection Details

CORRELATED ALERTS (2)

| Generated ↕ | Severity ↕ | Alert Name ↕ | Alert ID ↕ | Alert Status ↕ |
|---|---|---|---|---|
| Feb 24th 2021 12:04pm PST | ⊙ Critical | Cortex Data Lake connection terminated unexpected... | AO11111 | Raised |
| Feb 22th 2021 01:02pm PST | ⚠ Warning | US North has a misconfigured IP address | AO22222 | Raised |

Activity  All Activity ⌄

| 21:00:00 | • Clear Reason added by Peter Gibbons |
|---|---|
| 20:46:07 | ⊙ Incident Auto-Cleared by system |
| 16 Feb 2021 20:45:45 | • Child Incident Generated RN Bandwidth will exceed 90% threshold in 28 days |
| 20:46:07 | • Child Incident Generated RN Bandwidth will exceed 90% threshold in 28 days |

FIG. 36B (Cont. 1)

≡ System Identified
@ User Identified

Related Incidents ①

CHILD INCIDENTS (4)
@ IDC04421: Users in UK are unable to access Webex Application
@ IDC03421: Prisma Access connectivity to Cortex Data Lake servic...
@ IDC04421: Users in UK are unable to access Webex Application
@ IDC04421: Users in UK are unable to access Webex Application

PREVIOUS INCIDENT (1)
@ IDC04421: Users in UK are unable to access Webex Application

PARENT INCIDENTS (4)
@ IDC04421: Users in UK are unable to access Webex Application
@ IDC04421: Users in UK are unable to access Webex Application
@ IDC04421: Users in UK are unable to access Webex Application
@ IDC04421: Users in UK are unable to access Webex Application

LINKED INCIDENTS (3)
@ IDC04421: Users in UK are unable to access Webex Application
@ IDC03421: Prisma Access connectivity to Cortex Data Lake servic...
@ IDC04421: Users in UK are unable to access Webex Application

| Time | Event |
|---|---|
| 20:46:07 | • Incident Linked — RN Bandwidth will exceed 90% threshold in 1 month |
| 20:46:07 | • Incident Acknowledged by Michael Bolton |
| 20:45:45 | • Notification sent to "IT Dept" Notification Profile |
| 20:44:02 | ⊕ Incident #IDC00001 created |
| 20:45:45 | • Alert #AL04421 Generated — Users in UK are unable to access Webex Application |
| 20:45:45 | • Alert #AL04421 Generated — Users in UK are unable to access Webex Application |

FIG. 36B (Cont. 2)

Impacted Primary and Related Object Details

SECURITY POLICY DIAGNOSIS Allow Security Rule is being covered by one or more higher order Allow rules

SECURITY POLICY RULE COMPARISION

| Criteria | Covered Security Rule | Covering Security Rule | Covering Security Rule | Covering Security Rule | Covering Security Rule |
|---|---|---|---|---|---|
| Device Group | MU-Internal | MU-Internal | MU-Internal | MU-Internal | MU-Internal |
| Rule Name | any-to-panw-services | internal-to-panw-services | any-to-panw-services | internal-to-panw-services | internal-to-panw-services |
| Hit count since Incident creation | Lower | Higher | Higher | Lower | Higher |
| Hit Count | 23 | 0 | 0 | 0 | 0 |
| Action | Allow | Allow | Allow | Allow | Allow |
| Policy Layer | Shared Pre Rules | Mobile Users GlobalProtect | Mobile Users GlobalProtect | Shared Pre Rules | Mobile Users GlobalProtect |
| Source Zone | any | Zone 1 | Zone 1 | Zone 1 | Zone 3 |
| Source Address | 10.0.0.0/8 | 10.0.0.0/8 | 10.0.0.0/8 | 10.0.0.0/8 | 10.0.0.0/8 |
| Source User | any | any | any | any | any |
| Source Device | any | any | any | any | any |
| Destination Zone | untrust | any | any | untrust | any |
| Destination Address | 10.0.0.0/8 104.251.192.0/23 172.16.0.0/12 192.168.0.0/16 | 10.0.0.0/8 104.251.192.0/23 172.16.0.0/12 192.168.0.0/16 | 10.0.0.0/8 104.251.192.0/23 172.16.0.0/12 192.168.0.0/16 | 10.0.0.0/8 104.251.192.0/23 172.16.0.0/12 192.168.0.0/16 | 10.0.0.0/8 104.251.192.0/23 172.16.0.0/12 192.168.0.0/16 |
| Application | aporeto cortex-xdr paloalto-aperture paloalto-autofocus | aporeto cortex-xdr paloalto-aperture paloalto-autofocus | aporeto cortex-xdr paloalto-aperture paloalto-autofocus | aporeto cortex-xdr paloalto-aperture paloalto-autofocus | aporeto cortex-xdr paloalto-aperture paloalto-autofocus |

FIG. 36C

| | | | |
|---|---|---|---|
| | paloalto-device-telemetry<br>paloalto-directory-sync<br>paloalto-dip-service<br>paloalto-dns-security<br>paloalto-gp-mfa-notification<br>paloalto-iot-security<br>paloalto-logging-service<br>paloalto-shared-services<br>paloalto-traps<br>paloalto-updates<br>paloalto-userid-agent<br>paloalto-wildfire0cloud<br>paloalto-zero-touch-provision<br>pan-db-cloud<br>panorama<br>panos-global-protect<br>panos-web-interface<br>prisma-cloud-compute-defender<br>traps-management-service | paloalto-device-telemetry<br>paloalto-directory-sync<br>paloalto-dip-service<br>paloalto-dns-security<br>paloalto-gp-mfa-notification<br>paloalto-iot-security<br>paloalto-logging-service<br>paloalto-shared-services<br>paloalto-traps<br>paloalto-updates<br>paloalto-userid-agent<br>paloalto-wildfire0cloud<br>paloalto-zero-touch-provision<br>pan-db-cloud<br>panorama<br>panos-global-protect<br>panos-web-interface<br>prisma-cloud-compute-defender<br>traps-management-service | paloalto-device-telemetry<br>paloalto-directory-sync<br>paloalto-dip-service<br>paloalto-dns-security<br>paloalto-gp-mfa-notification<br>paloalto-iot-security<br>paloalto-logging-service<br>paloalto-shared-services<br>paloalto-traps<br>paloalto-updates<br>paloalto-userid-agent<br>paloalto-wildfire0cloud<br>paloalto-zero-touch-provision<br>pan-db-cloud<br>panorama<br>panos-global-protect<br>panos-web-interface<br>prisma-cloud-compute-defender<br>traps-management-service |
| Service | application-default | application-default | application-default |
| URL Category | any | any | any |
| Profile Group | Profile Group: corp-security-group | Profile Group: corp-security-group | Profile Group: corp-security-group |

FIG. 36C (Cont.)

SECURITY POLICY ANALYSIS

CROSS REFERENCE TO OTHER APPLICATIONS

This application claims priority to U.S. Provisional Patent Application No. 63/459,494 entitled APPLICATION ACCESS ANALYZER filed Apr. 14, 2023, and claims priority to U.S. Provisional Patent Application No. 63/459,492 entitled SECURITY POLICY ANALYSIS-DEVOPS APPROACH filed Apr. 14, 2023, and claims priority to U.S. Provisional Patent Application No. 63/459,500 entitled TOPOLOGICAL CO-RELATION filed Apr. 14, 2023, each of which are incorporated herein by reference for all purposes.

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIGS. 5A and 5B illustrate an example interface for an Application Access Analyzer (AAA) in accordance with some embodiments.

FIG. 8 illustrates an example of a simplified security policy.

FIGS. 9A-9D illustrate modeled policies.

FIG. 10 illustrates various examples of potentially problematic security policies.

FIGS. 11-21 illustrate example interfaces.

FIGS. 23A-23C illustrate examples of alert/incident codes and display names.

FIGS. 27A-27D illustrate various workflows.

FIG. 28 illustrates examples of user group based incidents.

FIGS. 31A-31B illustrate portions of an incident resolution analysis report.

FIG. 33 illustrates detail on various portions of the report shown in FIG. 32.

FIG. 35 illustrates an example of a portion of a security policy anomaly/hit count result report.

FIGS. 36A-36C illustrate various aspects of security policy incident reports.

DETAILED DESCRIPTION

Figure 1:
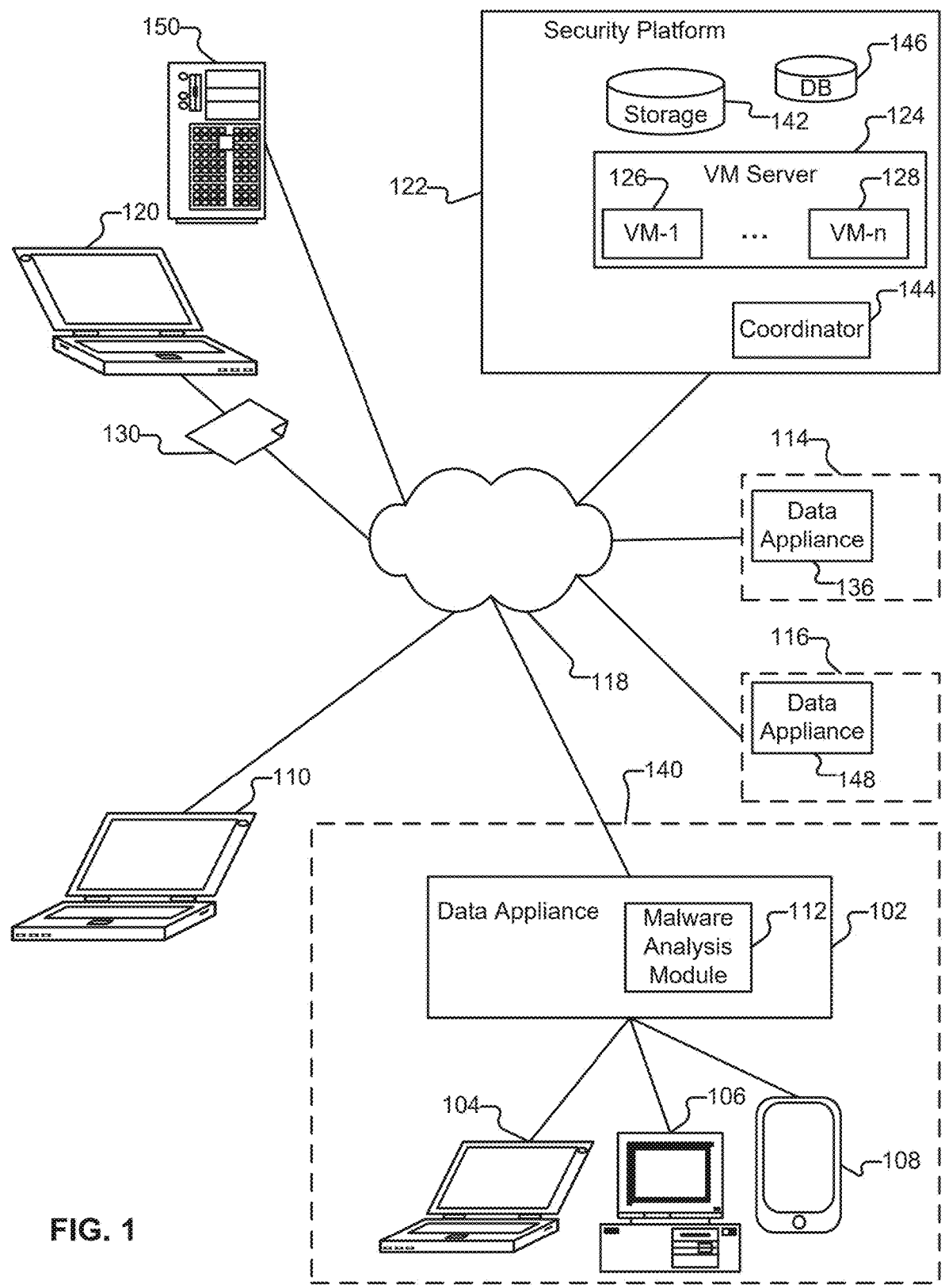
FIG. 1 illustrates an example of an environment in which malicious applications ("malware") are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Introduction

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets-using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Overview of Techniques for an Application Access Analyzer

Generally, existing Information Technology (IT) operations have to go through thousands to millions of logs and a multitude of devices in enterprise infrastructures to identify application connectivity issues for users or groups of users. Troubleshooting and debugging connectivity issues typically require domain knowledge expertise, such as network architecture, routing/switching, server configuration, understanding of complex network security policies, and vendor specific Operating System (OS) and Command Line Interface (CLI) knowledge. As such, this significantly increases the person hours and mean time to detect and resolve the application connectivity issues.

Specifically, identifying Software as a Service (SaaS)/Private application connectivity issues in a large network infrastructure is technically challenging due to vast areas of domains where thorough check and analysis is generally required. This leads to a significant increase in mean time to detect and remediate issues in SaaS/Private application (App) connectivity issues, particularly in a large network infrastructure. As such, many Secure Access Service Edge (SASE) providers and enterprise organizations are attempting to solve this problem through different ways using artificial intelligence (AI) and/or Machine Learning (ML) technology. Automating detection and remediation of application connectivity issues can reduce the Mean Time To Recovery (MTTR) and operational costs to the organization. Further, providing a solution that facilitates an automated detection and remediation of application connectivity issues can help SASE providers to increase their customer base with quality product and customer satisfaction.

Accordingly, new and improved solutions that facilitate an application access analyzer are disclosed with respect to various embodiments.

Specifically, an Application Access Analyzer (AAA) is disclosed that provides an interface (e.g., a natural language (NL) query interface) to operators (e.g., IT/admin, such as for an IT help desk or other technology support personnel/users) to detect application reachability, connectivity, and access/permission issues. The disclosed AAA facilitates auto remediation. As an example, the AAA provides an actionable verdict for a query submitted by the operator with comprehensive details of analysis and checks performed in different categories (e.g., distinct domains, including user/endpoint analysis, networking analysis, and security policy analysis, such as further described below). Specifically, the AAA auto-discovers the network topology that a given user (e.g., the user(s) specified in the query) uses to access a given application (e.g., the SaaS/Private App specified in the query), analysis of operational state of an underlying network infrastructure, a user authentication analysis, checks on health and reachability of Domain Name System (DNS) and Authentication (Auth) servers that the user reaches before accessing the application, and security policy reasoning specific to the user or user groups for any access/permission issues.

Actionable verdict, root cause analysis, and pinpointing the problem significantly reduces the mean time to resolve application connectivity issues. Actionable verdict, root cause analysis, and pinpointing the problem also saves the hassle and time operators would be required to otherwise perform by following a runbook/playbook and debugging multiple devices, which generally requires domain knowledge expertise.

As an example, the disclosed AAA can be used for checking connectivity issues between one or more of the following: (1) a user, users, and/or a group of users to a SaaS application from mobile user gateways; (2) a user, users, and/or a group of users to a private application hosted on premise data centers or on a remote branch office; and (3) a user, users, and/or a group of users to remote site connectivity to a remote branch or data center.

In some embodiments, a system/process/computer program product for an application access analyzer (AAA) includes monitoring access to an application over a network; automatically determining a root cause of an issue (e.g., an anomaly in network connectivity, performance degradation, and/or a permission denial and/or policy blocking) associated with the access to the application over the network for a user using an application access analyzer; and performing an action in response to determining the root cause of the issue associated with the access to the application over the network for the user.

In one embodiment, the disclosed application access analyzer (AAA) can be used to determine a root cause of an application access issue by correlating a plurality of data sources across a plurality of domains (e.g., network, authentication, DNS, SaaS/Private App health, security policy configuration, etc.) using AI and ML as will be further described below.

In one embodiment, the disclosed AAA can be used to automatically detect an anomaly in network connectivity and/or a performance degradation (e.g., an anomaly in network connectivity and/or a performance degradation, such as based on configurable thresholds for determining reachability and/or performance degradation to given apps for a user(s) based on their location/access point) as will be further described below.

In one embodiment, the disclosed AAA can be used to generate human consumable/understandable and actionable verdict analysis that greatly reduces the mean time to detect and remediate application connectivity issues as will be further described below.

In one embodiment, the disclosed AAA can be used to perform an exhaustive analysis of various troubleshooting domains within a short period of time (e.g., a few minutes), which would otherwise typically require many hours to troubleshoot each domain, such as will be further described below.

In one embodiment, the disclosed AAA can be used to perform an analysis that includes identifying issues in a network infrastructure, customer network services, client connectivity issues, SaaS/private application (app) health, and reachability issues as will be further described below. For example, the disclosed AAA can provide an actionable summary of each troubleshooting domain, and the operator does not need to have domain knowledge expertise to detect and remediate the issue(s).

In one embodiment, the disclosed AAA can automatically discover (autodiscover) a network topology that would be used by a user to access the application and perform analysis for possible application access issues.

In one embodiment, the disclosed AAA can be used to provide a security posture evaluation by building a unified logical model of computation for security policies of the firewall.

In one embodiment, the disclosed AAA can be used for managing and maintaining the track of network topology issues, configuration issues with networking, network services, and security policy, which can often be cumbersome and error prone, such as will be further described below. For example, the disclosed AAA can provide a comprehensive analysis of each of these domains with a convenient natural language (NL) query interface.

In one embodiment, the disclosed AAA incorporates domain knowledge in the form of playbooks and can perform playbook analysis through execution of Directed Acyclic Graphs (DAGs) (e.g., implemented as computational DAGs as further described below).

In one embodiment, the disclosed AAA can be used to significantly reduce operational and support costs for enterprises and their users for accessing their SaaS/Private Apps.

In an example implementation, the disclosed AAA is implemented as a Prisma AI Operations (AIOPs) platform that provides proactive service level management across customers globally and is designed for use by Network Operations Center (NOC) personnel supporting SASE customers, such as will be further described below. Specifically, the Prisma AIOPs platform provides proactive monitoring, alerting, problem isolation, and playbook-driven remediation to provide SLA (MTTK/I, MTTR) as desired/required by customers.

Accordingly, new and improved security solutions that facilitate an application access analyzer are disclosed in accordance with some embodiments.

These and other embodiments and examples for an application access analyzer (AAA) will be further described below.

Example System Environments for an Application Access Analyzer

Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection), for example, which can be provided in part or in whole as a SASE security solution, in which the cloud-based security solution (e.g., SASE) can be monitored using the disclosed techniques for an application access analyzer, as further described below.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110, can be protected from such malware (e.g., including previously unknown/new variants of malware, such as C2 malware).

"Malware" as used herein refers to an application that engages in behaviors, whether clandestinely or not (and whether illegal or not), of which a user does not approve/would not approve if fully informed. Examples of malware include ransomware, Trojans, viruses, rootkits, spyware, hacking tools, etc. One example of malware is a desktop/mobile application that encrypts a user's stored data (e.g., ransomware). Another example of malware is C2 malware, such as similarly described above. Other forms of malware (e.g., keyloggers) can also be detected/thwarted using the disclosed techniques for sample traffic based self-learning malware detection as will be further described herein.

Techniques described herein can be used in conjunction with a variety of platforms (e.g., servers, computing appliances, virtual/container environments, desktops, mobile devices, gaming platforms, embedded systems, etc.) and/or for automated detection of a variety of forms of malware (e.g., new and/or variants of malware, such as C2 malware, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, web site content, files exchanged through instant messaging programs, and/or other file transfers. In some embodiments, data appliance 102 is also configured to enforce policies with respect to traffic that stays within enterprise network 140.

Figure 2A:
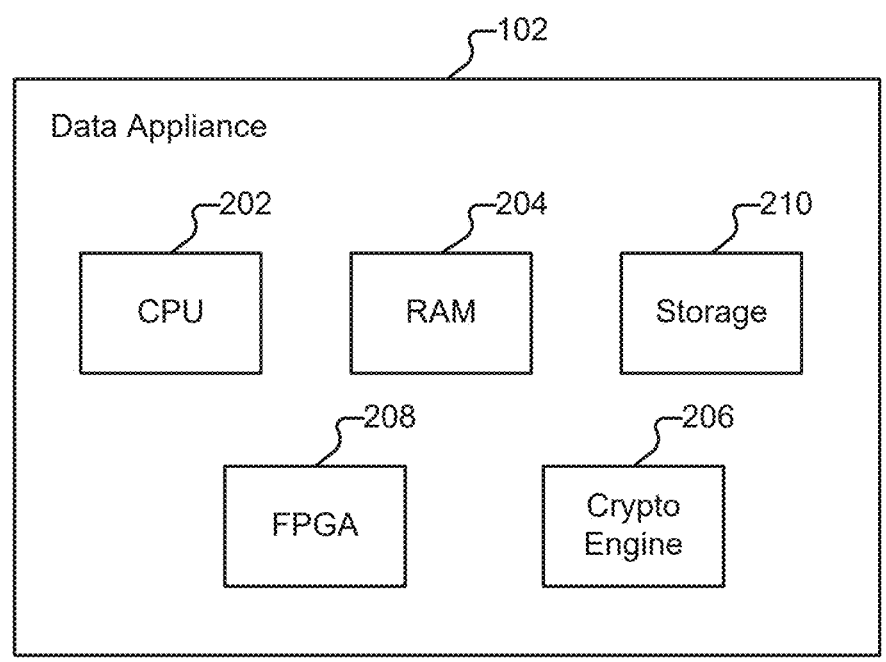
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning (ML) models (e.g., such as for sample traffic based self-learning malware detection). Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on.

Figure 2B:
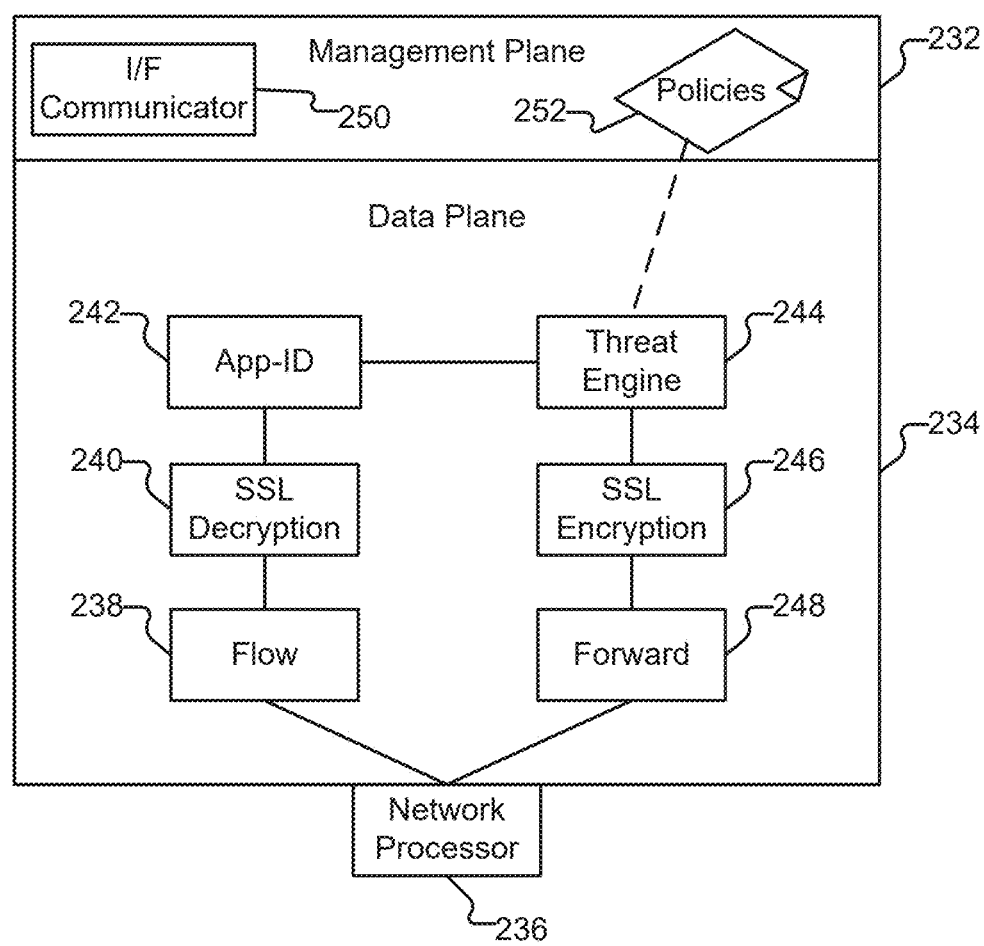
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing-Productivity") and then subsequently browse to a social networking site (classified based on the URL visited as "Web Browsing-Social Networking"). Distinct types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. Example policies can include C2 malware detection policies using the disclosed techniques for sample traffic based self-learning malware detection. An interface (I/F) communicator 250 is provided for management communications (e.g., via (REST) APIs, messages, or network protocol communications or other communication mechanisms).

II. Security Platform

Returning to FIG. 1, suppose a malicious individual (using system 120) has created malware 130, such as malware for a malicious web campaign (e.g., the malware can be delivered to endpoint devices of users via a compromised web site when the user visits/browses to the compromised web site or via a phishing attack, etc.). The malicious individual hopes that a client device, such as client device 104, will execute a copy of malware 130 to unpack the malware executable/payload, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C2/C&C) server 150, as well as to receive instructions from C2 server 150, as applicable.

Suppose data appliance 102 has intercepted an email sent (e.g., by system 120) to a user, "Alice," who operates client device 104. In this example, Alice receives the email and clicks on the link to a phishing/compromised site that could result in an attempted download of malware 130 by Alice's client device 104. However, in this example, data appliance 102 can perform the disclosed techniques for sample traffic based self-learning malware detection and block access from Alice's client device 104 to the packed malware content and to thereby preempt and prevent any such download of malware 130 to Alice's client device 104. As will be further described below, data appliance 102 performs the disclosed techniques for sample traffic based self-learning malware detection, such as further described below, to detect and block such malware 130 from harming Alice's client device 104.

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C2 server 150 (e.g., where C&C server 150 is known to be malicious). The list of malicious domains (and/or IP addresses) can also help data appliance 102 determine when one of its nodes has been compromised. For example, if client device 104 attempts to contact C2 server 150, such attempt is a strong indicator that client 104 has been compromised by malware (and remedial actions should be taken accordingly, such as quarantining client device 104 from communicating with other nodes within enterprise network 140).

As will be described in more detail below, security platform 122 can also receive a copy of malware 130 from data appliance 102 to perform cloud-based security analysis for performing sample traffic based self-learning malware detection, and the malware verdict can be sent back to data appliance 102 for enforcing the security policy to thereby safeguard Alice's client device 104 from execution of malware 130 (e.g., to block malware 130 from access on client device 104).

A variety of actions can be taken by data appliance 102 if no signature for an attachment is found, in various embodiments. As a first example, data appliance 102 can fail-safe, by blocking transmission of any attachments not allow-listed as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not block-listed as malicious (e.g., not matching signatures of known bad files). A drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware files, including for network traffic based heuristic IPS malware detection, etc. (e.g., daily, hourly, or some other interval, and/or based on an event configured by one or more policies). The subscription can cover the analysis of just those files intercepted by data appliance 102 and sent to security platform 122 by data appliance 102, and can also cover signatures of malware known to security platform 122.

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

Figure 3:
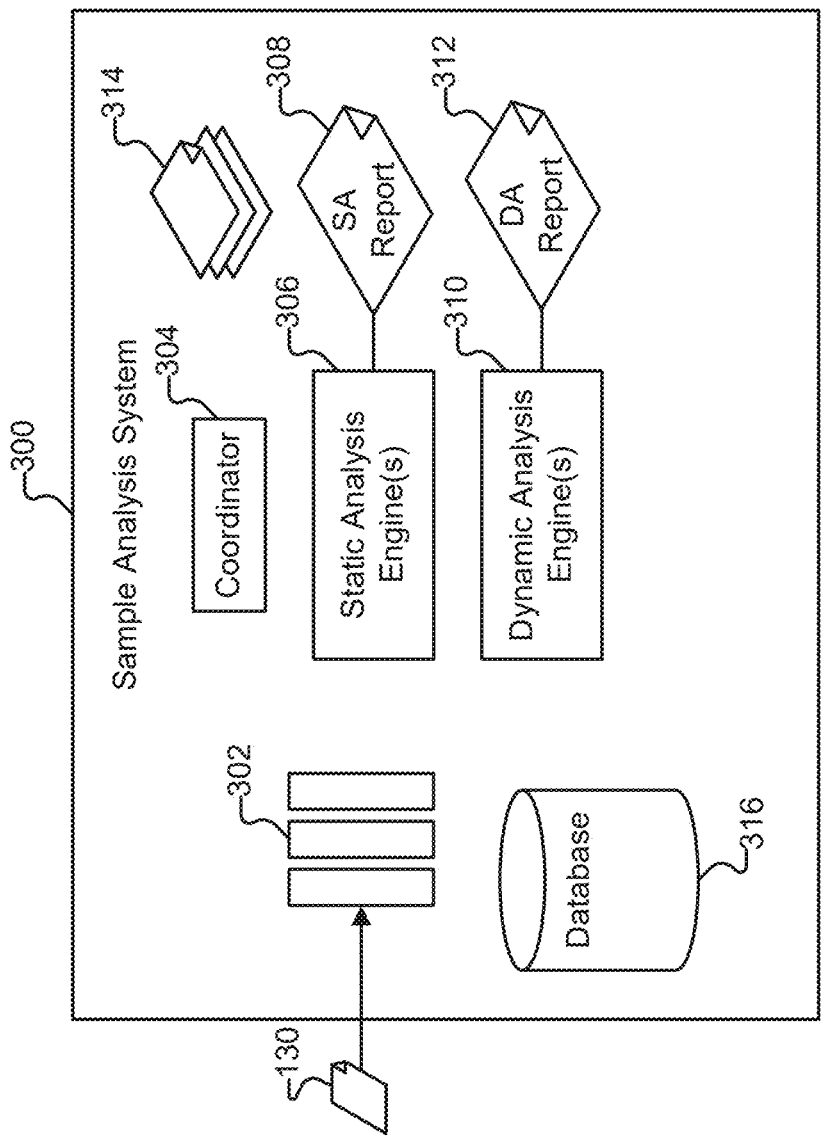
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C2/C&C) domains; signatures, hashes, and/or other identifiers of known malicious applications; signatures, hashes, and/or other identifiers of known safe applications; signatures, hashes, and/or other identifiers of known malicious files (e.g., OS exploit files); signatures, hashes, and/or other identifiers of known safe libraries; and signatures, hashes, and/or other identifiers of known malicious libraries.

In various embodiments, when a new sample is received for analysis (e.g., an existing signature associated with the sample is not present in analysis system 300), it is added to queue 302. As shown in FIG. 3, application 130 is received by system 300 and added to queue 302.

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. As an example, static analysis of malware can include performing a signature-based analysis. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance (e.g., emulation/sandbox analysis of samples for malware detection, such as the above-described C2 malware detection based on monitored network traffic activity). In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and log cat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

Application Access Visibility Using an Application Access Analyzer (AAA)

Figure 4:
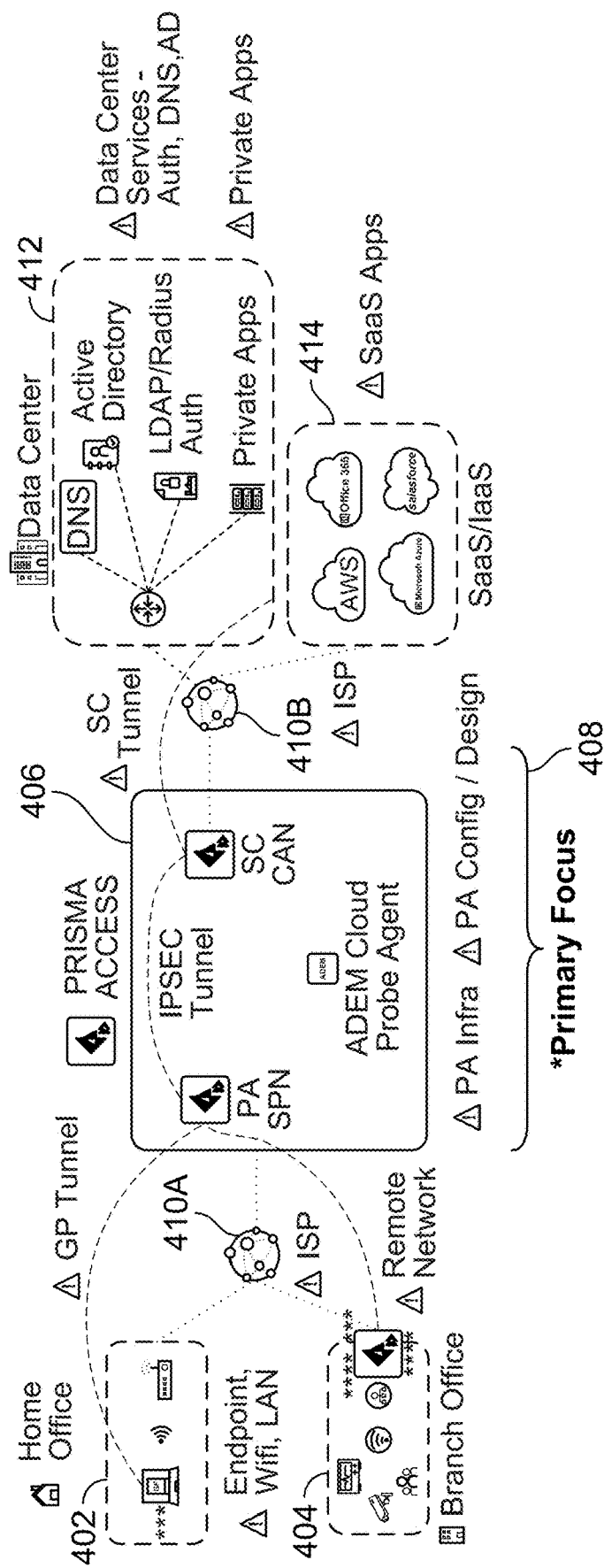
FIG. 4 is an example Secure Access Service Edge (SASE) and network environment that illustrates technical challenges for application access visibility in accordance with some embodiments.

FIG. 4 is an example Secure Access Service Edge (SASE) and network environment that illustrates technical challenges for application access visibility in accordance with some embodiments. Specifically, FIG. 4 illustrates a home office 402 (e.g., via a VPN connection, such as using the GlobalProtect (GP) VPN tunnel as shown, which is a VPN solution that is commercially available from Palo Alto Networks, Inc, headquartered in Santa Clara, CA) and a branch office 404 (e.g., via a secure Remote Network as shown) that are in network communication with a SASE shown as Prisma Access 406 (e.g., Prisma Access is a SASE that is commercially available from Palo Alto Networks, Inc, headquartered in Santa Clara, CA) via a network/ISP shown at 410A. SASE/Prisma Access 406 is in network communication with a data center 412 and SaaS/IaaS 414 via a network/ISP shown at 410B.

Multiple computing components/entities and network connections between these different computing components/entities generally makes it technically challenging for a customer (e.g., a customer Network Operations Center (NOC) and/or IT/helpdesk personnel) to determine a root cause for any application connectivity issues. As a primary focus for SASE/Prisma Access 406, such as shown at 408, the disclosed techniques for the Application Access Analyzer provide an automated tool for the customer/customer NOC to analyze and detect potential access issues for a user(s)/group of users to access one or more applications (e.g., SaaS/Private Apps), such as will be further described below with respect to various embodiments.

Specifically, the disclosed techniques for the Application Access Analyzer (AAA) addresses various technical problems as will now be described. Mean Time to Detect (MTTD) and Mean Time to Recover (MTTR) for application (App) access issues are typically in hours, which can increase application downtime and adversely impact productivity of the customers/users and revenue for enterprises. Troubleshooting and debugging generally requires domain knowledge expertise. Further, co-relating and tracking multiple factors to perform root cause analysis (RCA) is often cumbersome and error prone when performed manually.

For example, an enterprise and/or cloud service provider having multiple hosted network services, large network infrastructure, and complex security policy configuration can encounter significant challenges to reduce MTTR of App access issues.

As another example, identifying RCA in an enterprise organization can generally require comprehensive checks of various domains, such as network connectivity, infrastructure reachability, infrastructure availability, and security policy reasoning.

The disclosed Application Access Analyzer (AAA) provides an effective and efficient solution to the above-described problems, as will be further described below.

FIGS. 5A and 5B illustrate an example interface for an Application Access Analyzer (AAA) in accordance with some embodiments. Referring to FIG. 5A, AAA illustrates a natural language (NL) query (NLQ) interface to operators to detect application connectivity, reachability (e.g., infrastructure/network reachability), and permission issues as shown at 502.

Referring to FIG. 5B, the disclosed AAA solution can provide an Actionable verdict for a query submitted by a user (e.g., operator) with comprehensive analysis and checks performed in distinct domains, such as Layer 3 (L3) network reachability, network topology, DNS, Authentication, and security policy (e.g., security policy configuration, such as for access rights for a user to a particular resource) as shown at 504. For example, the disclosed AAA solution can be used for identifying and pinpointing the root cause, which significantly reduces the mean time to detect and resolve application access issues (e.g., from hours to minutes). As another example, the disclosed AAA solution can generate a human consumable verdict and analysis, which generally does not require IT operators to have domain knowledge expertise to identify the root cause of an issue/problem.

Figure 6A:
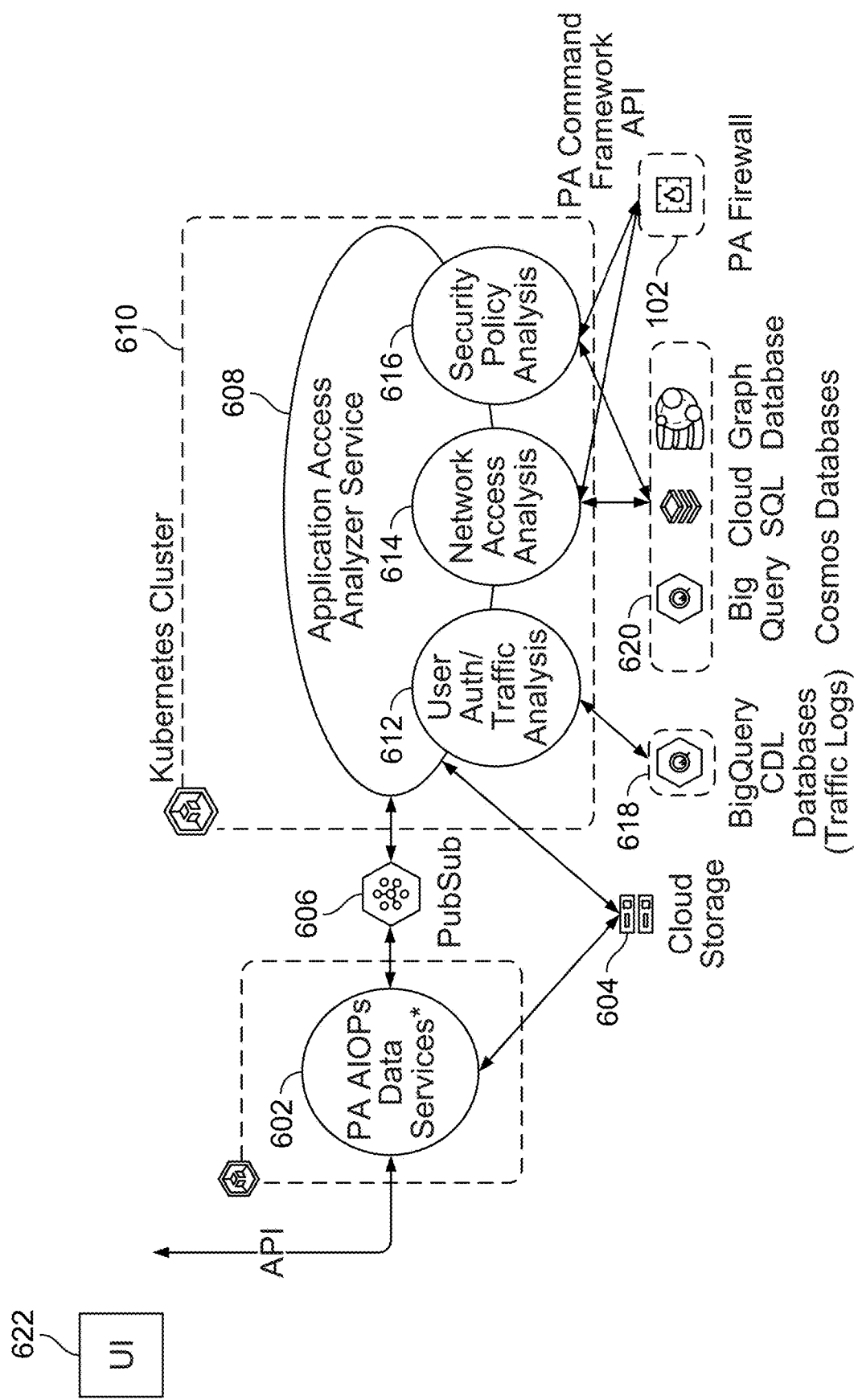
FIG. 6A illustrates a service architecture for the AAA in accordance with some embodiments.

FIG. 6A illustrates a service architecture for the AAA in accordance with some embodiments. The AAA Service uses SASE/Prisma Access Topology, Firewall Configuration, Security Policy, Firewall Network Operational State (e.g., Routing, Forwarding Information Base (FIB), etc.), and other relevant firewall and authentication logs collected by SASE/Prisma Access Insights/AIOPs platform for providing a comprehensive connectivity analysis. Specifically, FIG. 6A illustrates an example implementation of an Application Access Analyzer (AAA) Service shown at 608 and provides a high-level view of the various components and data sources that are used in providing information for an application connectivity analysis. The degradation and outages generally can occur due to various reasons, such as further described below.

In an example implementation, the AAA Service (608) provides an automated solution for isolating faults and reducing mean time to detect and remediate issues. Specifically, the AAA Service checks for issues with the following: User Authentication; App Access Topology; Network Services (e.g., DNS, Auth Servers, etc.); SASE Access Nodes (e.g., Prisma Access Nodes, such as Mobile Gateways (MUs), Portals, Remote Networks (RNs), Service Connections (SCs), etc.); Network Reachability/Connectivity (e.g., Routes, etc.); Security Policy Analysis (e.g., Formal Methods, such as for validating permissions/access to a network/services/resource, etc.); Logs from various different sources (e.g., SASE/PA nodes, VPN/GP logs, Traffic logs, etc.); and/or Known Incidents (e.g., known ISP outages, Cloud Provider outages, Internal SASE/PA issues including underlay connectivity problems, etc.) impacting the connectivity.

As similarly described above, the AAA Service can also automatically generate a human consumable and an actionable verdict (e.g., a summary report/alert). The analysis can cover the following: (1) Infrastructure Issues (e.g., SASE/PA internal tunnels, nodes, underlay routing, overlay routing, etc.); (2) Customer Network Services Issues (e.g., Reachability to a DNS server, LDAP, Radius, etc.); (3) Client Connectivity Issues, including VPN/GP Client Connectivity Issues (e.g., the AAA Service can utilize the ADEM (agent details and MTR) logs for analyzing client connectivity issues (e.g., ADEM is an endpoint agent-based solution that is commercially available from Palo Alto Networks, Inc. headquartered in Santa Clara, CA, or another commercially available or open source endpoint agent can be similarly used)); (4) SaaS Apps Connectivity Issues, including SaaS Apps Reachability Issues; and (5) Private Apps Connectivity Issues, including Private Apps Reachability Issues.

Figure 6B:
FIG. 6B is a table summarizing data sources used for example issues that are analyzed using the AAA Service in accordance with some embodiments.

FIG. 6B is a table summarizing the various different data sources used for example issues that are analyzed using the AAA Service (608) in accordance with some embodiments.

Referring to FIG. 6A, AAA Service 608 is implemented on a Kubernetes Cluster 610 as a container service to facilitate scalability (e.g., or another container-based or similar computing environment can be similarly used to implement the AAA service). AAA Service 608 includes the following components: a User Auth/Traffic Analysis component 612, a Network Access Analysis component 614, and a Security Policy Analysis component 616 (e.g., the network and security analysis playbook services can accept requests from the AAA Service). In an example implementation, the Playbooks are implemented as individual modules (e.g., implemented in Python or another high-level programming language) that perform specific User Authentication, Network Connectivity, and Security Policy Checks, such as further described below. AAA Service 608 is the core service that implements the User Connectivity checks. AAA Service 608 utilizes a plurality of network connectivity and security analysis playbooks, executing either locally or as playbook engine services, to gather evidence and determine the potential root cause of failures, such as will be further described below.

AAA service 608 is in network communication with a Cloud Storage 604 (e.g., a cloud-based data store, such as commercially available cloud-based storage solutions from Google Cloud, AWS, or another vendor can be used). User Auth/Traffic Analysis component 612 is in network communication with BigQuery CDL Databases 618 (e.g., storing traffic logs). Network Access Analysis component 614 is in communication with Cosmos Databases 620. Cosmos Databases 620 include a BigQuery database, a Cloud SQL database, and a Graph database as shown in FIG. 6A. Network Access Analysis component 614 and Security Policy Analysis component 616 are each in communication with a PA Firewall 102 (e.g., instance(s) of a commercially available firewall, such as the Palo Alto Networks (PA) firewall or another commercially available firewall) via an API (e.g., PA Command Framework API) for querying the firewalls (102), such as in real-time (e.g., querying operational state information of a firewall).

AAA service 608 is also in network communication with a PA AIOPs Data Services component 602. Specifically, AAA Service 608 is in network communication with PA AIOPs Data Services component 602 via a publish/subscribe (PubSub) communication mechanism as shown at 606.

As also shown in FIG. 6A, PA AIOPs Data Services component 602 is in communication with the user interface (UI) component 622 via an API. This container provides an API interface for the UI (e.g., an NL query UI). This service is a generic service that implements API for all PA AIOps services on the Cosmos platform. The AAA Service can expose specific endpoints to accept connectivity analysis requests from the UI and render corresponding results of the analysis. Further, the AAA Service provides a natural language (NL) query interface for users to analyze access issues (e.g., NL queries can be processed and sent to the AAA service as a structured query).

For example, the disclosed AAA Service can be used for checking connectivity between the following: (1) a User/Users/User Group to a SaaS application; (2) a User/Users/User Group to a Private Application hosted on premise data centers or on a remote branch office; (3) a User/Users/User Group to remote site connectivity (e.g., Remote branch (RN) or Data Center (SC)); (4) a Site to a Network; and (5) a Site to another Site.

Figure 6C:
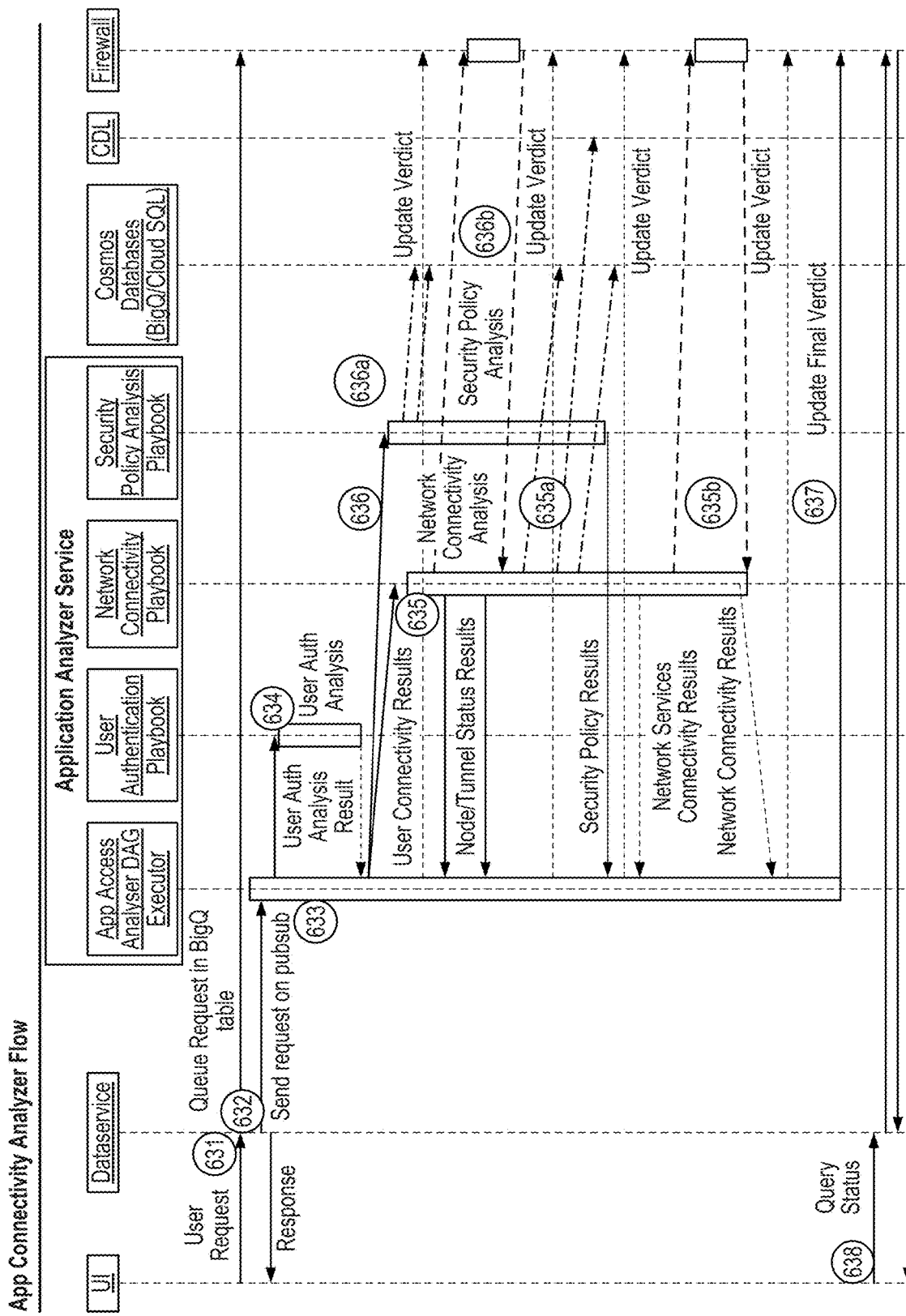
FIG. 6C is a sequence diagram for an App Connectivity Analyzer using the AAA Service in accordance with some embodiments.

FIG. 6C is a sequence diagram for an App Connectivity Analyzer using the AAA Service in accordance with some embodiments.

At 631, the Data service receives a 'user to app' connectivity query string. The UI accepts NLQ queries as similarly described above with respect to FIG. 6A.

At 632, the Data service creates a folder (e.g., a Google Cloud Service (GCS) folder) for each request and creates an entry in the AAA Query BigQuery (BQ) table. The UI can get the query status from the App Access Analyzer Query table. The Data service then posts the query string along with the GCS folder info to the AAA Service through a PubSub message. The final results of analysis are updated in the GCS folder and BQ table.

At 633, the AAA Service parses the query string and invokes one or more playbooks to analyze the user/users to application connectivity.

At 634, the Playbook Engine/Authentication Analysis Playbook gathers user authentication information. The results are published in the GCS folder and BQ table, and the playbook status is updated in the BigQuery table.

At 635, the Playbook Engine/Network Connectivity Analysis utilizes the network service analysis to check for network connectivity between a requested source and destination, and the verdicts can be updated as shown at 635A and 635B. The network service analysis is run for the following: Analyzing Network Services endpoint (e.g., DNS server, Auth Server, etc.) connectivity; and App Connectivity (e.g., verifying user to app connectivity). The network connectivity analysis uses the following sources for analysis: Instance Status, Tunnel Status, Instance Metrics, etc. (e.g., available on the Cosmos Platform); Cortex Data Lake (CDL) logs (e.g., a data repository for storing user-app traffic logs); and Firewall routing information. The results from the analysis and the Playbook status are stored in the GCS folder and BQ table.

In an example implementation, the User to Application Connectivity analysis utilizes the following Playbooks: (1) User Authentication Analysis; (2) Network Service Connectivity Analysis; (3) Network Service Security Policy Analysis; (4) User Network Connectivity Analysis; and (5) User Security Policy Analysis, such as will now be further described below.

In this example implementation, the User Authentication Analysis Playbook analyzes firewall auth logs for user authentication status. The User Authentication Analysis Playbook utilizes the following input parameters:

```
{
  'tenant_id': <tenant_id>,
  'sub_tenant_id': <sub_tenant_id>,
  'user_name': <user name string>,
  'start_time': <start timestamp>
  (optional - defaults to current time - 15 mins),
  'end_time' : <end timestamp> (optional - defaults to current time)
}
```

The User Authentication Analysis Playbook returns the user auth status, device information, and gateway information for performing further analysis.

In this example implementation, the Network Service Connectivity Analysis Playbook utilizes the following input parameters:

```
{
  'tenant_id': <tenant_id>,
  'sub_tenant_id': <sub_tenant_id>,
  'source_ip': <source IP>, (Optional)
  'destination_ip': <network service endpoint IP>,
  'start_time': <start timestamp>
  (optional - defaults to current time - 15 mins),
  'end_time' : <end timestamp> (optional - defaults to current time)
}
```

The network service IP addresses for the Auth Server, DNS server, etc. are fetched from the user provided configuration.

In this example implementation, the User Network Connectivity Analysis Playbook utilizes the following input parameters:

```
{
   'tenant_id': <tenant_id>,
   'sub_tenant_id': <sub_tenant_id>,
   'source_ip': <Source Public IP address >,
   'destination_ip' : <Destination FQDN or IP Address>,
   'gw_info': {
      'cloud_provider': <cloud provider info AWS | GCP >,
      'cloud_region_name': <region name>,
      'instance_id': <gateway instance id>
   }
   'start_time': <start timestamp>
   (optional - defaults to current time - 15 mins),
   'end_time' : <end timestamp> (optional - defaults to current time)
}
```

For example, the DNS lookup on the firewall can map to multiple IP addresses. The connectivity check analysis is performed for all the IP addresses. If all of the IP addresses are reachable, then the Connectivity check passes. If any IP address reachability fails, then a Partial failure with associated analysis is returned in the result. If all IP addresses are not reachable, then the Connectivity check fails.

In this example implementation, the AAA Service calls a Formal Security Policy Analysis component (e.g., implemented as a Formal Security Policy Analysis library) with the following input parameters:

```
{
   "tenant_name": "<tenant-name-string>",
   "tenant_id": "<tenant-id-string>",
   "sub_tenant_id": "<sub-tenant-id string>",
   "location": "<PA location - like "US West, US East, Ireland, ...>",
   "node type id": 48 (Remote Network/FWaaS), 49 (Mobile Gateway/GPaaS), 50 ("Mobile User Portal/GPaaS),
51 ("Service Connection/SC"), 153 ("Explicit Proxy")"
   "traffic_rule_matches": [
   {
      "rule_matched_uuid": "" or "rule_matched_uuid found in CDL traffic logs",
      "rule_matched": "" or "rule_matched found in CDL traffic logs,
      "Source Zone": "trust, untrust or any",
      "Negate Source Address": "no",
      "Source Address": "source ip address or a subnet for users query",
      "Source User": "any, user found in CDL logs or login_user_name provided in the query",
      "Source Device": "endpoint_device_name or any",
      "Destination Zone": "trust, untrust or any",
      "Negate Destination Address": "no",
      "Destination Address": "almost always specified using the destination ip address",
      "Destination Device": "any",
      "Application": "any or container_of_app or application found in CDL traffic logs",
      "Service": "any or specific category",
      "URL Category": "any or url_category as found in CDL traffic logs"
   },
   ...
   ]
}
```

The formal method security analysis function returns the following result.

```
{
   "summary_results": {
      "config_info": "Panorama Job ID",
      "config_model": "2022-03-31 19:47:28 UTC",
      "result": "Yes"
   },
```

-continued

```
   "policy_matches": [{
      "Disabled": "no",
      "Name": "Allow-All",
      "Source Zone": [
         "any"
      ],
      "Negate Source Address": "no",
      "Source Address": [
         "any"
      ],
      "Source User": [
         "any"
      ],
      "Source Device": [
         "any"
      ],
      "Destination Zone": [
         "any"
      ],
      "Negate Destination Address": "no",
      "Destination Address": [
         "any"
      ],
      "Destination Device": [
         "any"
      ],
      "Application": [
         "any"
      ],
      "Service": [
         "any"
```

-continued

```
      ],
      "URL Category": [
         "any"
      ],
      "Action": "allow",
      "Profile": "none",
      "Rule UUID": "ce98dcae-df1e-4294-9443-3d58acc9854a"
```

-continued

```
    },
    ...
    ]
}
```

The AAA Service uses the security policy summary results to determine whether the security policy allows or denies access.

In this example implementation, the AAA Service checks for all user configured DNS servers. The AAA Service depends on the ADEM probe (ping and curl) test results (e.g., active probing for performing health analysis of Apps, such as SaaS/Private Apps) and collects unique DNS servers from the test results and checks or performs for the following: (1) Connectivity of the DNS server from each ingress node (e.g., Mobile Gateway (MU) or Remote Network (RN)) instance; (2) L3 forwarding path trace for the DNS server by running test FIB lookup command for each unique DNS server IP discovered in the test result; (3) Updates the topology for the DNS server connectivity based on L3 forwarding path; and (4) Queries each ingress firewall instance to look up match-rules for each DNS server. The DNS analysis result is returned in the result dictionary under key 'DNS' as follows: for each DNS server, the result includes match-rules highlighting which domain names are resolved by a particular DNS server, the L3 forwarding result, and security policy (if any) that prevents connectivity to the DNS server.

```
{
    ...
    "dns": {
        "status": "Ok",
        "health": "Good",
        "security_policy": { },
        "l3_forwarding": { },
        "servers": {
            "DNS server ip address 1": {
                "status": "Ok",
                "health": "Good",
                "nodes": {
                    "MU Gateway 1 FQDN": {
                        "status": "Ok",
                        "health": "Good",
                        "match-rule": {
                            "name": "Private App DNS Server",
                            "domain-names": ["*.panw.local",
                            "*.paloaltonetworks.local"]
                        }
                    },
                    "MU Gateway 2 FQDN": {
                        "status": "Ok",
                        "health": "Good",
                        "match-rule": {
                            "name": "Private App DNS Server",
                            "domain-names": ["*.panw.local",
                            "*.paloaltonetworks.local"]
                        }
                    }
                }
            },
            "DNS server ip address 2": {
            }
        }
    }
    ...
}
```

In this example implementation, the AAA Service depends on the ADEM test result to check the Auth server connectivity. Specifically, the AAA Service queries the ADEM ping/curl test results for unique auth servers. The AAA Service summarizes the Auth server status for each ingress node. The auth server results are returned in the result dictionary under key "auth."

```
{
    ...
    "auth": {
        "status": "Ok",
        "health": "Good",
        "security_policy": { },
        "l3_forwarding": { },
        "servers": {
            "AUTH server ip address 1": {
                "status": "Ok",
                "health": "Good",
                "auth_type": "LDAP",
                "test_type": "ping" // or "curl"
                "nodes": {
                    "MU Gateway 1 FQDN": {
                        "status": "Ok",
                        "health": "Good"
                    },
                    "MU Gateway 2 FQDN": {
                        "status": "Ok",
                        "health": "Good"
                    }
                }
            },
            "AUTH server ip address 2": {...}
        }
    },
    ...
}
```

At 636, the Security Policy Analysis performs a Formal Method analysis of security policies for the following: Network Service Endpoint connectivity; and App connectivity, and the verdicts can be updated as shown at 636A and 636B. The results from the analysis and the Playbook status are stored in the GCS folder and BQ table.

At 637, the AAA Service updates the status in the GCS folder and BQ table based on the results received from each playbook.

At 638, the AAA Service summarizes the connectivity analysis with the final results and updates the analysis status as completed.

III. Security Policy Analysis

Introduction

Formal methods are techniques, often supported by tools, for developing software and hardware systems. Given a model of a system (often an abstract model of a system), and a language to specify desired properties of the system, proofs can be generated to exhaustively verify that the specified properties are satisfied. If the proof is carried out substantially by a machine, the verification can be referred to as automatic (also referred to as "automatic reasoning"). Formal verification is applicable to circuits, protocols, software, etc. As will be discussed variously below, it can also be applied to permissions and/or other security policy related information/systems, such as privileged identity management (PAM) and identity access management (IAM). By coupling a model with a language, one is able to not only analyze a system, but also optimize it and reason about it. This allows for semantic modeling of intent, and building a model of computation for an entire security policy (and/or networking configuration), as will be described in more detail below.

Figure 7:
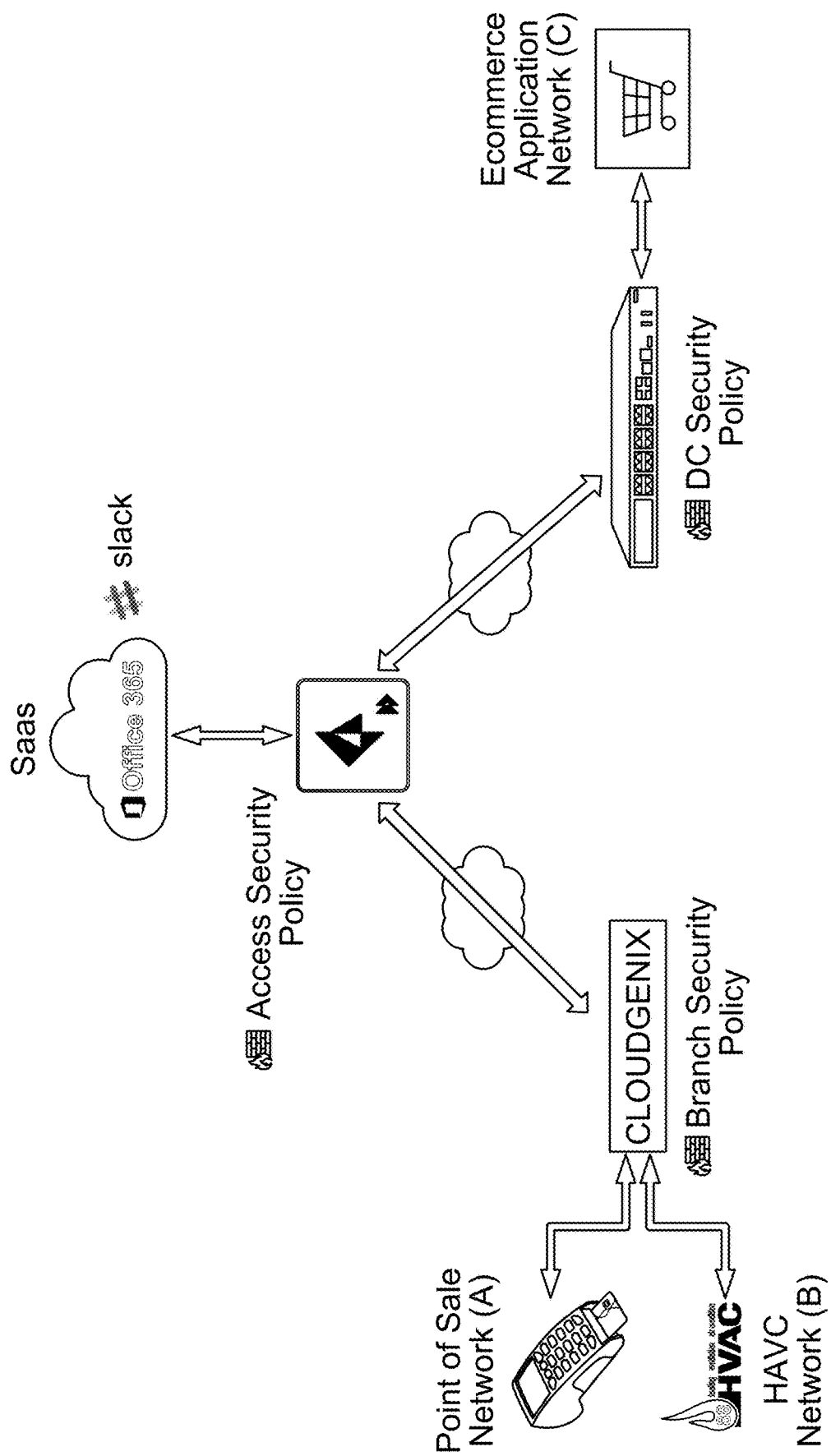
FIG. 7 illustrates the AAA in operation in accordance with some embodiments.

FIG. 7 illustrates security policy and enforcement at different parts in a network. A given security policy can be deployed at multiple points along the stream. Two example ways formal verification can be used are in control/management plane verification (CPV) and in data plane state verification (DPV). In general, CPV has intent/specification/behavioral/instantiated views. An example deployment can be performed in a secure access service edge (SASE) such as Prisma Access. In an example deployment, each firewall or other appliance regularly provides (e.g., as a heartbeat every five minutes) operational data as well as core policy information from the management plane, helping determine whether the intent of the enterprise (e.g., block certain access or allow certain access) is being realized.

DPV generally has concrete/compiled/structural/instantiated views. An example deployment is one performed in LUTs/security processing nodes (SPNs) and uses a poll-and-process architecture. CPV can answer questions, with guarantees about current and future state of the network. DPV can usually answer a subset for only the current state of the network. CPV can provide proactive guarantees, before the configuration is pushed/deployed, unlike DPV.

Referring to Figure FIG. 7, an example of a potential attack is as follows. Nefarious individuals could attempt to compromise a heating, ventilation, and air conditioning (HVAC) network, and from there, gain access to a point of sale network and then into a data center. Formal methods can help verifiably determine whether such an attack is possible. Examples of questions that can be answered using formal methods include:

Reachability: Can retail store branch (RSB) talk to credit card app (CCA)? ASSERT (RSB can talk to CCA). Is the DNS server globally reachable?

Connectivity: ASSERT (RSB can talk to CCA on TCP port 443).

Isolation/Security: Segmentation: Are two subsets, tenants, or application groups isolated from each other with respect to all traffic? Is all communication within specified boundaries secure? ASSERT (RSB can talk to CCA ONLY on TCP port 443). ASSERT (HVAC network cannot talk to CCA).

Security/Audit/Compliance: Can (or has) an unencrypted packet go (gone) between two branch offices now (in the past six months)?

Fairness: Do spine routers treat all destinations identically?

Robustness: Will any interface failure lead to connectivity loss?

Reliability: What is the impact of an external event on internal connectivity?

FIG. 8 illustrates an example of a simplified security policy. It is written using match criteria which describe who can talk to whom, along which ports, and what activity is allowed to occur. In this example, the HVAC network, the retail store branch (RSB) network, and the credit card application (CCA) of FIG. 7 are present, and can have different associated subnets. Suppose the RSB has the subnet 164.1.* and that the CCA has the subnet 192.1.*. Collectively, there are $2^8 \times 2^8 2^8 2^8 = 1,024$ combinations of servers across those networks.

Examining an individual rule, P2, within the security policy: where the traffic originates from the RSB, and the destination is any of: RSB, CCA, or D1 (another specified destination), and also the traffic is over port 443, the traffic should be allowed.

Firewalls are provided with security policies such as are shown in FIG. 8 (e.g., a collection of rules P1-P5) along with clear instructions on how to interpret information such as HVAC/RSB/CCA membership. The rules are applied in a priority order sequence. So, during a session, as a firewall starts to see information, it looks up the source IP address and determines, for example, which subnet it matches. Suppose an incoming connection has a source IP address that matches CCA. If the destination is either RSB or CCA, then traffic is allowed (per rule P3). If, instead, the destination is D1, then the firewall continues checking rules until it finds a match. In this case, rule P5 is matched, and the traffic will be denied.

The policy shown in FIG. 8 can be expressed in Boolean terms as follows:

$$\{\text{HVAC,RSB,CCA},S1,S2,S3\} \times \{\text{HVAC,RSB,CCA},D1\} \times \{443, p1,p2\} \rightarrow \{\text{allow,deny}\}$$

In this example, the source field can take one of six values (i.e., has cardinality six), and the destination can have one of four values. The result is a three-dimensional Boolean space mapping to a two dimensional Boolean space, mapping to a two dimensional Boolean space, into a single action ($B^3 \times B^2 \times B^2 \rightarrow B$).

The sets can be enumerated-converted into an if-else like clause which describes how the firewall is operating. An example is shown in FIG. 9A. If source is equal to HVAC and destination is equal to HVAC or to D1, then allow. As shown in FIG. 9B, this can be notated as an equivalent if else series of cascaded clauses and compiled (e.g., for use with a tool such as Verilog). FIGS. 9C-9D are graphical representations of the Boolean encoding.

As will be described in more detail below, a policy analyzer tool (authored in an appropriate scripting language in some embodiments, such as python) can consume pre-, post-, and default security policies, along with various metadata, and build a model. It can handle addresses and address groups (nested). It can handle applications and application groups (nested). It can handle services and service groups. It can resolve DNS queries. The policy analyzer can be used for a variety of purposes, including post change continuous analysis and a variety of pre change simulations. In an example implementation, the policy analyzer tool makes use of two components: a frontend normalizer and a backend solver. The frontend normalizer (also referred to as a canonicalization layer) consumes behavioral/realized specifications and builds models of computation for a system based off of different input formats. Policies are normalized as propositions/propositional formulae. Three examples of source of information for frontend normalization include RDS XML, exports from Panorama (e.g., of dynamic lists), and exports from a firewall.

The backend solver models the specification as a predicate (e.g., first-order/predicate logic). Hierarchical aggregation of individual policies is expressed in propositional logic. True/false answers are returned as a function of symbolic inputs, and various logical operations are available (e.g., $\Rightarrow$, $\Leftrightarrow$, $\forall$, $\exists$). A variety of technologies can be used for a backend solver. One example is the CVC4 open source public domain theorem prover for satisfiability modulo theories (SMT) problems. Another example is the Z3 Theorem Prover. The backend solver is often dependent on domain specific data structures, which allows for algorithms and structured query languages to be layered on top.

Policies are written, in some embodiments, in terms of strings. An example way of expressing various aspects of the policy shown in FIG. 8 for use by an SMT solver is as follows:

src=HVAC is sterm=mkTerm (EQUAL, src, "HVAC")
dst=HVAC,D1 is dterm=mkTerm (OR, mkTerm (EQUAL, dst, "HVAC"), mkTerm (EQUAL, dst, "D1"))
P1=mkTerm (AND, sterm, dterm)
Policy=mkTerm (Or, P1, mkTerm (AND, mkTerm (NOT, P1), P2))
etc.

Automated Reasoning for Security Policies

FIG. 10 illustrates various examples of potentially problematic security policies. The first policy is overly permissive. Suppose that Alice is a member of the marketing group and also is under investigation (e.g., because an administrator has determined that she, or her account, is behaving in a suspicious manner). Policy 21 denies Alice, specifically, access to the corporate wiki (which includes sensitive internal business information). However, the more permissive policy (10) takes precedence (will be evaluated first), allowing Alice access to the wiki due to her group membership (i.e., Policy 21 will not be reached). In the second policy, the scenario is reversed, and results in an inadvertent block. Here, Alice's access to a different application (e.g., sfdc) is blocked, even though, as a common marketing tool, her access should have been allowed along with the rest of the marketing department. The third policy is redundant. Bob is in the engineering group. Both Bob and members of the engineering group have explicit rules allowing them access to the wiki. The final policy is missing an enforcement component. In this example, corporate or other governance rules/regulations may require that DLP inspection always be performed. Here, however, that inspection requirement is not set. Each of these problems (as well as others) can be detected and mitigating using embodiments of policy analysis techniques described herein.

These approaches can help reduce operational costs, both for a provider of security services (e.g., operating security platform 122) and a consumer of those services (e.g., an enterprise customer, such as one operating network 140). The techniques described herein can enhance troubleshooting through proactive detection and remediation, including by looking at the policy and configuration space. The policies involved can be security policies, plain network configurations, and/or policy at a very behavioral abstract level (e.g., as seen in an RDS store or state as deployed within firewalls). A way of expressing this is as the Cartesian product: (Security+Network)×(Policy/Config+State). These approaches can also be used to determine enforcement status (e.g., whether an intent has been deployed/realized as expected). And, to reduce change risk (determining the net repercussions of large changes, identifying whether undiscovered contradictions within the proposed change will actually increase the attack surface). The approaches can also be used in the compliance/audit context: allowing for automated reasoning about policies and being able to provide strong guarantees about correctness. And, the approaches can be used to help with historical troubleshooting (e.g., a configuration from three weeks ago appeared correct, but the current configuration has a problem—how to perform a differential analysis). Yet another way the approaches described herein can be used is to examine multi-domain/transitive analysis scenarios).

In some embodiments, system 122 includes a core formal engine that supports a structured query language against a complete policy object model. Various example demonstrations described herein can be executed using embodiments of the core formal engine.

Example: Shadowing Analysis: Probable Vs. Definitive

Suppose there exists a Policy 100, defined as follows:
Policy 100: user={a,b,c}, action=Allow; Logs: hits=0
This policy states that if traffic from any of users A, B, or C, is seen, their traffic should be allowed to pass through. However, in this scenario, suppose that according to logs, there are zero hits for this policy. One reason this could happen is because one of the policies in the range 1-99 shadows Policy 100 (i.e., the higher up policy is more permissive/expressive than Policy 100, making Policy 100 redundant). Examples of policies where this could occur are as follows:
Policy 35: user={a,b}, action=Allow; Logs: hits=54
Policy 47: user={b,c}, action=Allow; Logs: hits=5
Policy 100: user={a,b,c}, action=Allow; Logs: hits=0
In the above scenario, Policy 35 covers users A and B, while Policy 47 covers users B and C. Collectively, Policies 35 and 47 cover users A, B, and C, meaning that Policy 100 will never be triggered.

A second reason that a rule could receive zero hits is that traffic to date has not triggered the policy. It could be because the rule was recently added, and/or that the traffic is rare (e.g., applying to a user that rarely logs in, an application that is rarely used, etc.).

By using formal methods, it can be provably and exhaustively established whether Policy 100 is shadowed. And, if so, a recommendation can be made (e.g., by security platform 122 to an administrator of data appliance 102) to eliminate the policy. Further, those policies that are collectively responsible for the shadowing can be presented (e.g., surfacing that Policy 100 is shadowed by the combination of Policy 35 and Policy 47). In this example, all three policies have an allow action (the actions are aligned). It could also be the case, however, that Policy 35 and 47 are deny actions, while Policy 100 is an allow (or some other combination). Formal methods can identify this situation as well.

Example: Contra-Shadowing

Policies are typically evaluated from top to bottom, with the highest priority rule being examined first. In some situations, however, low priority rules may be more permissive.

Suppose there exists a set of policies as follows:
Policy 1 user={a}, action=Allow; Stats: user=a, hits=10
Policy 2: user={a,b}, action=Allow; Stats: user=b, hits=5
Policy 3: user={a,b,c}, action=Deny; Stats: user=c, hits=3
Policy 1 is very specific to user A. Policy 2 covers users A and B, but since Policy 1 covers user A, Policy 2 will only trigger with respect to user B. Similarly, while Policy 3 covers users A, B, and C, it will only trigger with respect to user C. This is a potential case of three progressively coarser policies. The second policy could have explicitly been written just for B and the third policy could have been written explicitly just for C. Here, there is a contradiction in intent because the first two policies recommend that users A and B be allowed to access the system, while policy for C is set to deny. Contra-shadowing analysis, which can be performed by embodiments of security platform 122 can establish that Policy 2 contra-shadows Policy 1 (is an intent over-specification) and that Policy 3 contra-shadows Policies 1 and 2 (is an intent contradiction). The analysis can be performed in a live system (e.g., making recommendations to an administrator and guiding the administrator to make any desired changes) and can also be performed in a non-interactive, offline/periodic basis.

Figure 11:
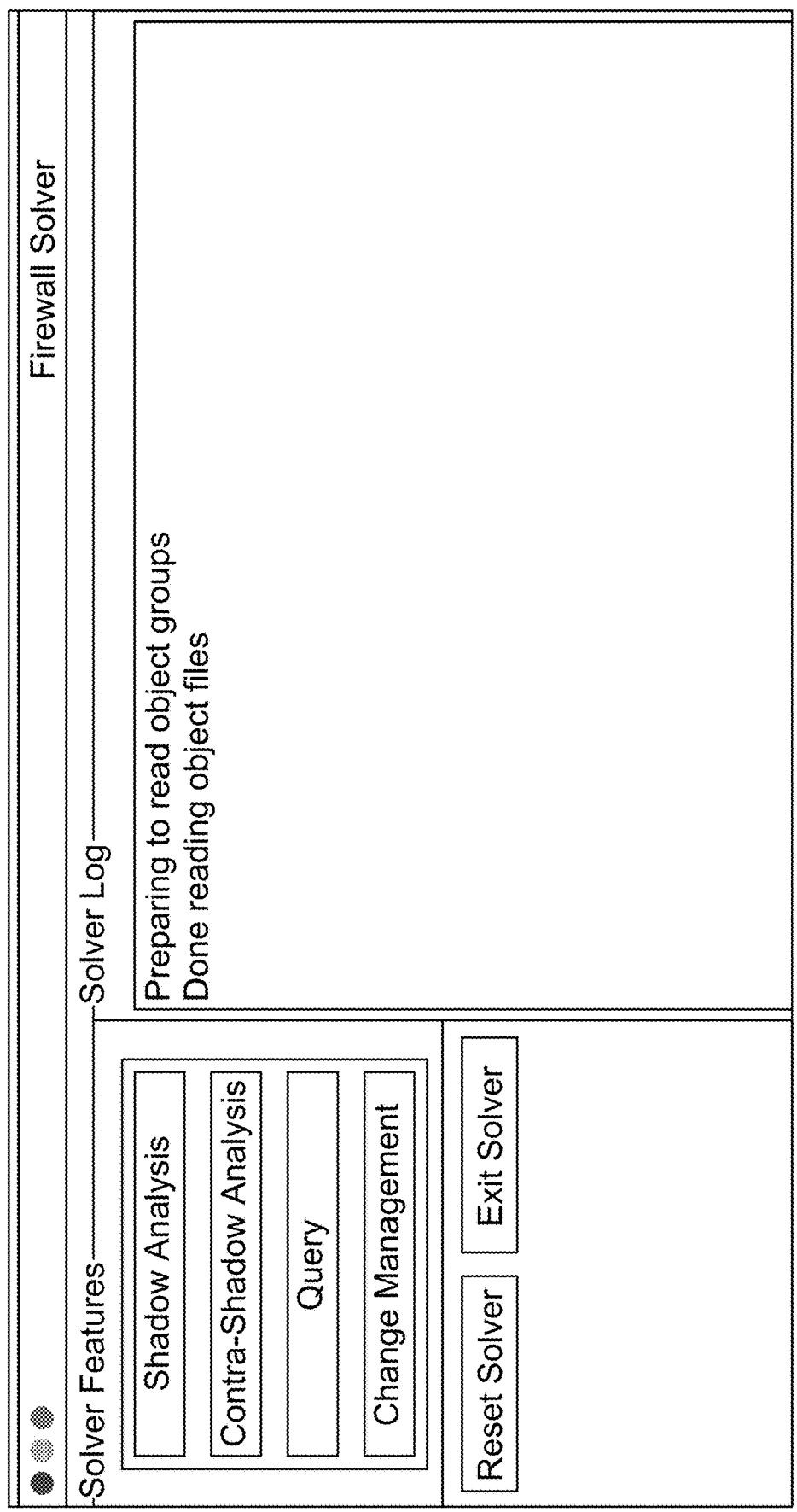

FIG. 11 illustrates an example interface for evaluating firewall security policies. Examples of analysis that can be performed include shadow analysis and contra-shadow analysis. Queries and change management can also be performed. A user of the interface points the tool to a directory that contains security policies, as well as any other applicable information such as address objects, filters, service resolution information, etc., exported in appropriate formats, such as CSV files. Examples of fields include source zone, source address, source information, profile, source user, destination information, action, etc. Other fields can also be included (e.g., device type, device identifier). Such information can be manually provided, and/or can also be obtained from a running configuration (e.g., as provided by the running system, or as provided by another tool, such as Panorama).

Figure 12:
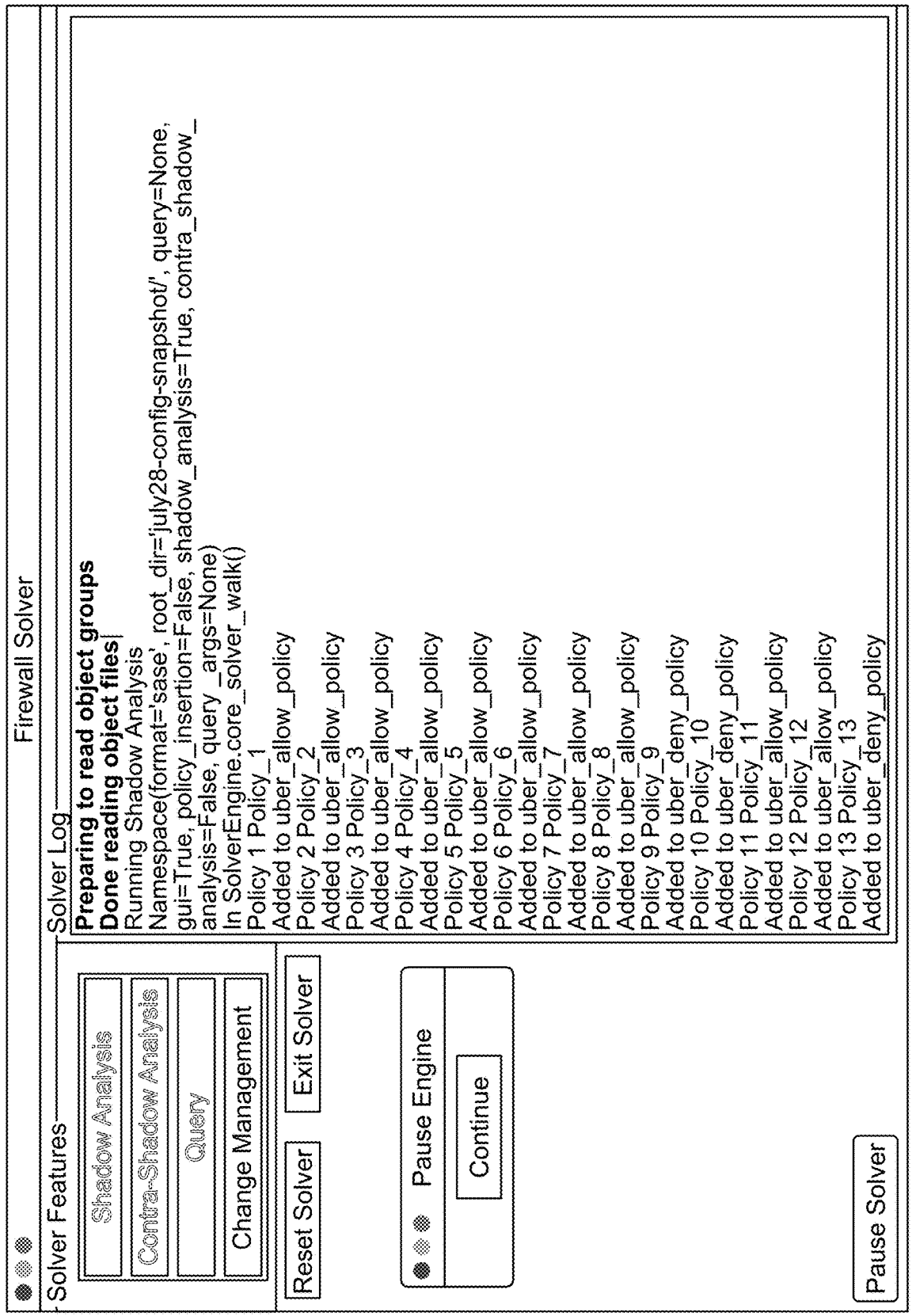

In the interface shown in FIG. 12, the user has loaded files and elected to begin performing shadow analysis. The tool then begins building a model, adding each policy in priority order, building a Boolean representation (e.g., of IP addresses, etc.). In the example shown in FIG. 13, when processing Policy 30, a determination is made that it is shadowed by Policy 28. In particular, Policy 30 is made redundant in an overspecification context by Policy 28. A potential reason for this to have occurred is that originally Policy 30 was implemented, using a list of IP addresses. At some point, the name of the list changed, and a new list was constructed (and used by Policy 28). The list of destination IP addresses under Policy 28 is a superset of those listed under Policy 30. The other fields are identical (e.g., source zone, application, etc.).

As the analysis continues, another problem is discovered, as illustrated in FIG. 14. In particular, an intent contradiction has been found. Policy 61 shadows out Policy 63, but Policy 61 is a "deny" action while Policy 63 is an "allow" action. There are redundancies in some of the source addresses, but also with respect to the applications. The shadowed out policy (Policy 63) has four stated applications, while the shadower (Policy 61) applies to "any" applications. A reason this situation might occur is that rule 61 was added during an emergency (e.g., an attack or breach) to rapidly block traffic. But, subsequently, it was forgotten that Policy 63 existed, and cleanup did not take place. Such situations can also arise where, for example, a first administrator makes implements a rule, without documentation. If that administrator leaves, a new administrator may not be aware of the first rule when implementing a redundant rule. A recommendation can be made to delete Policy 63 as it is redundant.

Figure 15:
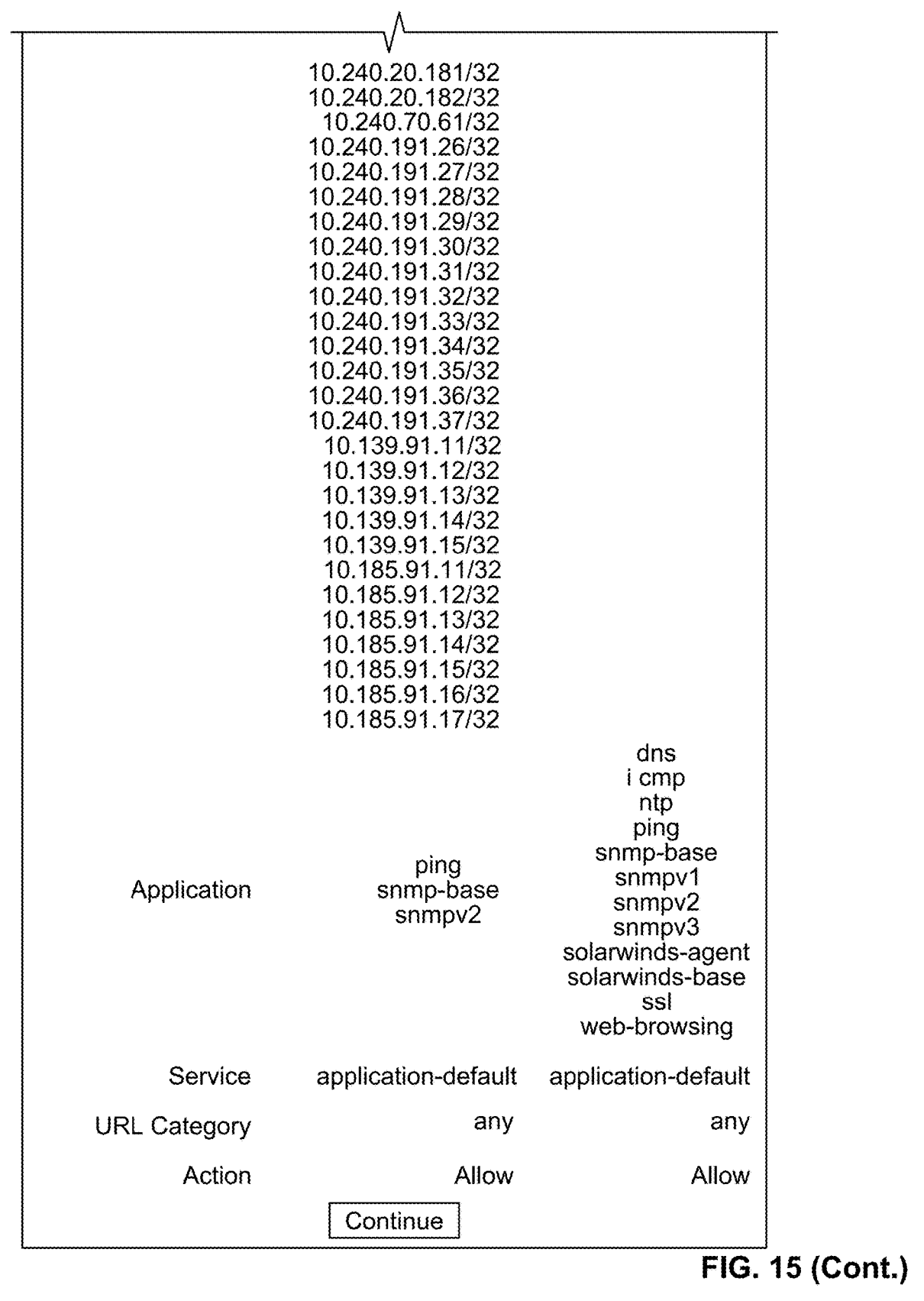

Another example of a shadowed policy is shown in FIG. 15. Of note, Policy 64 enumerates specific IP addresses, all of which are contained within the 10.0.0.0/8 specification in Policy 25 (i.e., an intent over-specification). Also, the list of applications in Policy 64 are a subset of those included in Policy 25. Policy 25 shadows out Policy 64. A recommendation can be made that Policy 64 be deleted. Other recommendations/reporting can also be provided. As an example, continuous analysis of policies can be performed, and periodic reports made regarding any shadowing or other issues. Recommendations can be made, and as applicable, tools provided to help an administrator resolve issues. As one example, where a policy is fully shadowed by another, a recommendation can be made to delete the redundant policy (or merge the policies into a single policy). As another example, the administrator can be presented with the option of changing rule priority (e.g., swapping Policy 64 and 25). The administrator can opt to leave the rules alone, as well, but at least can make an informed decision to do so. A benefit of continuous monitoring is that, once an administrator makes a change, they can verify that the change has resolved the issue (and not created/uncovered new issues).

Example: Connectivity Analysis and Query Language

Figure 16:
Figure 17:
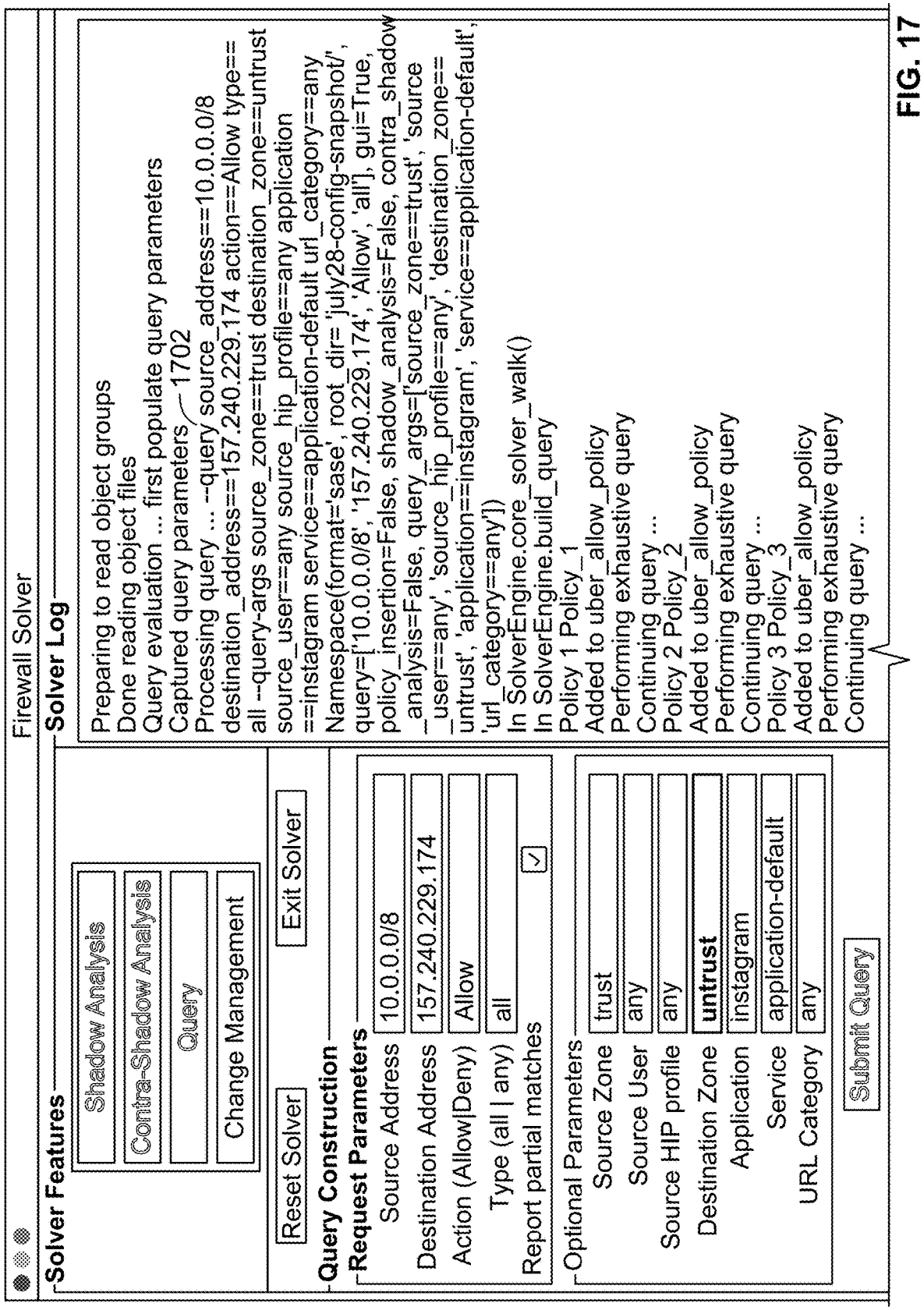

In addition to identifying instances of shadowing and contra-shadowing in existing policies, another feature provided in various embodiments is the ability to perform queries. One example of query usage is to perform connectivity analysis (e.g., given a policy specification, which if any existing policies would be contradicted). The following is an example of a query that can be used to determine how a user accesses Instagram. The query is constructed that lists the corporate private network as the source (representing 224 addresses), and Instagram's IP address is the destination. Other information, such as FQDN information can also be used. The action is allow, the type of traffic is any type, and some additional arguments are included (e.g., source zone, destination zone). APP-ID can be used, if desired, to specify particular applications or types of applications (e.g., "social-networking"). String fields can be regular expressions (e.g., source_user==*alice*). As needed, pre-processing and object/active directory/LDAP resolution is performed:

- query source=10.0.0.0/8 destination=157.240.229.174 action=Allow type=all -query-args source_zone=trust destination_zone=untrust application=instagram service=application-default One way of executing the query is by clicking on the "Query" button of FIG. 16 and populating fields in the Query Construction region. When the user hits "Submit Query," a query similar to that shown above is automatically generated and submitted, as shown in FIG. 17. As with the shadow/contra-shadow analysis, the analyzer tool evaluates the provided firewall configuration information (and other applicable information) and builds a model.

FIG. 18 illustrates a partial query contradiction. Policy 59 enumerates a set of internal servers (e.g., SolarWinds servers) for which access is limited/restricted. If a user on any those enumerated servers attempts to access a destination that is outside of the three sets of networks enumerated in region 1802, traffic will be blocked. At this point, the administrator can select "block and continue"-allowing Instagram traffic as intended, except on any of the servers to which Policy 59 applies. The query can then continue, identifying any further policies which would be implicated.

FIG. 19 illustrates another partial query contradiction. In this example, Policy 101 completely blocks a particular groups of users, having particular HIP profiles, from any network access. The administrator can again click "block and continue" to continue the query.

Example: Policy Change Management

Features described above, such as shadowing analysis and connectivity analysis, along with a structured query language can be used to evaluate a proposed change as a query against, or in the context of, a current policy. Example use cases for policy change management include performing a check before a rule is created/updated/deleted, performing a check after a rule is created/updated/deleted, and performing "what if" analysis (e.g., trying out a rule before applying it).

Figure 20:
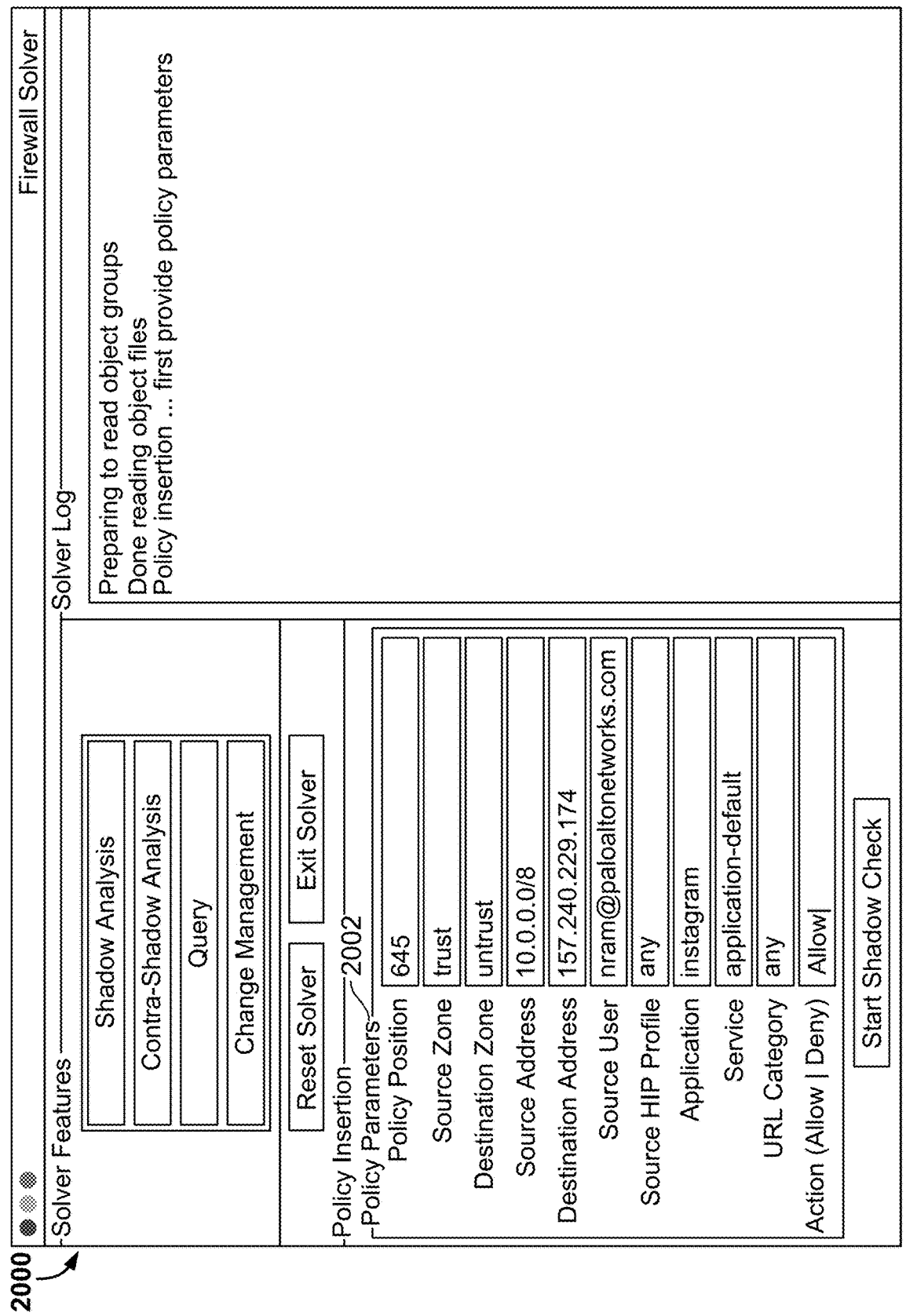

Suppose a new employee (e.g., in the marketing department), Nancy Ram, would like to be able to access Instagram from the corporate network. Interface 2000 can be used to determine whether a new policy that an administrator intends to add is redundant (i.e., Nancy is already able to access Instagram without any new rules being made). In the example shown in FIG. 20, an administrator has populated policy parameters in region 2002. One of the parameters is a priority "645" for the proposed new rule. When the administrator clicks "Start Shadow Check," a query such as the below will be generated and can be run against current firewall configuration:

- policy source==10.0.0.0/8 destination==157.240.229.174 action==Allow -policy-args source_user==nram@paloaltonetworks.com source_zone==trust destination_zone==untrust application==instagram service==application-default As with the example shown in FIG. 18, this query will be a partial conflict with Policy 59 (i.e., Nancy will not be able to access Instagram from any of the servers enumerated in Policy 59). Policy 101, however, will not be a conflict, unless Nancy happens to be a member of the groups listed at 1902 and uses one of the enumerated source HIP profiles.

As illustrated in FIG. 21, a match is found with Policy 248, meaning there is no need to insert a new rule to give Nancy Instagram access-she already has it (subject to the constraints of Policy 59).

Example: Segmentation Analysis

Suppose an enterprise has a set of internal Solarwinds servers and desires traffic control between other internal servers (on the 10.0.0.0/8 subnet) and the Solarwinds servers. The following is an example of a query that can be run:
- query source==Solarwinds_servers_alias destination==(10.0.0.0/8-Solarwinds_servers_alias) action==Deny type==all In this example, "Solarwinds_servers_alias" is an alias that expands to approximately 400 source IP addresses. The destination is all other servers (10.0.0.0/8 less those in the alias). The goal of the query is to determine which (if any) rules are implicated by such traffic). Suppose the following policies are returned:

Query partial block: Policy A Inter FW Rule
Query partial block: Policy B Solarwinds_Monitor_low-risk_Custom
Query partial block: Policy C Solarwinds_monitoring-_to_Internal_low-risk
Query partial block: Policy D Solarwind-to-Internal_SSL_Any
Query success: Policy E SolarWinds_To_Internal_Block A partial block means that some traffic is allowed between the Solarwinds servers and other internal servers. Policies A-D correspond to various low risk/monitoring activities. Policy E is a catchall that blocks the remainder of traffic. From an audit or security posture standpoint, the purpose behind each of Policies A-D can be defended (i.e., allowing traffic for limited purposes and in limited contexts), and the "query success" result for Policy E indicates that all other traffic is blocked. This scenario is also a contra-shadow (also referred to as a reverse shadow) scenario in that Policy E blocks everything (after the four previous allows). However, this is an intentional policy choice which can be confirmed during an audit.

In various embodiments, security platform 122 includes a repository of invariants which administrators (e.g., of network 140) can modify/augment from current policies, queries, standards of practice, etc. The invariants can be used to periodically check policy (e.g., every morning at 4 am) to make sure that policy drift has not occurred. Examples of such invariants include: block all Tor traffic except for members of the research group on research nodes, block all Whatsapp file transfers, guest WiFi in retail stores cannot access the data center, etc. If any checks fail, an alert can be generated, a report can be provided, etc.

Figure 22:
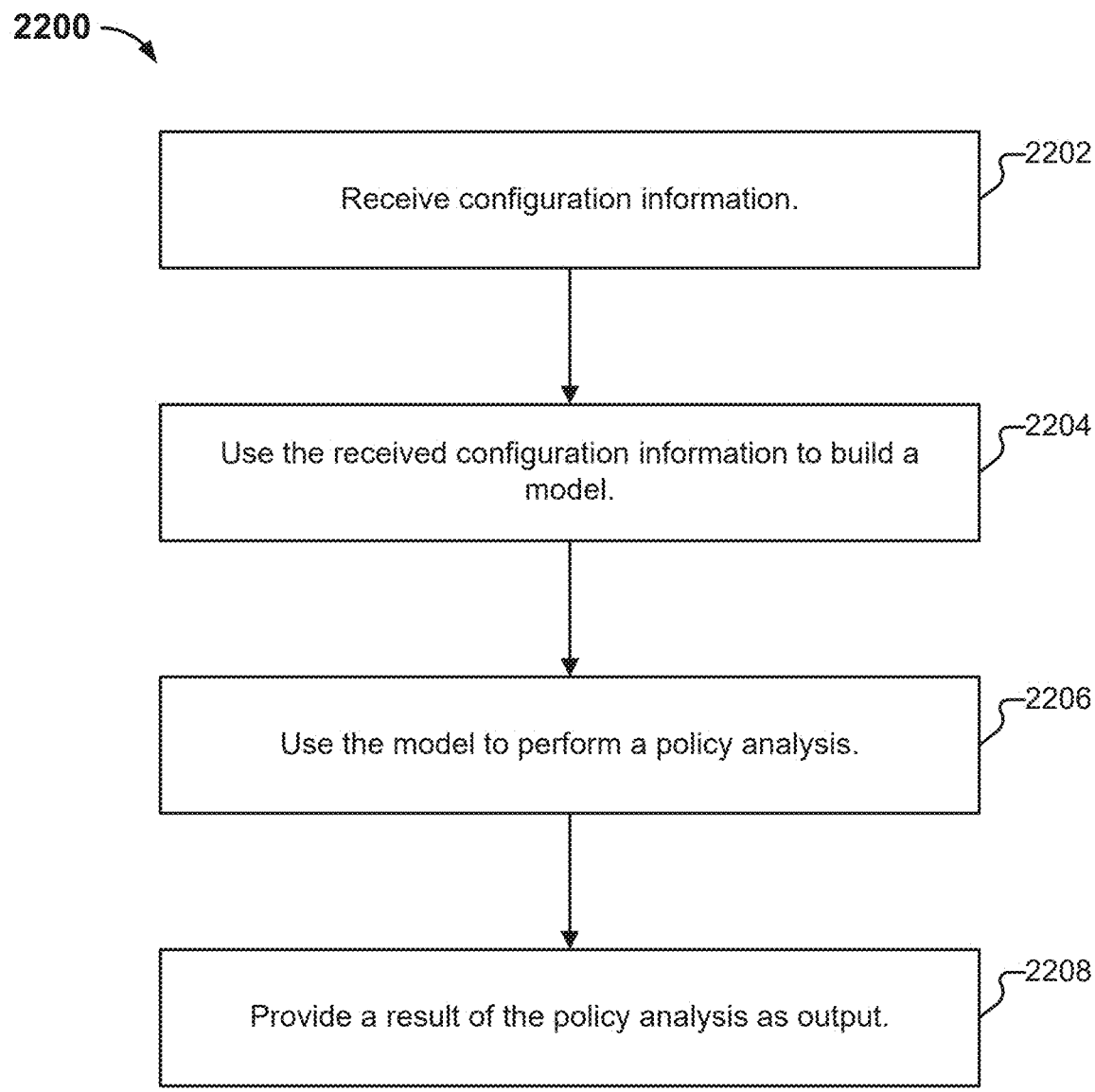
FIG. 22 is a flow diagram of an example process for using security policy analysis in a variety of ways in accordance with various embodiments.

FIG. 22 is a flow diagram of an example process for using security policy analysis in a variety of ways in accordance with various embodiments. Process 2200 (and/or portions thereof) can be performed by a variety of devices/systems. As one example, process 2200 can be performed on/by security platform 122. In this scenario, information such as firewall configuration information, traffic logs, objects, etc., are pulled as needed from network 140. As another example, process 2200 can be performed on data appliance 102 or another appropriate node within network 140 (e.g., an administrative console/server configured to administer data appliance 102). In this scenario, information necessary to provide policy analysis stays within network 140. As a third example, security platform 122 and one or more nodes within network 140 cooperate (e.g., with analysis being performed at security platform 122, within network 140 or both, depending on the scope/type of analysis performed).

At 2202, configuration information is received. As mentioned above, examples of such configuration include security rules/policies (e.g., extracted live from executing firewalls, copies of historical configuration information, etc.) and other configuration information (e.g., address objects, filters, service resolution information, active directory information, LDAP information, etc.). At 2204, the received configuration information is used to build a model. As described above, an example way of building a model is by using an SMT solver. At 2206, the model is used to perform a policy analysis. Various types of analysis are described above (e.g., shadow analysis, contra-shadow analysis, pre- and post-change management analysis, query analysis, on-demand policy simulation, sandbox analysis, etc.) and additional information about performing the various types of analysis are described throughout this Specification. Finally, at 2208 a result of performing the policy analysis is provided. An example of such a result is shown in FIG. 13 (e.g., identifying an intent over-specification). Other examples of results (e.g., on demand reports, periodic reports, etc.) are described throughout the Specification, as are examples of recommendations that can be made based on those results.

IV. Security Policy Analysis Use Case Scenarios

Introduction

Enterprise customers deploy firewalls to protect their network infrastructure and applications. They specify firewall security policies that determine what traffic will be allowed and what traffic will not be allowed. An example firewall policy comprises multiple rules. Typically, customers provide different rules based on types of traffic. In the following discussion, suppose the enterprise is a clothing brand, ACME Clothes. One example policy would allow fashion designers to access applications meant for the purpose of apparel design. Another example policy prevents those fashion designers from accessing financial documents or data center resources. The enterprise provides, explicitly, rules which allow/deny access to various sources and destinations. Sources/destinations can be specified by network identifiers (e.g., source and destination IP subnets). Sources/destinations can also be specified using group or other dynamic identifiers (e.g., members of the fashion designer group vs. members of the finance department; Windows 10 computers; bring-your-own-device devices, etc.).

One common problem is that, over time, an enterprise might have hundreds or thousands of rules in their security policy, particularly accumulating rules as network administrators join and then leave the enterprise. A significant number of stale rules can build, some of which may provided broader access than what is needed/desired, but with no efficient way to locate such rules. Some rules are redundant. As an example, suppose Becky is a fashion designer at ACME. While there is a rule allowing members of the fashion designer group to access apparel related applications, the security policy may also have a rule explicitly allowing Becky to access those applications. One reason for this could be that Becky joined the company early on-before there was an explicit fashion designer group. Later, when a rule applicable to all fashion designers was added, a cleanup to remove the line item for Becky did not occur. As a related example, Becky changes roles from fashion designer to sales. While her group membership would change, the vestigial line item would allow her to continue to have access to apparel applications even though such access might be inappropriate for her new role. As yet another example, suppose Becky remains a member of the fashion design team, but also gets promoted to a management role. In that case she might be a member of both the fashion designer group, and also a management group. There could exist two conflicting rules governing Becky's ability to access sensitive financial information. There could be one rule that blocks access to financial servers/applications to fashion designers and another rule that allows such access to managers. In such a scenario, what is the intent? Should Becky be allowed to access the financial servers/applications or not? An approach described variously throughout this Specification is to perform automated, verifiable analysis on policies to help enterprises ensure that their policies are current and relevant, and do not have conflicting intents.

For any rule change (adding a rule, deleting a rule, changing a priority order of a rule, etc.) there is a specific point in time at which the change occurs. Relative to that change, there is a "pre-world"-before the policy change is rolled out to production, it can be modeled/simulated to help determine whether making the change will create problems. This is also referred to as "shifting left." In spite of various tools, bugs inevitably will be introduced (e.g., due to human error). Further, because enterprise networks are dynamic environments, it can be the case that a rule/policy that was previously operating as expected, is now causing a problem (e.g., where a member of one department joins another department but corresponding updates to group membership aren't made). "Shifting right" can help address these situations. After a policy is rolled out, ongoing monitoring and analysis of the policy can help detect issues.

Use Case: Shift Right—Formal Modeling Based Analysis (Post Change Continuous Analysis)

Suppose an inadvertent change has occurred to ACME's security policy posture. The change could be due to human error, or due to a change in the environment. Continuous monitoring/policy analysis can be performed, e.g., any time a change is pushed, or on a recurring basis (e.g., once every 24 hours). In an example embodiment, using a tool such as Prisma Access, information can be collected from all of the firewalls (or other data appliances) deployed by the enterprise (i.e., a collection of firewalls). The policies are analyzed for errors (e.g., using techniques described throughout the Specification). For each detected error (also referred to as a policy anomaly), an incident can be generated. As applicable, additional contextual information can also be provided, such as how much traffic was associated with the anomalous rule or set of rules. One example of an anomaly is a policy having priority 10 that has its intent completely covered by a policy having priority 5 (e.g., a rule allowing fashion designers to access a resource at position 5 and a rule allowing Alice (who is a fashion designer) access to the same resource at position 10). Another example of an anomaly is a pair of conflicting policies (e.g., both allowing and denying access to a particular resource to Alice). An incident can be automatically generated that provides, e.g., a name for the anomaly type, shows both rules, shows any traffic hitting such rules, enumerates any implicated users/groups, implicated address objects, etc. The incident can be integrated into a ticketing system so that an appropriate member of a security operations center, network operations center, IT support, etc. can investigate the incident and attempt to fix the problem. An example way of fixing the problem would be to identify that, for example, rule 10 is redundant over rule 5 and should be removed. The administrator can manually make the change (e.g., deleting rule 10) and can also use a guided tool to automate the change (e.g., clicking on a suggested remedy—to delete the rule). Once the change is made, the ticket can be updated as "resolved," e.g., after the operator confirms that the change successfully resolved the problem.

Another type of anomaly is a hit count anomaly. In this scenario, a particular rule is not in use—there is no traffic matching the rule for an extended period of time (e.g., 30 days, 60 days, or 120 days of traffic). In this case, the rule can also be flagged as anomalous/an incident generated for an operator to investigate.

Use Case: Shift Left—on Demand Policy Simulation (New Rule Intent Satisfaction Analysis)

Suppose there exists a policy for ACME branch users. In the policy is a rule that states that fashion designers should have access to apparel design applications. When a new employee, Hank, is hired into that role, part of the new hire checklist IT follows includes granting him access to the application. It is possible that the operator responsible for granting access is unaware that a rule already exists to grant members of the fashion design group access. So, instead, the operator creates a new rule explicitly granting Hank access. As additional employees join, the operator continues adding rules granting them access individual (continuing to be unaware that a group-applicable rule already exists). In another example, suppose an employee, Ed, states that he needs access to a sensitive application (e.g., a financial application). Ed is a member of the engineering team. The IT operator assigned to Ed's request reviews the request, decides it seems legitimate, and adds a rule granting Ed access to the application. As with the previous scenario, suppose there is an existing rule that the operator is not aware of that blocks access to the financial application to members of the engineering team. Now there is an intent conflict.

With continuous monitoring, such issues (e.g., newly created duplicate rules and/or newly created conflicting rules) will be caught (e.g., within 24 hours) as anomalies and incidents/tickets can be opened to correct them. An alternate approach to addressing these types of situations is for the operator to use a "New Intent Analysis" feature (e.g., provided in an interface by security platform 122). By using this tool, before committing a new rule to production, the operator can identify mistakes before they are made. With the tool, the operator proposes a change (e.g., explicitly grant access to Hank as a new Policy 202). The system then evaluates the policy to see if the proposed change is redundant (i.e., access is already granted by existing policy), using modeling/analysis techniques described herein. If so, the system responds that the rule is not needed and provides a reason (e.g., Hank is already granted access by rule 33). The report could also indicate that the proposed rule contradicts an existing rule. As an example, suppose that while there exists a rule granting access to fashion designers (rule 33), there is also a rule denying access to new hires (rule 20). Before the operator is able to determine whether or not Hank should be granted access (due to the seeming conflict), he can perform further research. As an example, the rule denying access to new hires may have been implemented at the request of the legal department—to ensure that all new hire paperwork has been received/signed before access should be allowed to any system (or various systems/applications). In this scenario, the contradiction may be intentional and serve a purpose. Or, the contradiction could be an error (e.g., the priority order of the rules may be incorrect- and a rule granting access to fashion designers should take higher priority over a rule blocking access to new hires). Either way, the operator can be alerted that inserting a rule for Hank (without further investigation) is potentially not desirable.

Use Case: Shift Left—on Demand Policy Simulation (Production Anomaly Policy Analysis and Hit Count Analysis)

One approach to keeping security policies current/correct is to automatically perform continuous/periodic analysis (shift right). In an example implementation, production policies are pulled whenever changes are committed and/or at regular intervals (e.g., every six, twelve, or twenty four hours), analyzed, and any detected anomalies can be automatically inserted into a ticketing system.

Some enterprises (e.g., international banks) prefer to rely on a dedicated team of security policy analysts to handle policy management/audits. Instead of continuous monitoring, the team evaluates policies every three or six months (i.e., whatever cadence they use when evaluating their security policies). In between reviews, there may be many stale, redundant, conflicting, or otherwise problematic rules that are created.

Suppose the enterprise has one set of policies for branches (e.g., individual bank locations) and another set of policies for mobile users (e.g., employees working from home or frequently travel). Each policy has an associated set of rules. One feature provided by embodiments of security platform 122 is the ability to do an on-demand batch analysis of a policy (e.g., against historical information). As an example, the security policy team could run a report determining, over the last three months, which policies had zero hit counts, which policies have conflicts, etc. Instead of creating individual incidents (e.g., via integration with a ticketing system) to be addressed by an operator, the security policy team can use the information included in the report to inform which actions they should take (e.g., make changes to the production policy or ignore certain identified issued). After the changes are made, the security policy team can re-run the on-demand analysis and determine whether they have successfully resolved the issues that they intended to resolve (and determine whether new problems have arisen as a result of their changes).

Use Case: Shift Left—on Demand Policy Simulation (Security Policy Sandbox Anomaly Analysis)

Suppose an administrator instantiates a sandbox on Monday using a branch user policy. Over the course of a week, the administrator makes various changes to the sandboxed policy (e.g., granting different branches access to different resources based on jurisdiction-such as a GDPR-compliant version for European branches). The administrator would like to confirm that their changes in the sandbox have not created new anomalies (e.g., do not create redundancies, do not create conflicts, etc.) before pushing the sandbox modifications to production. In various embodiments, security platform 122 provides the ability for the operator to perform policy anomaly analysis against the sandbox (e.g., by providing an identification of the sandbox and requesting analysis). Once analysis is complete, the operator is provided with a report of the anomalies identified in the sandbox. The operator can then make further changes in the sandbox and run analysis again, to confirm whether the identified anomalies are now resolved (and/or whether the fixes have surfaced or introduced new problems). The operator can iteratively request analysis and make adjustments until the operator is satisfied with the sandboxed policy, at which point the operator can push the policy to production during an appropriate change window.

Use Case: Shift Left—on Demand Policy Simulation (Security Policy Anomaly Incident Resolution Using Sandbox)

When an anomaly is detected in production (e.g., through post change continuous analysis described above), one option is for the incident to be directly resolved in production. For example, if a determination is made (e.g., as part of a nightly job) that a redundant rule was added to a production system, an incident can be created and automatically added to a ticketing system for an operator to resolve (and, for example, assigned an incident ID number such as incident #10382). The operator, reviewing the information, can then choose to delete the redundant rule (e.g., based on a suggested recommendation provided by the policy analysis system or based on the operator's own judgment) during a change window. The operator might be lucky, and the change might fix the problem (which will be confirmed, e.g., during the next routine policy analysis). Unfortunately, the operator may also be unlucky. It could be the case that instead of deleting the redundant rule, the operator mistypes the rule number, deleting an adjacent rule. Now the production system has two problems: the originally identified redundant rule remains (i.e., the anomaly identified as incident #10382), and also a rule that should not have been deleted was deleted—in production.

Changes made in production that do not fix the problem (and potentially introduce new problems) can be very expensive. An alternate approach is for the operator to create a sandbox (using the production rules) and make the change(s) the operator believes will address the identified anomalies. The operator can then submit the sandbox policy for analysis (e.g., using an incident resolution analysis feature provided by security platform 122). In an example embodiment, the operator provides an identification of the sandbox, and a list of incident(s) (e.g., incident #10382) that the operator believes are resolved. Security platform 122 performs policy analysis on the sandbox and generates a report (e.g., indicating whether incident #10382 and/or any other enumerated incidents are resolved by the changes made in the sandbox, whether the problem(s) remain, and/or whether new incidents are detected, as well as reasons for the determinations). The operator can iterate (making changes in the sandbox and re-running incident resolution analysis) until the operator is satisfied. At that point, the operator can push the sandbox changes to production.

Use Case: User-Group Normalization and Formal Modeling

As mentioned above, when building a formal model, various information is used as input, including security policies and other information (e.g., address objects, filters, etc.). Rules can generally be thought of as having one of two types. The first type is a network-style rule, e.g., enumerating source/destination information using network constructs such as IP addresses, subnets, etc. The second type uses information such as user/device information and application information. Unfortunately, building a model using the second type of information can be challenging. Suppose a first rule specifies that employees are allowed to access a fashion design application. A second rule specifies that fashion designers are allowed to access the fashion design application. A third rule specifies that new hires are not allowed to access the fashion design application. Each of these rules is a group based rule. In this scenario, three user groups exist: employees, fashion designers, and new hires. How can security platform 122 determine whether there is a redundancy across these three rules? The source column for the first rule contains a string, "employees." The source column for the second rule contains another string, "fashion-designers." The source column for the third rule contains a string, "new-hires." Naïvely, comparing the three source values would seem to indicate that no redundancy exists, because the strings are different. Just examining the string values is insufficient to identify redundancies. Instead, each group needs to be broken down into a normalized list of its respective membership. Similarly, individual users can be included in rules in a variety of ways (e.g., email address, active directory name, wildcards such as "FirstName=Jeff, LastName=*" etc.). Those names also need to be normalized/canonicalized. An example approach is as follows.

First, any individually specified users are normalized. Second, groups are broken down into user lists (similarly normalized). Third, overlaps between groups are determined. Finally, the model can be built, using the normalized names and any identified overlaps as applicable.

Use Case: Policy Sandbox (Multiple Sandbox Per Operator with Edit, Production Refresh, Annotation, and Push to Production)

In the following discussion, suppose a retail enterprise (e.g., a home improvement chain) would like to deploy a new suite of applications for use by employees at retail locations that provide functionality such as inventory tracking, timekeeping, return processing, etc. Instead of deploying the new application suite company-wide (e.g., across 3,000 stores), a handful of stores in various locations are selected (e.g., ten stores on the West Coast, ten stores on the East Coast, ten stores in Canada, etc.) for a pilot.

Corporate IT would like to gain information about how the application suite is performing (e.g., are sales improving, are employees adopting the tools provided by the suite, etc.). One task corporate IT will perform as part of the project is to specify a set of restricted branches (i.e., those in the pilot) for which access to the application suite should be granted. One approach that corporate IT might take is to define a "pilot" group that includes the various pilot locations, and to grant access to the new applications to the networks/devices at those locations. Corporate IT might also explicitly block access to the suite for the other 2,970 locations. Adding these rules can be particularly complex—as an example, where within existing corporate policy (which may comprise several hundred rules or more) should new allow/block rules be inserted (i.e., at what priority). A variety of anomalies are likely to arise, particularly given the complexity likely to be involved in implementing a pilot.

In various embodiments, security platform 122 provides a policy sandbox feature. With the feature, an operator (e.g., in IT) with permissions to update security policy can ask security platform 122 to create a policy sandbox (e.g., instantiated using a copy of the branch security policy currently executing in production) or multiple policy sandboxes (e.g., one for branch policy and one for mobile policy). The operator can then modify the policy in the sandbox, adding new rules and/or moving/deleting/editing existing rules. Further, multiple operators can each have access to sandboxes (whether as a shared resource, such as a team sandbox) or individual sandboxes (e.g., with two operators each having three sandboxes).

Suppose the operator working on the branch pilot has made various changes in a sandbox and is ready to push the changes to production. The operator requests a change ticket and gets approval (e.g., from 1 am to 3 am on Sunday). One situation that occur is that, in the time between when the operator is satisfied with the sandbox version of the branch policy, and the change window, other modifications are made to the production security policy. For example, at midnight, another operator could have modified the production security policy. That production change will not be present in the sandbox because the sandbox was instantiated based on the production environment as it existed at the time of the instantiation request. If the operator proceeds with pushing the sandbox version of the policy to production during the change window, one thing that can occur is that the production change made at midnight will be overridden. In some embodiments, security platform 122 provides protection against this scenario. When the operator is ready to push changes made in a sandbox to production, the operator can ask that the underlying instantiation be refreshed (i.e., the change made at midnight will be refreshed into the sandbox). Any changes made by the operator in the sandbox since it was initially instantiated can be replicated to the refreshed sandbox. Four example scenarios can occur. First, new rules may have been added to production that were not present in the original sandbox instantiation. Those new rules will be added to the sandbox. Second, rules present in production at the time of sandbox instantiation may have been deleted. Those rules will similarly be deleted from the sandbox. Third, it is possible that a rule present in production at the time of sandbox instantiation was changed, but the change does not implicate any changes made in the sandbox. That rule will be updated in the sandbox. The final scenario is the most complex—in which a rule was modified in production and also modified in the sandbox. Now, conflicting versions of a rule exist.

In various embodiments, when an operator refreshes a sandbox, differences between the current production version and the sandbox version will be highlighted, e.g., indicating which rules were added, which were deleted, which were updated, and which represent conflicts. For any conflicts, the operator can determine which version of the rule should be used—the production version or the sandbox version. Once the operator is satisfied with the sandbox version, the operator can push the sandbox version to production.

V. Appendix

The following sections provide additional detail regarding example implementations/embodiments of policy analysis techniques described herein.

Operational Use Cases
1. Business Disruption-Policy is disallowing access that should be permitted, resulting in an operations ticket to fix the access issue.
2. Security Issue-Policy is overly permissive and is allowing access that should be blocked. Majority of data breaches are on allowed policy and if policy is too permissive the breach can access even more data than would have been possible with the right policy.
3. Policy Sprawl-Rule's intent is covered by another broader rule or set of rules.
4. Customer is be looking to tighten posture, added granular policies but forgot to remove the coarser ones.
5. Customer is looking to clean up policies and combine several granular into a coarser and forgot to remove the granular ones.
6. Customer was satisfying new business intent.
    a. Decided to add a new policy and did not realize that it would end up making other policies redundant.
    b. Their new policy is already being shadowed by a coarser one at higher order.
    c. Their new policy is already covered by a lower order policy making their new policy redundant (Reverse Shadow).
7. Policy Drift
    a. Customer wants to make a policy change but make a copy of policy and moves it lower down to keep as backup.
    b. Customer makes changes and tests the new copy (at higher order) over time. Meanwhile other operators have added new policies between the two.

Example Alerts/Incident List

1. Alert/Incident Name Format
The alerts are prefixed by a single adjective which is one of "REDUNDANT," "SHADOWED," "REDUNDANT," "GENERALIZED," or "CORELATED".
    Grammar is as follows:
    Policy Analysis Alert/Incident Code Format
    Code: AL_<INDUSTRY TERM_ADJECTIVE>_<POLICY1_ACTION>_<POLICY_TYPE>_COVERED_BY_<HIGHER|LOWER>_ORDER_<POLICY2_ACTION>_RULE
    Example Code: "AL__REDUNDANT_ALLOW_SECURITY_RULE_COVERED_BY_HIGHER_ORDER_ALL OW_RULE"
    Display Name: "<INDUSTRY_TERM_ADJECTIVE> Policy: <POLICY1_ACTION> <POLICY_TYPE> is covered by <higher|lower> order <POLICY2_ACTION> <POLICY_TYPE>"
    Example Display Name: "Redundant Policy: Allow security rule is covered by a higher order allow security rule"
    INDUSTRY_TERM_ADJECTIVE: "Redundant", "Shadowed", "Generalized", "Correlated"
    POLICY_TYPE: "Security Rule", "Decryption Rule", "Authentication Rule", "Application Override Rule", "DLP Rule", "URL Filtering Rule" etc.
    POLICY1_ACTION, POLICY2_ACTION: This is Policy Type specific.
    For Security Rule action is "Allow" or "Block"
    For Decryption Policy action is "Decrypt" or "No Decrypt"

Example Alert/Incident List with Code/Display Names
    Examples are shown in FIGS. 23A-23C.
Formal Modeling Based Services
    Formal methods are approaches to exhaustively and provably model, analyze, and optimize the behavior of hardware and software systems. When applied to policy/configuration modeling/analysis/optimization in fields such as security, networking, and modern identity and access management (IAM), formal methods enable semantic modeling to realize a functionally accurate "model of computation" of the intent/behavior of the system.
Core Formal Modeling Library
    Embodiments of the Core Formal Modeling library accept:
    1. Security policy specification (e.g., user/customer intent) for different device groups (MU, RN, GW, SC) alongside:
    2. Data to resolve all internal (objects, lists, etc.) and external (runtime firewall data, LDAP/AD data, predefined data, etc.) dependencies within the security policy specification.
    It uses this data to build a single unified logical model of computation for the security policy of the firewall, which is also referred to herein as the formal model. This formal model forms the basis for supporting multiple analysis as well as security posture evaluation use cases within the AIOps platform, including but not limited to shadowing/contradiction analysis, policy change management, and application access analysis.
    The Core Formal Modeling library uses the Security Policy, Firewall Configuration, Firewall Operational State (FQDN files, External Dynamic Lists, etc.) collected, for example, by the Prisma Access Artificial Intelligence for IT Operations (AIOps) platform to build the comprehensive logical model of computation using the CVC4 library. CVC4 is an automatic theorem prover for satisfiability modulo theories (SMT) problems. The formal model uses a mixture of Boolean/integer/enumeration/string-to-enumeration/string representations to resolve/flatten/normalize the security model by resolving all internal and external object dependencies.
    The library supports, as examples, the following three use cases, each of which can be realized as a standalone service or collection of services in the Prisma Access AIOps platform:
    1. Shadowing/Contradiction Analysis
    2. Policy Change Management
    3. Security Policy Query/Analysis within the Application Access Analyzer
    A microservice can be built on top of, for example, Google Kubernetes Engine (GKE) to:
    1. Retrieve a JSON configuration from Google Cloud Storage (GCS) (e.g., triggered via a configuration parser service or periodic trigger service),
    2. Retrieve firewall command output using the firewall data fetch lib, and
    3. Invoke the core formal modeling lib for the above use cases.
Example Inputs
    1. Security Policy from a configuration parser service (XMLtoJSON) microservice. In an example embodiment, this is JSON that is in the unresolved form, i.e., the security policies may refer to symbolic addresses, address lists, services, service lists, etc. The JSON will carry/embed additional information by way of dictionaries of key-value pairs, where the keys are the symbolic addresses, address lists, etc. referred to within the security policy and the values are the necessary information that can be used to fully resolve the security policy for formal modeling.

2. Firewall Operational State
   A. FQDN file
   B. External Dynamic Lists
   C. Predefined Object Information extracted from XML found in the firewall
   D. Exhaustive user-to-group mapping information (necessary for full fidelity formal modeling of the security policy)
   E. Exhaustive user-to-persona mapping information (necessary for full fidelity formal modeling of the security policy)
   F. One-off on-demand user-to-group mapping information (to support application access queries)
   G. One-off on-demand user-to-persona mapping information (to support application access queries)

Modes of Invocation/Operation
   1. Formal modeling can be triggered as a result of a new security policy commit.
   2. Formal modeling can be triggered as a routine/periodic refresh, when only operational data from the firewall is used to refresh the formal model.
   3. Formal modeling can be requested as part of the Policy Change Management workflow through AIOps datas service APIs.

Outputs
   1. Fully resolved security policies, modulo exceptions.
   2. Any exceptions encountered during modeling due to incomplete or malformed data.
      A. Security policy issues like cut-and-paste or formatting errors, references to as-yet-undefined objects or lists, etc.
      B. Operational state data issues like missing FQDN entry, incomplete address object, etc.
   3. Parsed firewall operational state that will be persisted in a structured form.
   4. Fully resolved formal model of the security policy, modulo exceptions.

Shadowing/Contradiction Analysis

One purpose of shadowing and contradiction shadowing analysis based on formal modeling is to flag and root-cause over-specification or contradiction redundancies in intent, reducing policy/permissions/privilege sprawl, and fix potential security holes/vulnerabilities. Redundancies can be one (or a set) of higher priority policies, and root-causing incorporates forward as well as backward traversal to identify shadowing, generalization, and partial conflicts through an interactive model building and blocking framework, or a framework (as realized in AIOps) that generates incidents using the incident generation framework for eventual consumption by the user/customer.

Inputs
   1. Fully-resolved security policy JSON with embedded policy model.

Modes of Invocation/Operation
   1. Inline during security policy formal model construction as a result of a new security policy commit.
   2. Triggered as a result of a change in firewall operational state (frequency and list of changes that can trigger this analysis is to be finalized).
   3. Can be requested as part of Policy Change Management workflow as part of three use cases.
      A. Shadow/Contradiction/Hit-count analysis.
      B. Incident Resolution Analysis.
      C. Shadow/Contradiction Security Policy Analysis.

Outputs
   1. A list of shadowee-shadower(s) objects, one per principal (shadowee). Each shadower and shadowee (or multiple shadowees) will contain raw (unresolved) as well as fully resolved information necessary for UI display. Depending on the mode of invocation of this analysis, the caller will process the output and forward it to either the Alerts/Incidents Engine or to the UI.
   2. An Alert/Incident code will be populated per shadowee-shadower(s) object and will be one of 16 as described in the Security Policy Incidents documentation above when the results are forwards to the Alerts/Incidents Engine.

Example Architecture for Shadow/Contradiction Analysis

Figure 24A:
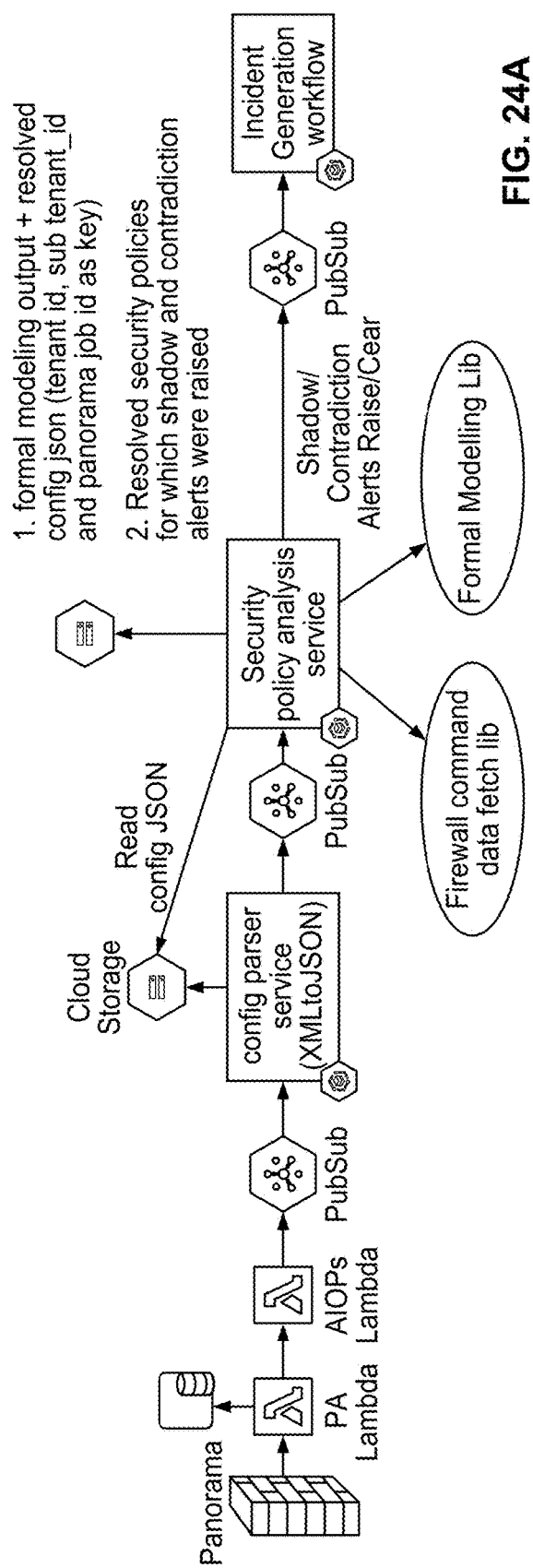
FIGS. 24A-24D illustrate example architectures.

FIG. 24A illustrates an example architecture for a evaluating config commit.

Figure 24B:
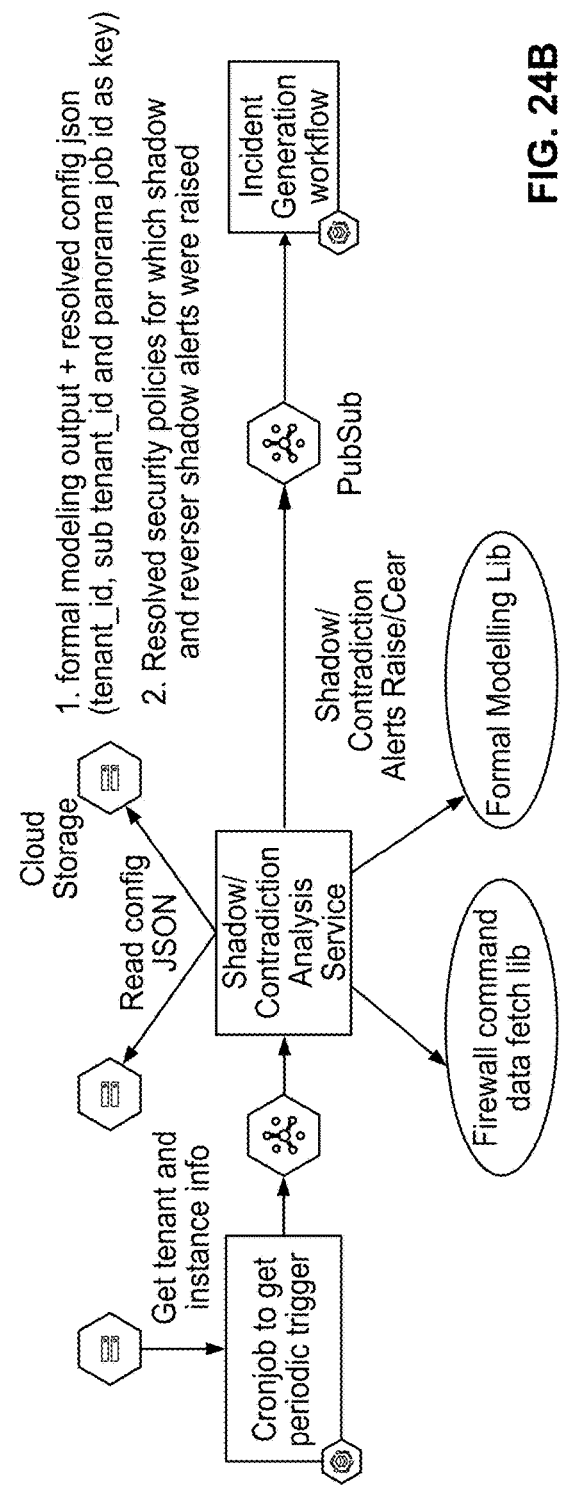

FIG. 24B illustrates an example architecture for performing periodic analysis. In an example, shadow/contradiction analysis is done periodically as firewalls related to DNS proxy/EDLs/Group to User/Predefined mapping can change without config change.

Figure 24C:
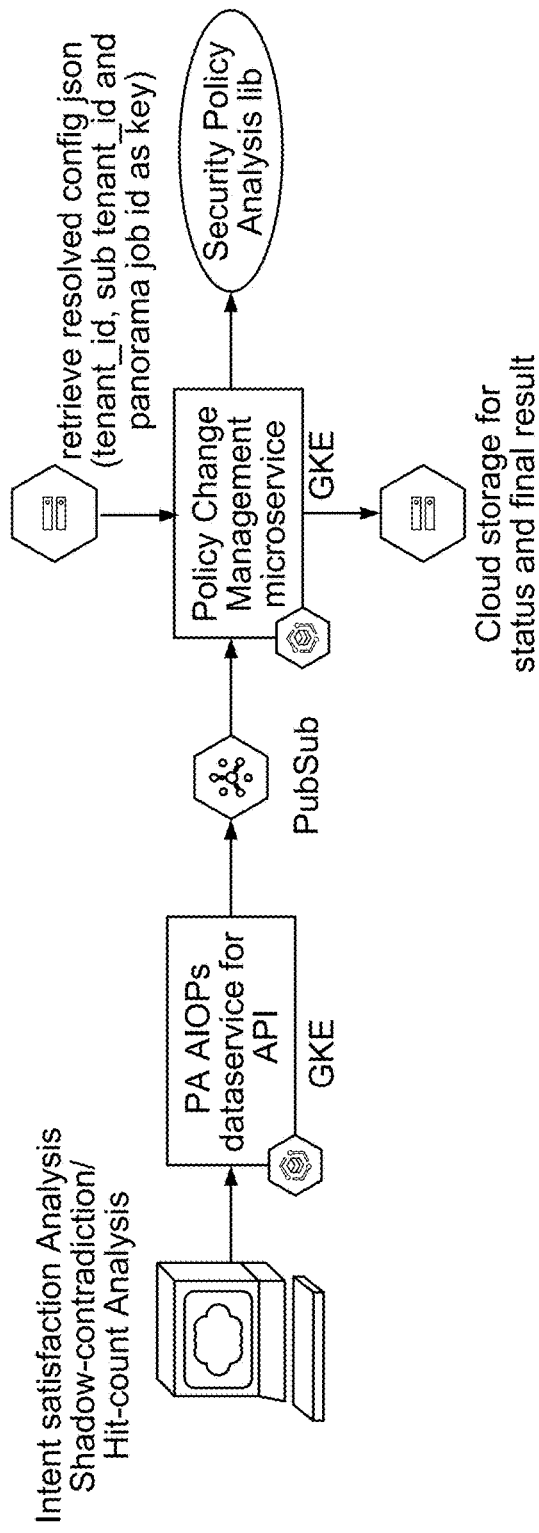

FIG. 24C illustrates an example architecture for performing analysis against a currently committed security policy.

Figure 24D:
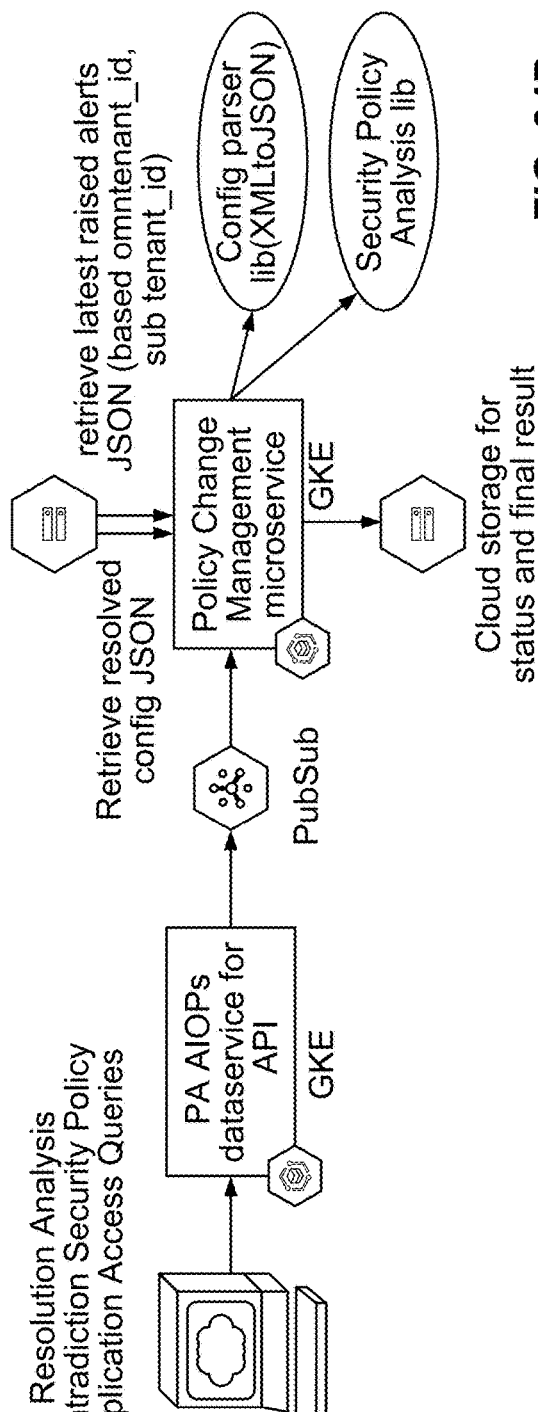

FIG. 24D illustrates an example architecture for performing analysis against an uploaded security policy that captures proposed changes to security policy.

Policy Change Management

Formal modeling can be coupled with a structured query language to express policy constructs (the fields in these constructs can be fully or partially specified, and a field itself can be partially or fully specified). For example, a simple query can support a set/list of source IP addresses, and Boolean operations on such sets (for example, one can query connectivity on sets such as 10.0.0.0/8 minus ['10.0.1.24', '10.4.55.4', . . . ]). This exposes a powerful interface that allows varied use cases such as policy change management (e.g., sandbox testing and validation of proposed changes before final commit) and connectivity analysis (e.g., which users/subnets can access what apps/servers/services/resources).

The following are five example workflows that can be supported under policy change management:
   1. Against the currently committed security policy:
      A. Intent Satisfaction Analysis.
      B. Shadow/Contradiction/Hit-Count Analysis.
   2. Against an uploaded security policy that captures all proposed changes to security policy:
      A. Incident Resolution Analysis.
      B. Shadow/Contradiction Security Policy Analysis.
      C. Application Access Queries.

Policy Change Management Against the Currently Committed Security Policy

In an Intent Satisfaction Analysis workflow, user input is XML containing proposed policy additions. For each new policy captured in this uploaded XML, the analyzer will report back if this intent is not/partially/fully met/blocked and provide a corresponding list of security policy matches. The reference security policy model used to perform this analysis is, in various embodiments, the formal model of the currently deployed security policy.

In a Shadow/Contradiction/Hit-Count analysis workflow, the reference security policy model used to perform analysis is the formal model of the currently deployed security policy. A comprehensive analysis of all shadows and contradictions (regardless of dashboard/configuration preferences/customizations that suppress certain Alerts/Incidents) is returned. The Hit-Count analysis extracts and aggregates the hit count of each security policy from the currently deployed security policy from all production firewalls for the specified device group. It reports those rules that have not seen any hits since the last successful commit (modulo certain limitations/assumptions described in more detail below).

Policy Change Management Against an Uploaded Security Policy that Captures Proposed Changes to Security Policy In workflows under this category, the user models their proposed changes to the security policy (e.g., in Panorama) and exports XML of the proposed configuration, which is then uploaded as part of each use case (three of which are listed below). A Config Parser service is used to build a fully resolved policy model of this XML using information (operational data) retrieved from the latest fully resolved policy model for the device group.

1. In an Incident Resolution Analysis workflow, the user provides one or more incidents that are queried against the newly built formal model for the security policy XML that was uploaded by the user. For each incident, Shadow/Contradiction Analysis is performed to determine if the changes proposed in the uploaded policy XML will resolve that incident. The full list of incidents that are generated based upon the last analysis run are retrieved from the alerts that are maintained and tracked by the policy change management microservice.
2. Shadow/Contradiction Security Policy Analysis uses the formal model of the security policy XML that was uploaded with the request, and results are returned for consumption via the UI.
3. Application Access Queries use the newly built security policy model to answer well-formed queries with the structure (in an example): "Can user X access application Y?"

Workflow for Policy Change Management

Figure 25:
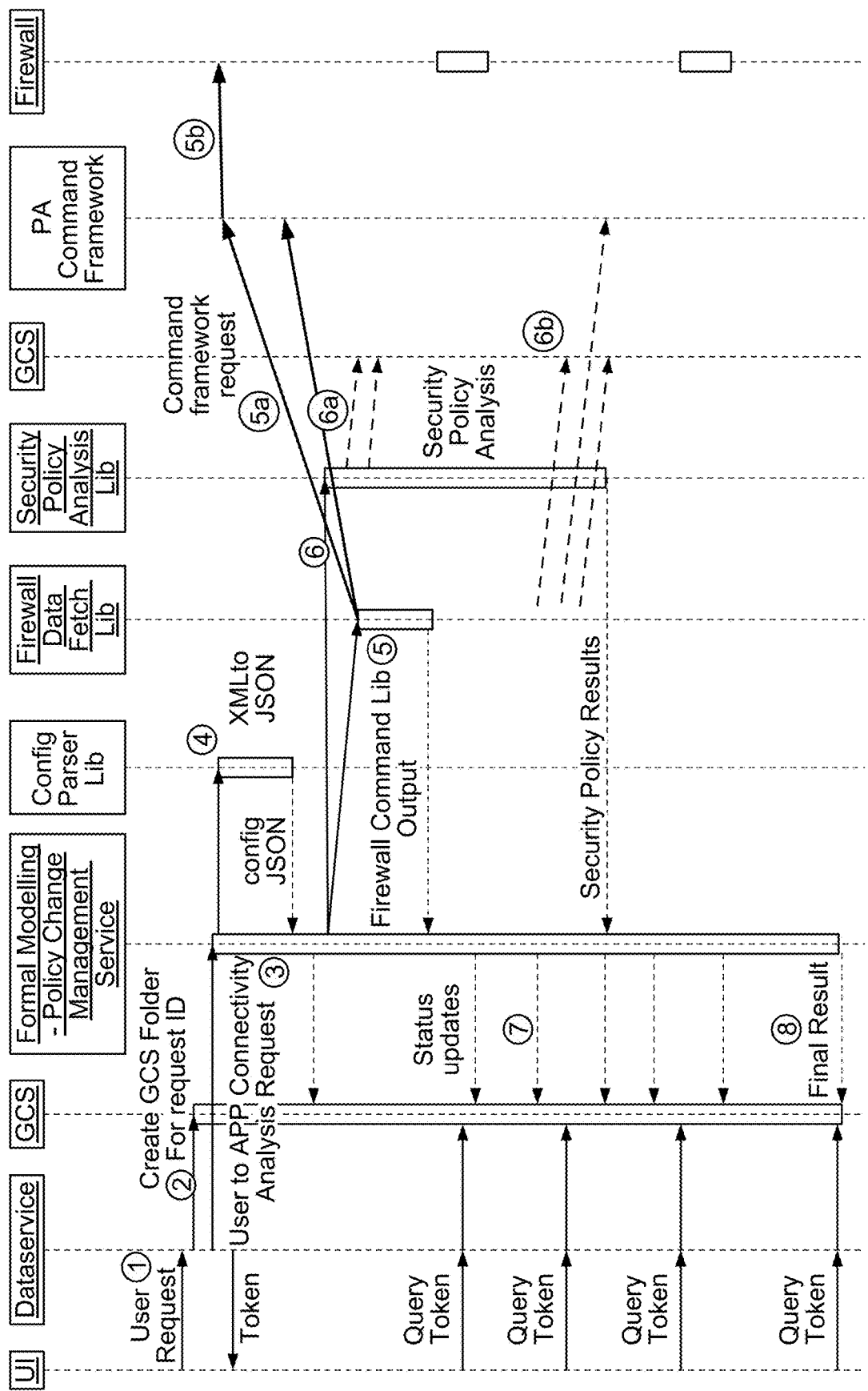
FIG. 25 illustrates an example workflow for policy change management.

FIG. 25 illustrates an example workflow for policy change management.

Example Data Services (APIs) for Policy Change Management

In various embodiments, Data Services provides an API interface (e.g., using Quarkus Framework) for triggering policy change management. In some embodiments, the UI interface is served through following example endpoints:

Application Access Analyzer Security Policy Query/Analysis

Figure 26:
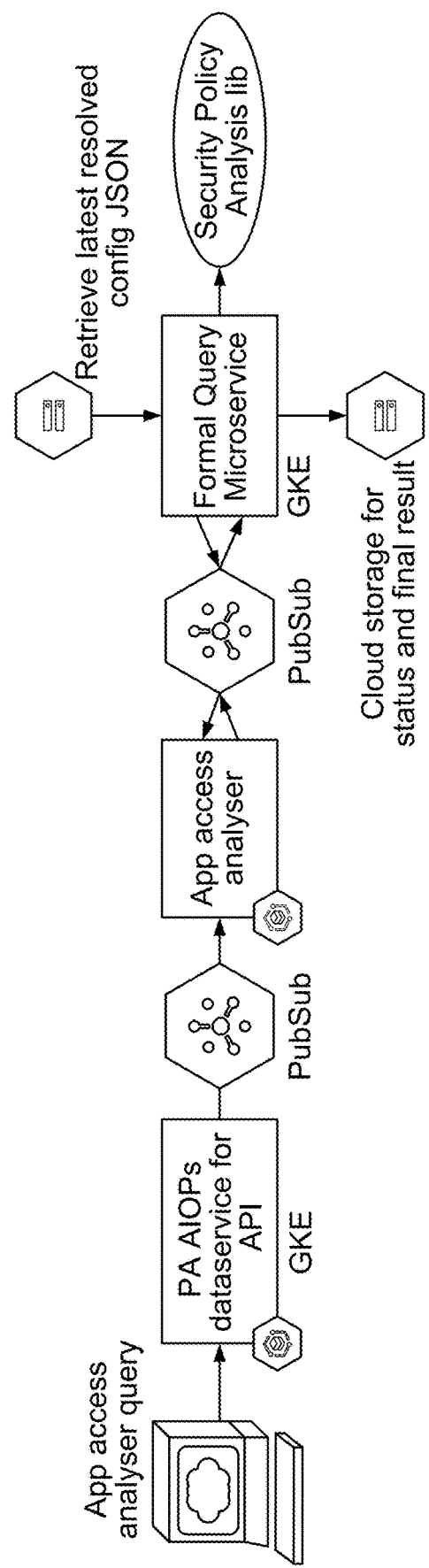
FIG. 26 illustrates an example architecture.

FIG. 26 illustrates an example architecture.

Input

A query that is either a fully-specified or a partially-specified security policy JSON.

Modes of Invocation/Operation

1. Upon receipt of the query, a formal query microservice retrieves the last full resolved policy JSON that contains the embedded formal model for the security policy.
2. The Firewall command data fetch library is used to retrieve user-to-group and user-persona information using the following commands.
   A. show user user-attributes user <username>
   B. show user user-ids match-user <username>
3. The query is extended to ensure that connectivity satisfiability checks will include the results of the firewall data that has been fetched.

Outputs

A list of policy objects that semantically match the received query is provided as output. For each policy object that is a match, raw (unresolved) as well as fully resolved information necessary for UI display is provided, as applicable.

Description (Core Formal Modeling Microservice)

A microservice is provided for formal modeling based services and based on event type and parameters, it can call other libraries like the config parser library, firewall data fetch library, or formal modeling core library. These libraries can be called directly or as separate thread on need basis. The microservice monitors the output of libraries and updates status and puts final result in GCS. It raises/clears alerts via an incident generation workflow.

Config Parser Library

For various policy change use cases, XML is provided for analysis. As an example, the config parser library is used to convert XML to JSON. The config parser library defines a class for converting provided XML (in file or text format) to JSON based on provided schema.

| | Type | URI |
|---|---|---|
| Intent | Request | https://{ {host} }/policy_change_management/intent_satisfaction_analysis/request |
| Satisfaction | Status | https://{ {host} }/policy_change_management/intent_satisfaction_analysis/status/{ {token} } |
| Analysis | Results | https://{ {host} }/policy_change_management/intent_satisfaction_analysis/result/{ {token} } |
| Shadow/ | Request | https://{ {host} }/policy_change_management/shadow_contradiction_hit_count/request |
| Contradiction/ | Status | https://{ {host} }/policy_change_management/shadow_contradiction_hit_count/status/{ {token} } |
| Hit-count analysis | Results | https://{ {host} }/policy_change_management/shadow_contradiction_hit_count/result/{ {token} } |
| Incident | Request | https://{ {host} }/policy_change_management/incident_resolution_analysis/request |
| Resolution | Status | https://{ {host} }/policy_change_management/incident_resolution_analysis/status/{ {token} } |
| Analysis | Results | https://{ {host} }/policy_change_management/incident_resolution_analysis/result/{ {token} } |
| Shadow/ | Request | https://{ {host} }/policy_change_management/shadow_contradiction_security_policy_analysis/request |
| Contradiction | Status | https://{ {host} }/policy_change_management/shadow_contradiction_security_policy_analysis/status/{ {token} } |
| Security Policy Analysis | Results | https://{ {host} }/policy_change_management/shadow_contradiction_security_policy_analysis/result/{ {token} } |
| Application | Request | https://{ {host} }/policy_change_management/application_access_queries/request |
| Access | Status | https://{ {host} }/policy_change_management/application_access_queries/status/{ {token} } |
| Queries | Results | https://{ {host} }/policy_change_management/application_access_queries/result/{ {token} } |

Firewall Data Fetch Library

The firewall data fetch library uses the command framework library which in turn calls a firewall (e.g., PA) command framework to get firewall output. The firewall data fetch library can store output in GCS. It can convert XML/text to JSON based on provided schema. The firewall data fetch library can be used for periodic data pull from the firewall.

Examples of Commands Supported show dns-proxy fqdn all
request system external-list show type IP name <edl name>
show user group list
show user group name "cn=it_operations, cn=users,dc=al, dc=com"
show predefined xpath/predefined
show user user-attributes user <username>
show user user-ids match-user <username>

Example Output
GCS

Example output comprises formal modeling output and resolved config JSON, shadow/contradiction policies raised as a result of analysis.

Incident Generation/Clear

Incidents are raised on any shadow/contradiction found during analysis. Also, comparisons are done against open alerts for these tenants and alerts which are not currently present will be cleared by sending messages with alert state as clear to incident generation workflow. Current open incidents can be extracted from GCS.

Example Format connectivity and performance. Large number of rules mean increases in operational overhead of maintenance of the rules.

Policy sprawl eventually happens and policies only grow. This makes policy analysis in the case of a disruption in connectivity or in case of a breach very difficult. On example is "policy Sprawl and drift": as business and security needs change, new policies to allow new application/user/network connectivity or to segment/deny existing allowed connectivity are added. But, at times, existing policy may be sufficient to meet this intent or edits. However, much of the time it is hard for operators to analyze 100s to 1000s of policies to understand if they need to really add or delete policy.

Security/Network teams embark on periodic policy cleaning exercises but it is not always easy to find out what can be cleaned. Business intent changes and policies become redundant. Or, some policy intent is covered by one or more other policies (shadowing). Operators need to clean up policy while knowing that there is no change in policy posture in terms of allowed connectivity or required segmentation.

Another situation involves reducing change risk when meeting new business intent. When meeting new connectivity or segmentation intent operators, it is desirable to be sure they have not broken any previous intent. They need a way of analyzing the total expansion in connectivity or segmentation from prior policy and to confirm that it is limited to what their intent was.

Yet another situation includes reducing change risk in terms of continuing to meet regulatory compliance and important business connectivity mandates. To ensure suc-

```
{
  tenant_id: "",
  sub_tenant_id: "",
  sub_tenant_name: "",
  alert_id: "", #UUID
  severity_id: 1,
  severity: "critical", (("critical" -> 5, "high" -> 4, "medium" -> 3, "low" -> 2, "clear" -> 1)
  state: "", (Raised/Cleared)
  message: "human readable data",
  code: "shadow and reverse shadow alert",
  category: "SECURITY",#Alert category (Example: NETWORK, SECURITY, etc)
  sub_category: "POLICY", #Alert sub category (Example: RN, SC, etc)
  domain: "external", #(internal/external). All internal alerts are not shown in UI.
  ml_confidence_score: 10.0, #Valid for ML alert only
  clear_reason: "", #Valid values are Auto/Manual/No_Data_Timeout
     resource_keys: "", # JSON string of key value pairs to uniquely identify a
  resource. Example '
    Unknown macro: {"tenant_id"} resource_context:
    Unknown macro: {instance_name}
    resource_data: "
    Unknown macro: {'process'}
    " #JSON string of resource data
    first_event_time: "",
    raised_time: "2021-07-02 23:12:13 UTC",
    cleared_time: "",
    updated_time: ""
}
```

Security Pre-Change/Post-Change Analysis

Security and Networking teams face several challenges in maintaining policy sets. The following are various examples:

Every security policy rule in an enterprise needs careful management to ensure the right balance between tight security and compliance posture and required application cessful audits and no regulatory fines, at the time of making a policy change, IT/Infosec executives and Legal/Finance want to be sure that crown jewel segmentation continues to stay in place following changes. Certain application connectivity is mandatory for business to operate. IT/Infosec executives and Business Unit executives also want to be sure this is not broken else business revenues, employee productivity will be disrupted. For allowed connectivity, operators want to be sure that Networking and Security Operator teams are only allowing a restricted amount of traffic (e.g. only ports 443 and 8080 or web). Operators need a way of providing rules to specify crown jewel mandates on required segmentation and connectivity.

Example Workflows

FIG. 27A illustrates a new policy addition workflow.

FIG. 27B illustrates a workflow for periodic policy cleanup, including optimization and hardening.

FIG. 27C illustrates a workflow for performing complex new policy changes (e.g . . . for application rollout or other business/security needs).

FIG. 27D illustrates policy incidents resolution (e.g., to identify errors).

Example Use Cases

| Analysis Type | Use Cases and Queries | Workflows | Results |
|---|---|---|---|
| New Intent Satisfaction (Redundant New Policy Check) | I am planning to add a new policy intent. The policy intent can be an allow or deny or drop, with match criteria and optional profiles etc. specified. Here are my queries:<br>1. Is this Intent already met? If so I do not need to add it.<br>2. Is this intent partially met and or contradicted? If so let me know what policies that are meeting it partially, I may be able to use those.<br>3. Is this intent not met at all? If so let me know the policies that block it and I may be able to use those. | 1) Provide an Add Intent specification in the form of a Add Policy Statements.<br>2) Request for analysis on whether the additions are already met by current policy.<br>3) Receive Back:<br>  a) Intent already met and the list of policies that meet it<br>    i) Operator need not make any changes<br>  b) Intent not met and the list of policies that block it<br>    i) Operator needs to make changes<br>  c) Intent partially met and the list of policies that meet it and/or that block it<br>    i) Operator need to make policy changes<br>    ii) They can use the list of policies returned and choose to modify them<br>    iii) Or they could add net new policy to meet their intent | Base Policy: Latest resolved policy from orchestrator + firewall<br>Query: The intent specification given by customer<br>Analysis: Containment |
| Security Policy Incident Resolution | I am planning to edit, delete, move an existing policy/policies besides adding new policies. I have a certain business intent in mind. I want to be able to model my change and need help with following checks that I would like to run against my changes:<br>1. I will give the Incident ID of a security policy Incident. Can you tell me if the problem specified in the incident (shadow, reverse shadow etc.) will be resolved with my changes?<br>2. Can you tell me what shadows/reverse shadows/contradiction may arise due to my changes? | 1. Change Modeling in Panorama, Cloud Management or by specifying edits, adds, moves, deletes on existing policy.<br>2. Export the changes (changeset) to a file and upload file into AIOps.<br>3. Specify the Security Policy Incident ID that you believe will be resolved by the proposed changeset.<br>4. AIOps will fire a job to do your analysis.<br>5. It will build a model using the changeset. It will check if the Incident is resolved. If not then it will indicate Shadowee and Shadowers in the same format as is returned for Incidents.<br>6. Operator can come and look at job results (progressive or at the end of it). | |
| Security Posture Change Analysis | I am planning to edit, delete, move an existing policy/policies besides adding new policies. I have a certain business intent in mind. I want to be able to model my change and need help with following checks that I would like to run against my changes:<br>1. I was cleaning up redundant allow or deny policies. Can you check that following my changes the connectivity posture of | 1. Change Modeling in Panorama, Cloud Management or by specifying edits, adds, moves, deletes on existing policy.<br>2. Export the changes (changeset) to a file and upload file into AIOps.<br>3. You specify the Security Policy Incident ID that you believe will be resolved by the proposed changeset.<br>4. AIOps will fire a job to do your analysis. | |

| Analysis Type | Use Cases and Queries | Workflows | Results |
| --- | --- | --- | --- |
| | the previous policy continues to be in place (I have not broken any prior connectivity). Tell me if it is<br>1. Is it exactly same as before.<br>2. Expanded connectivity from before (contracted segmentation). If possible tell me which policies are expanding it (these could be allow or drop/deny/reset policies, but deletions may be hard).<br>3. Expanded segmentation from before (contracted connectivity). If possible tell me which policies are contracting it (these could be allow or drop/deny/reset policies, e.g.). | 5. It will build a model using the changeset. It will check if the Incident is resolved. If not then it will indicate Shadowee and Shadowers in the same format as is returned for Incidents.<br>6. Operator can come and look at job results (progressive or at the end of it). | |
| Shadow/ Reverse Shadow/ Contradiction Analysis | I am planning to edit, delete, move an existing policy/policies besides adding new policies. I have a certain business intent in mind. I want to be able to model my change and need help with following checks that I would like to run against my changes: | 1. Change Modeling in Panorama, Cloud Management or by specifying edits, adds, moves, deletes on existing policy.<br>2. Export the changes (changeset) to a file and upload file into AIOps.<br>3. AIOps will fire a job to do your analysis.<br>4. It will build a model using the changeset. It will check if the Incident is resolved. If not then it will indicate Shadowee and Shadowers in the same format as is returned for Incidents.<br>5. Operator can come and look at job results (progressive or at the end of it). | |
| Unused Rules Analysis Combined with Shadow Analysis This can be combined with Shadow Analysis/ Reverse Shadow Analysis | (Does not need formal analysis, but with formal analysis you can indicate why specific rules are not in used, because they are getting shadowed.) I have policies which are not getting used as there are no policy hits. Can I identify these so that I can remove them. | A list of these policies is provided in the Analysis results. This can be enriched further by indicating that they are not in use because they are shadowed or because they are not shadowed but fundamentally there is no traffic hitting them.<br>Workflow<br>1. Operator asks for unused policy rules.<br>2. Operator specifies a period in terms of days or months over which they want to know which rules were unused.<br>Results<br>1. List of policies by Policy Set (MU, RN, Clean Pipe) which are unused as hit count is zero.<br>2. Indicate for unused policy if it is not shadowed at all (this means there is no | |

-continued

| Analysis Type | Use Cases and Queries | Workflows | Results |
|---|---|---|---|
| | | traffic hitting it and it is not because it is hitting some other policy). | |
| | | 3. Indicate for unused policy if it is it is fully shadowed by some other set of policies and provide the list of those policies along with hit counts against them. | |
| | | 4. Indicate for unused policy if it is it is reverse shadowed by some other set of policies and provide the list of those policies along with hit counts against them. | |

Example User Elements as Used in Various Embodiments

| Title | Description |
|---|---|
| New Analysis Workflow | When an operator goes to a "Security Policy Pre-Change Analyzer" tab they are able to fire new analysis as follows:<br>1) Click to fire new analysis.<br>2) Specify Name, Description.<br>3) Pick one or more Analysis Tool.<br>4) For New Intent Satisfaction Tool they can:<br>  a) Specify their Add Intent (with optional rule order number) in terms of a Security Rule format (e.g., as supported in Panorama/NGFW/Cloud Management).<br>  b) Specify multiple Add Intents.<br>  c) Click Submit for system to execute their analysis.<br>5) For all other Analysis Types they can:<br>  a) Specify their Policy Changes by one of:<br>    i) Modeling the changes in Panorama and exporting in Panorama and uploading the XML in AIOps as a changeset and then specifying the changeset.<br>    ii) Specify the changes as specific adds policies at a particular rule order, edits to specific existing policy at order n (along with change of n), deletes of a specific policy at order n, move of a policy from order n to order m.<br>6) Operator can specify or more analysis types in one Analysis job request.<br>7) Operator submits the Analysis request.<br>8) Operator can check Analysis completion status in Analysis table. |
| Analyses Table and Max | System shows a Security Policy Analysis Table for the Analysis submitted by operator.<br>Table has following columns:<br>1) Analysis Name<br>2) Analysis Description<br>3) Submission Time<br>4) Operator Submitting the request<br>5) Analysis Status. One of: Completed, In Progress, System Aborted,<br>6) Analysis End time<br>7) User Actions: View Analysis Results, Delete Analysis, Cancel Analysis, Restart Analysis (for Canceled/Aborted)<br>8) Analysis Type: Policy Addition Redundancy Check, Shadow/Reverse Shadow Analysis, Incident Resolution, Connectivity Check<br>Analysis State      Analysis Actions<br>Completed      View, Delete, Export<br>In Progress      Cancel<br>Saved Draft      Start, Delete<br>Canceled      (Re)Start, Delete<br>Aborted      (Re)Start, Delete |
| Security Pre-Change Changeset Workflow and Table | As part of the New Analysis workflow or separately allows operator to upload a changeset modeled in Panorama/Cloud Management. Operator can do following:<br>1. Specify new changeset upload.<br>2. Give it a name and description. |

|  |  |  |
|---|---|---|
| | 3. | Upload a file. |
| | 4. | See status of the upload in a Changeset table. |
| | System have a changeset table with following columns: | |
| | 1) | Filename |
| | 2) | Description |
| | 3) | Filesize |
| | 4) | Time Upload Submitted |
| | 5) | Upload operator name |
| | 6) | Time Upload Completed |
| | 7) | Upload status: In Progress, Completed, Aborted |
| | 8) | User Action: Delete Changeset, Download file |

| Security Pre-Change Policy Sandbox Workflow and Table | In lieu of using a changeset that customers download/upload, another solution is providing a Policy Sandbox. An example implementation provides the following example functionality: |
|---|---|
| | 1) One or more operators can create one or more Policy sandboxes. |
| | 2) Operator can instantiate Policy Sandbox with current Production (commit/pushed) Policy. |
| |    a) A single sandbox can be instantiated at any layer of the Policy Folder view and will allow for rule changes at that layers and on all layers below. |
| |       i) For Cloud Managed Prisma Access Layer examples are Shared, Mobile Users, Remote Workforce (GlobalProtect) (GlobalProtect/Okyo Security Policy), Explicit Proxy (Explicity Proxy Security Policy), Remote Networks (Remote Networks Security Policy) |
| |       ii) For Panorama Managed Prisma Access Layer examples are Shared, Customer Created Security Policy, Remote_Network_Device_Group (Remote Network Security Policy), Mobile_User_Device_Group, (GlobalProtect Security Policy), Explicit_Proxy_Device_Group (Explicit Proxy Security Policy) |
| | 3) Operator view and experience in terms of making rule changes in Sandbox is identical to what they can do on the management tool: |
| |    a) Edit Rules. |
| |    b) Delete Rules. |
| |    c) Clone Rules. |
| |    d) Move Rules. |
| |    e) Add Rules (including specifying the layer and if it is not leaf layer then whether it is in pre- or post-). |
| | 4) Operator can save Policy Sandbox. |
| | 5) Operator can view Changelog on Policy Sandbox which shows the following (e.g., in connection with a Save): |
| |       i) Number and name of rules added since last save. |
| |       ii) Number and name of rules delete since last save. |
| |       iii) Number and name of rules moved since last save. |
| |       iv) Number and name of rules edited since last save. |
| | 6) Operator can start analysis against a Sandbox from the Sandbox view. |
| | 7) Operator can push Sandbox to candidate configuration of management tool (e.g., Panorama or Cloud Management). |
| | 8) Operator can refresh Sandbox with latest production (commit/pushed) changes. The refresh can result in conflict free updates to Sandbox from production or conflicts. |
| |    a) Following are examples of conflict free changes: |
| |       i) New rules added in production which do not exist in Sandbox. |
| |       ii) Rules deleted in production. |
| |       iii) Rules moved in production. |
| |       iv) Rules edited in production which have not been edited in Sandbox. |
| |    b) An example of a change which has a conflict is a rule which has been changed in sandbox and also in production. |
| |    c) Conflict resolution approach: |
| |       i) All rules with conflicts are highlighted. |
| |       ii) Operator can see the production view of the rule (production edits) and the Sandbox view (sandbox edits). |
| |       iii) Resolution involves operator selecting one of the above two views to be the final edited view. |
| |    d) Sandbox can be saved even with conflicts. However, in some embodiments, Analysis can run only against a Sandbox where all conflicts have been resolved. |
| | System supports a Policy Sandbox table with following columns per entry: |
| |    1. Policy Sandbox name |
| |    2. Sandbox Description |
| |    3. Names of Analyses that been run against sandbox and ability to click on an individual analyses to see results |
| |    4. Operator who owns the Sandbox |

| | | | |
|---|---|---|---|
| | | 5. List of Security Policies in the Sandbox (Remote Network, Remote Workforce(GlobalProtect), Explicit Proxy) | |
| | | 6. The following are examples of supported Actions: | |
| | |     1. Delete Sandbox. | |
| | |     2. View Sandbox (if not owner)/Edit sandbox (if owner). | |
| | |     3. Clone Sandbox. | |
| | |     4. Change Ownership - Non Security Admins can only change ownership their Sandbox to another operator. Security Admins can change ownership of any Sandbox to any operator. | |
| | |     5. Only Sandbox owner can perform write operations (Edit/Delete Sandbox) on a Sandbox. | |
| | |     6. Customer can see a changelog of operators done via Sandbox. An example format is as follows: | |
| | |         1. User <name> deleted sandbox <name> at time <> | |
| | |         2. User <name> created sandbox <name> at time <> | |
| | |         3. User <name> created sandbox <name> using cloning of sandbox <name> at time <> | |
| | |         4. User <name> changed ownership of sandbox from previous owner <name> to new owner <name> at time <> | |
| | |         5. User <name> saved sandbox <name> at time <> | |
| Analysis Results | When Policy Pre-Change Analysis is Completed, user can check for results. Results show the following based on Analysis Type: | | |
| | 1) New Intent Satisfaction | | |
| |     a) For each Intent provide following results: | | |
| |         i) Not Met - Set of policies which disallow the intent. | | |
| |         ii) Fully Met - Set of policies that fully allow the intent. | | |
| |         iii) Fully Met but with contradictions - Set of policies which fully allow the intent and the set which contradict. | | |
| |         iv) Partially Met - Set of policies which partially meet the intent. | | |
| | 2) Security Policy Incident Resolution | | |
| |     a) Resolved - Shadowee details from the Incident | | |
| |     b) Not Resolved - Shadowee details from the Incident and set of policies which shadow it | | |
| | 3) Shadow/Reverse Shadow Analysis | | |
| |     a) List of Shadowee policies and for each the list of shadowers | | |

Example Initial Analysis Tools, Inputs, and Outputs Used in Various Embodiments 35

| Analysis Tool | Analysis using Current or New Policy | Inputs | Outputs |
|---|---|---|---|
| New Intent Satisfaction Analysis | Current Policy - Latest Policy Snapshot | 1. Security Policy (RN, MU, EP, CP)<br>2. Current Policy<br>3. Set of New Security Rules (with a max of 10) | Per New Security Rule<br>E.g., group-qa Wiki Allow,<br>Tom belongs to group-qa, group-qa belongs to group-engg<br>1) New Security Rule Intent Fully Met without contradictions<br>  a) List of Security Rules in Current Policy that meet New Security Rule Intent<br>  b) E.g., Current Rule: group-engg wiki allow<br>2) New Security Rule Intent Partially Met without Contradictions<br>  a) List of Security Rules in Current Policy that partially met New Security Rule Intent<br>  b) E.g., Current Rule: Tom wiki allow<br>3) New Security Rule Intent Partially Met with Contradiction<br>  a) List of Security Rules in Current Policy that partially meet and partially contradict New Security Rule Intent<br>  b) E.g., Rule 1 Tom wiki deny<br>  c) Rule 10 group-engg wiki allow |

-continued

| Analysis Tool | Analysis using Current or New Policy | Inputs | Outputs |
|---|---|---|---|
| | | | 4) New Security Rule Intent Not Met with Partial Contradiction<br>   a) List of Security Rules in Current Policy that partially meet and partially contradict New Security Rule Intent<br>   b) E.g., Rule 1 Tom wiki deny<br>5) New Security Rule Intent Not Met with Full Contradiction<br>   a) List of Security Rules in Current Policy that fully contradict New Security Rule Intent<br>   b) E.g., Rule 1 group-engg wiki deny<br>6) New Security Rule Intent Not Met due to Default Deny<br>   a) Default Deny case. No other policy was hit<br>Also the snapshot time of the Current Policy |
| Shadow/ Contradiction/ 0 Hit Count on existing Policy Anomaly/ | Current Policy - Latest Policy Snapshot | 1. Security Policy (RN, MU, EP, CP)<br>2. Current Policy<br>3. Hit Count Period | Output is similar format as Incidents. For each Shadowee security rule (which matches an incident type) provide following:<br>  1. Alert Code (same list as the Incident, including disabled)<br>  2. Shadowee/Contradicted Details (similar to that in Incident)<br>  3. Shdower(s) Details (similar to that in the incident)<br>  4. Hit Count on Shadowee<br>  5. Hit Count on Shadower<br>For each security rule that is not shadowed but has hit count zero:<br>  1. Security Policy Rule Details<br>  2. Hit Count<br>Also the snapshot time of the Current Policy |
| Post Change Analysis | Current Policy - Latest Policy Snapshot | | |
| Shadow/ Contradiction on New Policy | New XML Policy (modeled on Panorama) | 1. Security Policy (RN, MU, EP, CP)<br>2. New Policy XML | Output is similar format as Incidents. For each Shadowee security rule (which matches an incident type) provide following:<br>  1. Alert Code (same list as the Incident, including disabled)<br>  2. Shadowee/Contradicted Details (similar to that in Incident)<br>  3. Shdower(s) Details (similar to that in the incident)<br>  4. Hit Count on Shadowee<br>  5. Hit Count on Shadower<br>Also the snapshot time of the Current Policy |

Example Report Formats Used in Various Embodiments

In the examples below, suppose "Tom" belongs to "group-barbara" and "Marie" belongs to "group-satish." Example choices for the Policy Layer include: (1) Prisma Access Shared Pre-Rule, (2) Prisma Access Shared Post-Rule, (3) Mobile Users Pre-Rule, (4) Mobile Users Post-Rule, (5) Remote Workforce (GlobalProtect), (6) Explicit Proxy, and (7) Remote Networks. Various example report formats (and/or excerpts thereof) are provided below. Example choices for the Security Policy include: (1) Mobile Users Remote Workforce (GlobalProtect), (2) Mobile Users Explicit Proxy, (3) Remote Networks.

New Rule Intent Satisfaction Analysis (New Rule with Allow Action)—Report

| Section - Report Summary | | This has summary results for all security intent analyzed | | | | |
|---|---|---|---|---|---|---|
| Content | Section Text: New Intent Satisfaction Analysis Summary<br>Policy Layer where "New Intent" Security Rules are intended:<br>Prisma Access Shared Pre-Rule (e.g., if PA)<br>NGFW DG1 Pre-Rule (e.g., if NGFW) | | | | | |
| | | | | Number of "New Intent" Security Rules with | | |
| | # | Security Policy | Intent Fully Met | Intent Partially Met | Intent Not Met | Total # of "New Intent" Security Rules analyzed |
| | 1 | Remote Networks | 2 | 3 | 2 | 7 |
| | 2 | Mobile Users Remote Workforce (GlobalProtect) | 1 | 3 | 5 | 1 |
| | 3 | Mobile Users Explicit Proxy | 3 | 2 | 2 | 7 |
| Section 1 Content | Each Security Policy has a section. It starts with a summary of results for that Security Policy.<br>Section Title: Security Policy : "Remote Networks"<br>Section Text: Summary of New Intent Satisfaction Analysis against "Remote Networks" | | | | | |
| | "New Intent" Security Rule | Intent Satisfaction Result | Aggregate Summary Count to increment | Mapping to UX Icon | | |
| | New-Rule-A | There are existing rules that fully meet your new rule intent and no higher order rules that contradict it | Intent Fully Met | Green check | | |
| | New-Rule-B | There are existing rules that fully meet your new rule intent but there are higher order rules that partially contradict it | Intent Partially Met | Orange Triangle with Exclamation | | |
| | New-Rule-C | There are existing rules that fully meet your new rule intent but there are higher order rules that fully contradict it | Intent Not Met | Red Circle with white Cross | | |
| | New-Rule-D | There are existing rules that partially meet your new rule intent (and no higher order rules that contradict it) | Intent Partially Met | Orange Triangle with Exclamation | | |
| | New-Rule-E | There are existing rules that partially meet your new rule intent but there are higher order rules that partially contradict it*<br>(There are two possible results here. One is intent partially met - when the rules at higher order partially contradicting new rule intent do not contradict all the rules at lower order partially meeting new rule intent. Other is not met - when the rules at higher order partially contradicting new rule intent fully contradict all the rules at lower order partially meeting new rule intent. These two results can be split or combined) | Intent Partially Met* | Orange Triangle with Exclamation | | |

| Section - Report Summary | | This has summary results for all security intent analyzed | | | |
|---|---|---|---|---|---|
| | New-Rule-F | There are existing rules that partially meet your new rule intent but there are higher order rules that fully contradict it | Intent Not Met | Red Circle with white Cross | |
| | New-Rule-G | There are no existing rules that meet your new rule intent but there are rules that partially contradict it | Intent Not Met | Orange Triangle with Exclamation | |
| | New-Rule-H | There are no existing rules that meet your new rule intent but there are rules that fully contradict it | Intent Not Met | Red Circle with white Cross | |
| | New-Rule-I | Your new rule intent is not met due to default deny (There are no existing rules that meet or contradict your new rule intent) | Intent Not Met | Red Circle with white Cross | |
| Section 1.1 | Example Sub Section per New Rule Intent for the Security Policy<br>Section Title: "New-Rule-A"<br>Section Text: SPECIFIED NEW SECURITY RULE INTENT | | | | |

| New Intent Rule Name | Policy Layer | Action | Source User | Application | . . . other Security Rule Fields |
|---|---|---|---|---|---|
| New-Rule-A | PA: Prisma Access Shared Pre-Rule NGFW: DG1 | Allow | Tom, Marie | wiki | <> |

INTENT SATISFACTION RESULT : There are existing rules that fully meet your new rule intent (and no higher order rules that contradict it). See results below:

| Satisfaction Status | Policy Layer | Existing Security Rule | Action | Source User | Application | . . . other Security Rule Fields |
|---|---|---|---|---|---|---|
| Meets New Rule Intent | PA: Remote Workforce NFGW: DG1 Pre-Rule | Existing-Rule-A | allow | group-barbara | wiki | |
| Meets New Rule Intent | PA: Prisma Access Shared Post-Rule NGFW: DG2 Post-Rule | Existing-Rule-B | allow | group-satish | wiki | |

| Section 1.2 | Suggested Next Steps:<br>There is no need to add your new rule "New-Rule-A" to your existing Security Policy since its intent is already met by existing policy rules<br>Sub Section per New Rule Intent for the Security Policy<br><br>Section Title: "New-Rule-A"<br>Section Text: SPECIFIED NEW SECURITY RULE INTENT |
|---|---|

| New Intent Rule Name | Policy Layer | Action | Source User | Application | . . . other Security Rule Fields |
|---|---|---|---|---|---|
| New-Rule-A | PA: Prisma Access Shared Pre-Rule NGFW: DG1 | Allow | Tom, Marie | wiki | <> |

INTENT SATISFACTION RESULT: There are existing rules that fully meet your new rule intent but there are higher order rules that partially contradict it
See results below:

-continued

| Section - Report Summary | | | This has summary results for all security intent analyzed | | | | |
|---|---|---|---|---|---|---|---|
| | Satisfaction Status | Existing Security Rule | | Policy Layer | Action | Source User | Application |
| | Contradicts New Security Rule Intent | Existing-Rule-D | | PA: Mobile Users Pre-Rule NGFW: DG1 Pre-Rule | deny | Tom | wiki |
| | Meets New Security Rule Intent | Existing-Rule-E | | PA: Remote Workforce (GlobalProtect) NGFW: Leaf-DG-A | allow | group-barbara | wiki |
| | Meets New Security Rule Intent | Existing-Rule-F | | PA: Mobile Users Post-Rule NGFW: DG1 Post-Rule | allow | group-satish | wiki |
| . . . | . . . | | | | | | |
| Section 1.9 | Sub Section per New Rule Intent for the Security Policy<br><br>Section Title: "New-Rule-A"<br>Section Text: SPECIFIED NEW SECURITY RULE INTENT | | | | | | |

| | New Intent Rule Name | Policy Layer | | Action | Source User | Application | . . . other Security Rule Fields |
|---|---|---|---|---|---|---|---|
| | New-Rule-A | PA: Prisma Access Shared Pre-Rule NGFW: DG1 | | Allow | Tom, Marie | wiki | <> |

INTENT SATISFACTION RESULT: Your new rule intent is not met due to default deny. There are no other existing rules that meet or contradict your new rule intent. See results below:

| | Satisfaction Status | Order # | Existing Security Rule | Action | Source User | Application | . . . other Security Rule Fields |
|---|---|---|---|---|---|---|---|
| | Contradicts New Rule Intent | 10 | Default Deny | deny | any | any | any |

Suggested Next Steps:
Below are some suggested options on change in existing Security Policy to meet your new rule intent:
Option 1) You can add your new rule intent at higher order than the existing security rules shown above that are contradicting it.

New Rule Intent Satisfaction Analysis (New Rule with Deny Action)—Report Excerpt

| | . . . | | . . . | | | |
|---|---|---|---|---|---|---|
| Section 1.1 | | Example Sub Section per New Rule Intent for the Security Policy<br>Section Title: "New-Rule-A"<br>Section Text: SPECIFIED NEW SECURITY RULE INTENT | | | | |
| | New Intent Rule Name | Policy Layer | Action | Source User | Application | . . . other Security Rule Fields |
| | New-Rule-A | PA: Prisma Access Shared Pre-Rule NGFW: DG1 | Deny | Tom, Marie | wiki | <> |
| | | INTENT SATISFACTION RESULT: There are existing rules that fully meet your new rule intent (and no higher order rules that contradict it). See results below: | | | | |
| | Satisfaction Status | Policy Layer | Existing Security Rule | Action | Source User | Application |

| | | | | | | |
|---|---|---|---|---|---|---|
| | Meets New Rule Intent | PA: Remote Workforce NFGW: DG1 Pre-Rule | Existing-Rule-A | deny | group-barbara | wiki |
| | Meets New Rule Intent | PA: Prisma Access Shared Post-Rule NGFW: DG2 Post-Rule | Existing-Rule-B | deny | group-satish | wiki |

Section 1.2      Example Sub Section per New Rule Intent for the Security Policy
Section Title: "New-Rule-A"
Section Text: SPECIFIED NEW SECURITY RULE INTENT

| New Intent Rule Name | Policy Layer | Action | Source User | Application | ... other Security Rule Fields |
|---|---|---|---|---|---|
| New-Rule-A | PA: Prisma Access Shared Pre-Rule NGFW: DG1 | Deny | Tom, Marie | wiki | <> |

INTENT SATISFACTION RESULT: There are existing rules that fully meet your new rule intent but there are higher order rules that partially contradict it. See results below:

| Satisfaction Status | Existing Security Rule | Policy Layer | Action | Source User | Application | ... other Security Rule Fields |
|---|---|---|---|---|---|---|
| Contradicts New Security Rule Intent | Existing-Rule-D | PA: Mobile Users Pre-Rule NGFW: DG1 Pre-Rule | allow | Tom | wiki | |
| Meets New Security Rule Intent | Existing-Rule-E | PA: Remote Workforce (GlobalProtect) NGFW: Leaf-DG-A | deny | group-barbara | wiki | |
| Meets New Security Rule Intent | Existing-Rule-F | PA: Mobile Users Post-Rule NGFW: DG1 Post-Rule | deny | group-satish | wiki | |

Suggested Next Steps:
Below are some suggested options on change in existing Security Policy to meet your new rule intent:
Option 1) You can remove the contradicting rules to satisfy your intent.
Note: Removal of rules should be carefully evaluated for overall security posture impact.
Option 2) You can add your new rule at a higher order than the existing rules shown above that are contradicting it
Note: Adding new rules can result in policy sprawl.

Section 1.3      Example Sub Section per New Rule Intent for the Security Policy
Section Title: "New-Rule-A"
Section Text: SPECIFIED NEW SECURITY RULE INTENT

| New Intent Rule Name | Policy Layer | Action | Source User | Application | ... other Security Rule Fields |
|---|---|---|---|---|---|
| New-Rule-A | PA: Prisma Access Shared Pre-Rule NGFW: DG1 | Deny | Tom, Marie | wiki | <> |

INTENT SATISFACTION RESULT: There are existing rules that fully meet your new rule intent but there are higher order rules that fully contradict it
See results below.

| Satisfaction Status | Existing Security Rule | Policy Layer | Action | Source User | Application | ... other Security Rule Fields |
|---|---|---|---|---|---|---|
| Contradicts New Rule Intent | Existing-Rule-A | PA: Remote Workforce (GlobalProtect) | allow | group-barbara | wiki | |
| Contradicts New Rule Intent | Existing-Rule-B | PA: Mobile Users Post-Rule | allow | group-satish | wiki | |
| Meets New Security Rule Intent | Existing-Rule-E | PA: Prisma Access Shared Pre-Rule NGFW: Leaf-DG-A | deny | Tom, Marie, Janice, group-mason | wiki | |

Suggested Next Steps:
Below are some suggested options on change in existing Security Policy to meet your new rule intent:
Option 1) You can remove all contradicting rules and then add your new rule to fully meet your intent
Note: Removal of rules should be carefully evaluated for overall security posture impact.
Option 2) You can change the action of all contradicting rules to that of your new intent rule to fully meet your new rule intent
Note: Change of action on existing rules should be carefully evaluated for overall security posture impact.
Option 3) You can add your new rule intent at higher order than the existing security rules shown above that are contradicting it
Note: Adding new rules can result in policy sprawl.

Section 1.4 — Example Sub Section per New Rule Intent for the Security Policy
Section Title: "New-Rule-A"
Section Text: SPECIFIED NEW SECURITY RULE INTENT

| New Intent Rule Name | Policy Layer | Action | Source User | Src Address | Dst Adress | Application | ... other Security Rule Fields |
|---|---|---|---|---|---|---|---|
| New-Rule-A | PA: Prisma Access Shared Pre-Rule NGFW: DG1 | Deny | Tom, Marie | | | wiki | <> |

INTENT SATISFACTION RESULT: There are existing rules that partially meet your new rule intent (and no higher order rules that contradict it). See results below:

| Satisfaction Status | Existing Security Rule | Policy Layer | Action | Source User | Src Addr | Dst Addr | Application |
|---|---|---|---|---|---|---|---|
| Partially Meets New Security Rule Intent | Existing-Rule-A | PA: Prisma Access Shared Post-Rule | deny | group-barbara | | | wiki |

. . .

Section 1.7 — Example Sub Section per New Rule Intent for the Security Policy
Section Title: "New-Rule-A"
Section Text: SPECIFIED NEW SECURITY RULE INTENT

| New Intent Rule Name | Policy Layer | Action | Source User | Application | ... other Security Rule Fields |
|---|---|---|---|---|---|
| New-Rule-A | PA: Prisma Access Shared Pre-Rule NGFW: DG1 | Deny | Tom, Marie | wiki | <> |

INTENT SATISFACTION RESULT: There are no existing rules that meet your new rule intent but there are rules that partially contradict it. See results below:

| Satisfaction Status | Existing Security Rule | Policy Layer | Action | Source User | Application |
|---|---|---|---|---|---|
| Partially Contradicts New Rule Intent | Existing-Rule-A | PA: Remote Workforce (GlobalProtect) | allow | group-barbara | wiki |

Section 1.8 — Example Sub Section per New Rule Intent for the Security Policy
Section Title: "New-Rule-A"
Section Text: SPECIFIED NEW SECURITY RULE INTENT

| New Intent Rule Name | Policy Layer | Action | Source User | Application | ... other Security Rule Fields |
|---|---|---|---|---|---|
| New-Rule-A | PA: Prisma Access Shared Pre-Rule NGFW: DG1 | Deny | Tom, Marie | wiki | <> |

INTENT SATISFACTION RESULT: There are no existing rules that meet your new rule intent but there are rules that fully contradict it. See results below.

| Satisfaction Status | Existing Security Rule | Policy Layer | Action | Source User | Application |
|---|---|---|---|---|---|
| Contradicts New Rule Intent | Existing-Rule-A | PA: Prisma Access Shared Post-Rule | allow | group-barbara | wiki |
| Contradicts New Rule Intent | Existing-Rule-B | PA: Mobile Users Post-Rule | allow | group-satish | wiki |

-continued

| Section 1.9 | | | Sub Section per New Rule Intent for the Security Policy Section Title: "New-Rule-A" Section Text: SPECIFIED NEW SECURITY RULE INTENT | | | | |
|---|---|---|---|---|---|---|---|
| | New Intent Rule Name | Policy Layer | Action | Source User | Application | | ... other Security Rule Fields |
| | New-Rule-A | PA: Prisma Access Shared Pre-Rule NGFW: DG1 | Deny | Tom, Marie | wiki | | <> |
| | | | INTENT SATISFACTION RESULT: Your new rule intent is fully met due to default deny There are no other existing rules that meet or contradict your new rule intent. See results below: | | | | |
| | Satisfaction Status | Order # | Existing Security Rule | Action | Source User | Application | ... other Security Rule Fields |
| | Meets New Security Rule Intent | 10 | Default Deny | deny | any | any | any |
| | | | Suggested Next Steps: There is no need to add your new rule "New-Rule-A" to your existing Security Policy since it's intent is already met by the default deny. | | | | |

Security Policy Anomaly/(BPA)/Hit Count Analysis—Report

| Section - Report Summary Content | | This has summary results for all security policies analyzed | | | | | |
|---|---|---|---|---|---|---|---|
| | | | Section Text: Analysis Summary | | | | |
| | # | Security Policy | # Policy Anomalies | | | #Policies | # |
| | | | Shadow Anomaly Rules | Redundant Anomaly Rules | Generalized Anomaly Rules | with no Hit Count Change in last <X> days | Failed BPA Checks |
| | 1 | Remote Network | 1 | 0 | 0 | 1 | 3 |
| | 2 | Mobile Users Remote Workforce (GlobalProtect) | 2 | 4 | 2 | 1 | 4 |
| | 3 | Mobile Users Explicit Proxy | | | 4 | 10 | 5 |
| Section 1 | | Each Security Policy has a section. It starts with a summary of results for that Security Policy. | | | | | |

| Content | | Section Title: Security Policy: "Remote Networks" Section Text: Summary of Security Policy Anomalies in "Remote Networks" | | | |
|---|---|---|---|---|---|
| | # | Anomaly | Covered Security Rule | Incident ID | Incident Severity |
| | 1 | "Redundant Policy: Allow security rule is covered by a higher order allow security rule" | Existing-Rule-A | uuid-11- ... | |
| | 2 | "Redundant Policy: Block security rule is covered by a higher order block security rule" | Existing-Rule-B | uuid-22- ... | |
| | 3 | "Shadowed Policy: Allow security rule is covered by a higher order block security rule" | Existing-Rule-C | uuid-33- ... | |
| | 4 | "Shadowed Policy: Block security rule is covered by a higher order allow security rule" | Existing-Rule-D | uuid- | |
| | 5 | "Redundant Policy: Allow security rule is covered by a lower order allow security rule" | Existing-Rule-E | uuid- | |
| | 6 | "Redundant Policy: Block security rule is covered by a lower order block security rule" | Existing-Rule-F | uuid- | |
| | 7 | "Generalized Policy: Allow security rule is covered by a lower order block security rule" | Existing-Rule-G | uuid- | |

-continued

| | 8 | "Generalized Policy: Block security rule is covered by a lower order allow security rule" | Existing-Rule-H | uuid- |
|---|---|---|---|---|

Summary on Security Policy Rules with No Hit Count Change in last <X> Days in "Remote Networks"

| Security Rule | Hit Count Change in last <X> Days |
|---|---|
| Rule-K | 0 |
| Rule-L | 0 |
| Rule-M | 0 |

| Section 1.1 | Example Sub Section for Security Policy Anomalies |
|---|---|
| Section 1.1.1 Content | Example Sub Sub Section Per Covered Security Rule which has anomaly, with rule details |

Section Title: Security Rule: "Existing-Rule-A"
Section Text: Anomaly: "Redundant Policy: Allow security rule is covered by a higher order allow security rule"

| Type | Rule Order | Rule Name | Policy Layer | Hit Count Change in last <X> Days | Action | Source Zone | Source User |
|---|---|---|---|---|---|---|---|
| Covering Rule | Higher | Existing-Rule-P | PA: Prisma Access Shared Pre-Rule NGFW: DG2 | 100 | Allow | zone 2 | group-barbara |
| Covered Rule | Lower | Existing-Rule-A | PA: Prisma Access Shared Post-Rule NGFW: DG1 | 0 | Allow | zone 1 | Tom |

| Section 1.1.2 Content | Example Sub Sub Section Per Covered Security Rule which has anomaly, with rule details |
|---|---|

Section Title: Security Rule: "Existing-Rule-B"
Section Text: Anomaly: "Redundant Policy: Block security rule is covered by a higher order block security rule"

| Type | Rule Order | Rule Name | Policy Layer | Hit Count Change in last <X> Days | Action | Source Zone | Source User |
|---|---|---|---|---|---|---|---|
| Covering Rule | Higher | Existing-Rule-Q | PA: Mobile Users Pre-Rule NGFW: DG2 | 100 | Deny | zone 2 | group-satish |
| Covered Rule | Lower | Existing-Rule-B | PA: Prisma Access Shared Post-Rule NGFW: DG1 | 10 | Deny | zone 1 | Marie |

| Section 1.1.3 Content | Sub Sub Section Per Covered Security Rule which has anomaly, with rule details |
|---|---|

Section Title: Security Rule: "Existing-Rule-C"
Section Text: Anomaly: "Shadowed Policy: Allow security rule is covered by a higher order block security rule"

| Type | Rule Order | Rule Name | Policy Layer | Hit Count Change in last <X> Days | Action | Source Zone | Source User |
|---|---|---|---|---|---|---|---|
| Covering Rule | Higher | Existing-Rule-R | PA: Mobile Users Pre-Rule NGFW: DG2 | 100 | Deny | zone 2 | group-barbara |
| Covered Rule | Lower | Existing-Rule-C | PA: Remote Workforce (GlobalProtect) NGFW: DG1 | 10 | Allow | zone 1 | Tom |

| Section 1.1.4 Content | Sub Sub Section Per Covered Security Rule which has anomaly, with rule details | | | | | | | |
|---|---|---|---|---|---|---|---|---|
| | Section Title: Security Rule: "Existing-Rule-D" | | | | | | | |
| | Section Text: Anomaly: "Shadowed Policy: Block security rule is covered by a higher order allow security rule" | | | | | | | |
| | Type | Rule Order | Rule Name | Policy Layer | Hit Count Change in last <X> Days | Action | Source Zone | Source User |
| | Covering Rule | Higher | Existing-Rule-S | PA: Prisma Access Shared Pre-Rule NGFW: DG2 | 100 | Allow | zone 2 | group-satish |
| | Covered Rule | Lower | Existing-Rule-D | PA: Prisma Access Shared Pre-Rule NGFW: DG1 | 10 | Deny | zone 1 | Marie |
| Section 1.1.5 Content | Sub Sub Section Per Covered Security Rule which has anomaly, with rule details | | | | | | | |
| | Section Title: Security Rule: "Existing-Rule-E" | | | | | | | |
| | Section Text: Anomaly: "Redundant Policy: Allow security rule is covered by a lower order allow security rule" | | | | | | | |
| | Type | Rule Order | Rule Name | Policy Layer | Hit Count Change in last <X> Days | Action | Source Zone | Source User |
| | Covered Rule | Higher | Existing-Rule-E | PA: Prisma Access Shared Post-Rule NGFW: DG1 | 10 | Allow | zone 1 | Tom |
| | Covering Rule | Lower | Existing-Rule-T | PA: Prisma Access Shared Post-Rule NGFW: DG2 | 100 | Allow | zone 2 | group-barbara |
| Section 1.1.6 Content | Example Sub Sub Section Per Covered Security rule which has anomaly, with rule details | | | | | | | |
| | Section Title: Security Rule: "Existing-Rule-F" | | | | | | | |
| | Section Text: Anomaly: "Redundant Policy: Block security rule is covered by a lower order block security rule" | | | | | | | |
| | Type | Rule Order | Rule Name | Policy Layer | Hit Count Change in last <X> Days | Action | Source Zone | Source User |
| | Covered Rule | Higher | Existing-Rule-F | PA: Remote Workforce (Global Protect) NGFW: DG1 | 10 | Deny | zone 1 | Marie |
| | Covering Rule | Lower | Existing-Rule-U | PA: Mobile Users Post-Rule NGFW: DG2 | 100 | Deny | zone 2 | group-satish |
| Section 1.1.7 Content | Sub Sub Section Per Covered Security Rule which has anomaly, with rule details | | | | | | | |
| | Section Title: Security Rule: "Existing-Rule-G" | | | | | | | |
| | Section Text: Anomaly: "Generalized Policy: Allow security rule is covered by a lower order block security rule" | | | | | | | |
| | Type | Rule Order | Rule Name | Policy Layer | Hit Count Change in last <X> Days | Action | Source Zone | Source User |
| | Covered Rule | Higher | Existing-Rule-H | PA: Mobile Users Post-Rule NGFW: DG1 | 10 | Allow | zone 1 | Tom |

| | Type | Rule Order | Rule Name | Policy Layer | Hit Count Change in last <X> Days | Action | Source Zone | Source User |
|---|---|---|---|---|---|---|---|---|
| | Covering Rule | Lower | Existing-Rule-V | PA: Prisma Access Shared Post-Rule NGFW: DG2 | 100 | Deny | zone 2 | group-barbara |
| Section 1.1.8 Content | colspan | | | | | | | |

Example Sub Sub Section Per Covered Security Rule which has anomaly, with rule details Section Title: Security Rule: "Existing-Rule-H"

Section Text: Anomaly: "Generalized Policy: Block security rule is covered by a lower order allow security rule"

| | Type | Rule Order | Rule Name | Policy Layer | Hit Count Change in last <X> Days | Action | Source Zone | Source User |
|---|---|---|---|---|---|---|---|---|
| | Covered Rule | Higher | Existing-Rule-D | PA: Prisma Access Shared Pre-Rule NGFW: DG1 | 10 | Deny | zone 1 | Marie |
| | Covering Rule | Lower | Existing-Rule-Workforce | PA: Prisma Access Shared Pre-Rule NGFW: DG2 | 100 | Allow | zone 2 | group-satish |

Section 1.2 Example Sub Section for Rules With No Hit Count Change in <X> days

Section Title: Security Policy Rules with No Hit Count Change in <X> Days

| Type | Rule Name | Policy Layer | Hit Count Change in last <X> Days | Action | Source Zone | Source User |
|---|---|---|---|---|---|---|
| Covered by Higher Order Rule (this is a hyperlink to the anomaly section above for this rule) | Existing-Rule-K | PA: Prisma Access Shared Pre-Rule NGFW: DG1 | 0 | Allow | zone 1 | Jason |
| Covered by Lower Order Rule (this is a hyperlink to the anomaly section above for this rule) | Existing-Rule-L | PA: Prisma Access Shared Post-Rule NGFW: DG2 | 0 | Allow | zone 2 | group-mohit |
| Not Covered by Higher or Lower Order Rule | Existing-Rule-L | PA: Remote Workforce (Global Protect) NGFW: DG3 | 0 | Deny | zone 3 | group-candice |

Incident Resolution Analysis—Report

| | | | | | | |
|---|---|---|---|---|---|---|
| Analysis Report Policy Sandbox Info Common Header | colspan: Common Header for any analysis that uses a Policy Sandbox | | | | | |
| Section 1 | colspan: Policy Sandbox Name: <text><br>Policy Sandbox Description: <text><br>Policy Sandbox Owner: <User Full Name and Id - Id is either user id in Fawkes or email id in Fawkes for the user><br>Policy Sandbox Snapshot Time used: <TIme with TIme Zone><br>This has summary results for all the incidents analyzed<br>Section Title: Security Policy Incident Resolution Report<br>Section Text: Incident Resolution Analysis Summary<br>Policy Sandbox Name: <text> | | | | | |
| # | Incident Sub-Category | Incident | Incident Id | Incident State (as of Report Generation Time <time>) | Security Policy in Incident | Will Incident be resolved by Policy Sandbox |
| | Security Policy | Redundant Policy: Allow security rule "<name>" is covered by a higher order allow security rule "<name>" | INC-0193500 | | Remote Networks | Will be resolved |
| | Security Policy | Shadowed Policy: Allow security rule is "<name>" covered by a higher order block security rule "<name>" | INC-0194123 | | Remote Workforce (Global Protect) | Will not be resolved |
| | Security Policy | Generalized Policy: Block security rule "<name>" is covered by a lower order allow security rule "<name>" | INC-0193949 | | Explicit Proxy | Will be resolved |
| Section 1.1 Content | colspan: Sub Section for Security Policy Anomalies | | | | | |
| Section 1.1.1 Content | colspan: Section Title: Security Policy Anomaly Details<br>Example Sub Sub Section Per Covered Security Rule which has anomaly, with rule details<br>Section Title: Anomaly: "Redundant Policy: Allow security rule is covered by a higher order allow security rule" | | | | | |

| | Incident | Incident ID | Security Policy | W | | | | |
|---|---|---|---|---|---|---|---|---|
| | | | | Will be resolved | | | | |
| | | | | Will not be resolved | | | | |
| | Type | Rule Order | Rule Name | Policy Layer | Hit Count Change In last <X> Days | Action | Source Zone | Source User |
| | Covering Rule | Higher | Existing-Rule-P | PA: Prisma Access Shared Pre-Rule NGFW: DG2 | 100 | Allow | zone 2 | group-barbara |
| | Covered Rule | Lower | Existing-Rule-A | PA: Prisma Access Shared Post-Rule NGFW: DG1 | 10 | Allow | zone 1 | Tom |

| Section 1.1.2 Content | Sub Sub Section Per Covered Security Rule which has anomaly, with rule details | | | | | | | |
|---|---|---|---|---|---|---|---|---|
| | Section Title: Security Rule: "Existing-Rule-B" Section Text: Anomaly: "Redundant Policy: Block security rule is covered by a higher order block security rule" | | | | | | | |
| | Type | Rule Order | Rule Name | Policy Layer | Hit Count Change in last <X> Days | Action | Source Zone | Source User |
| | Covering Rule | Higher | Existing-Rule-Q | PA: Mobile Users Pre-Rule NGFW: DG2 | 100 | Deny | zone 2 | group-satish |
| | Covered Rule | Lower | Existing-Rule-B | PA: Prisma Access Shared Post-Rule NGFW: DG1 | 10 | Deny | zone 1 | Marie |
| Section 1.1.3 Content | Sub Sub Section Per Covered Security Rule which has anomaly, with rule details | | | | | | | |
| | Section Title: Security Rule: "Existing-Rule-C" Section Text: Anomaly: "Shadowed Policy: Allow security rule is covered by a higher order block security rule" | | | | | | | |
| | Type | Rule Order | Rule Name | Policy Layer | Hit Count Change in last <X> Days | Action | Source Zone | Source User |
| | Covering Rule | Higher | Existing-Rule-R | PA: Mobile Users Pre-Rule NGFW: DG2 | 100 | Deny | zone 2 | group-barbara |
| | Covered Rule | Lower | Existing-Rule-C | PA: Remote Workforce (GlobalProtect) NGFW: DG1 | 10 | Allow | zone 1 | Tom |
| Section 1.1.4 Content | Sub Sub Section Per Covered Security Rule which has anomaly, with rule details | | | | | | | |
| | Section Title: Security Rule: "Existing-Rule-D" Section Text: Anomaly: "Shadowed Policy: Block security rule is covered by a higher order allow security rule" | | | | | | | |
| | Type | Rule Order | Rule Name | Policy Layer | Hit Count Change in last <X> Days | Action | Source Zone | Source User |
| | Covering Rule | Higher | Existing-Rule-S | PA: Prisma Access Shared Pre-Rule NGFW: DG2 | 100 | Allow | zone 2 | group-satish |
| | Covered Rule | Lower | Existing-Rule-D | PA: Prisma Access Shared Pre-Rule NGFW: DG1 | 10 | Deny | zone 1 | Marie |
| Section 1.1.5 Content | Sub Sub Section Per Covered Security Rule which has anomaly, with rule details | | | | | | | |
| | Section Title: Security Rule: "Existing-Rule-E" Section Text: Anomaly: "Redundant Policy: Allow security rule is covered by a lower order allow security rule" | | | | | | | |
| | Type | Rule Order | Rule Name | Policy Layer | Hit Count Change in last <X> Days | Action | Source Zone | Source User |
| | Covered Rule | Higher | Existing-Rule-E | PA: Prisma Access Shared Post-Rule NGFW: DG1 | 10 | Allow | zone 1 | Tom |

|  |  |  |  |  |  |  |  |  |
|---|---|---|---|---|---|---|---|---|
|  | Covering Rule | Lower | Existing-Rule-T | PA: Prisma Access Shared Post-Rule NGFW: DG2 | 100 | Allow | zone 2 | group-barbara |

Suggested Next Steps:
Below are some suggested options on changes in existing Security Policy to resolve the anomaly:
Option 1) If you wanted traffic matching the covered rule to be allowed with the same security inspection as the covering rule then the covered rule is redundant. Consider following changes
Step a) Remove the covered rule to reduce policy sprawl
Option 2) If wanted traffic matching covered rule to have a different security inspection versus traffic matching the covering rule then consider following changes
a) Change the security profile field in the covered rule to reflect inspections of interest
Note: Changes to security policy should be carefully evaluated for overall security posture impact. Especially consider impact if the policy layers of the two rules are different.

| Section | | | | | | | | |
|---|---|---|---|---|---|---|---|---|
| 1.1.6 Content | Sub Sub Section Per Covered Security Rule which has anomaly, with rule details | | | | | | | |
|  | Section Title: Security Rule: "Existing-Rule-F" | | | | | | | |
|  | Section Text: Anomaly: "Redundant Policy: Block security rule is covered by a lower order block security rule" | | | | | | | |
|  | Type | Rule Order | Rule Name | Policy Layer | Hit Count Change in last <X> Days | Action | Source Zone | Source User |
|  | Covered Rule | Higher | Existing-Rule-F | PA: Remote Workforce (Global Protect) NGFW: DG1 | 10 | Deny | zone 1 | Marie |
|  | Covering Rule | Lower | Existing-Rule-U | PA: Mobile Users Post-Rule NGFW: DG2 | 100 | Deny | zone 2 | group-satish |
| 1.1.7 Content | Sub Sub Section Per Covered Security Rule which has anomaly, with rule details | | | | | | | |
|  | Section Title: Security Rule: "Existing-Rule-G" | | | | | | | |
|  | Section Text: Anomaly: "Generalized Policy: Allow security rule is covered by a lower order block security rule" | | | | | | | |
|  | Type | Rule Order | Rule Name | Policy Layer | Hit Count Change in last <X> Days | Action | Source Zone | Source User |
|  | Covered Rule | Higher | Existing-Rule-H | PA: Mobile Users Post-Rule NGFW: DG1 | 10 | Allow | zone 1 | Tom |
|  | Covering Rule | Lower | Existing-Rule-V | PA: Prisma Access Shared Post-Rule NGFW: DG2 | 100 | Deny | zone 2 | group-barbara |
| 1.1.8 Content | Sub Sub Section Per Covered Security Rule which has anomaly, with rule details | | | | | | | |
|  | Section Title: Security Rule: "Existing-Rule-H" | | | | | | | |
|  | Section Text: Anomaly: "Generalized Policy: Block security rule is covered by a lower order allow security rule" | | | | | | | |
|  | Type | Rule Order | Rule Name | Policy Layer | Hit Count Change in last <X> Days | Action | Source Zone | Source User |
|  | Covered Rule | Higher | Existing-Rule-D | PA: Prisma Access Shared Pre-Rule NGFW: DG1 | 10 | Deny | zone 1 | Marie |

-continued

| | | | | | | | |
|---|---|---|---|---|---|---|---|
| | Covering Rule | Lower | Existing-Rule-W | PA: Prisma Access Shared Pre-Rule NGFW: DG2 | 100 | Allow | zone 2 | group-satish |
| Section 1.2 | | | Sub Section for Rules With No Hit Count Change in <X> days | | | | | |
| | | | Section Title: Security Policy Rules with No Hit Count Change in <X> Days | | | | | |
| | Type | Rule Name | Policy Layer | Hit Count Change in last <X> Days | Action | Source Zone | Source User |
| | Covered by Higher Order Rule (this is a hyperlink to the anomaly section above for this rule) | Existing-Rule-K | PA: Prisma Access Shared Pre-Rule NGFW: DG1 | 0 | Allow | zone 1 | Jason |
| | Covered by Lower Order Rule (this is a hyperlink to the anomaly section above for this rule) | Existing-Rule-L | PA: Prisma Access Shared Post-Rule NGFW: DG2 | 0 | Allow | zone 2 | group-mohit |
| | Not Covered by Higher or Lower Order Rule | Existing-Rule-L | PA: Remote Workforce (Global Protect) NGFW: DG3 | 0 | Deny | zone 3 | group-candice |

Policy Anomalies—User Group Based Incidents with Examples

FIG. 28 illustrates examples of user group based incidents.

Figure 29:
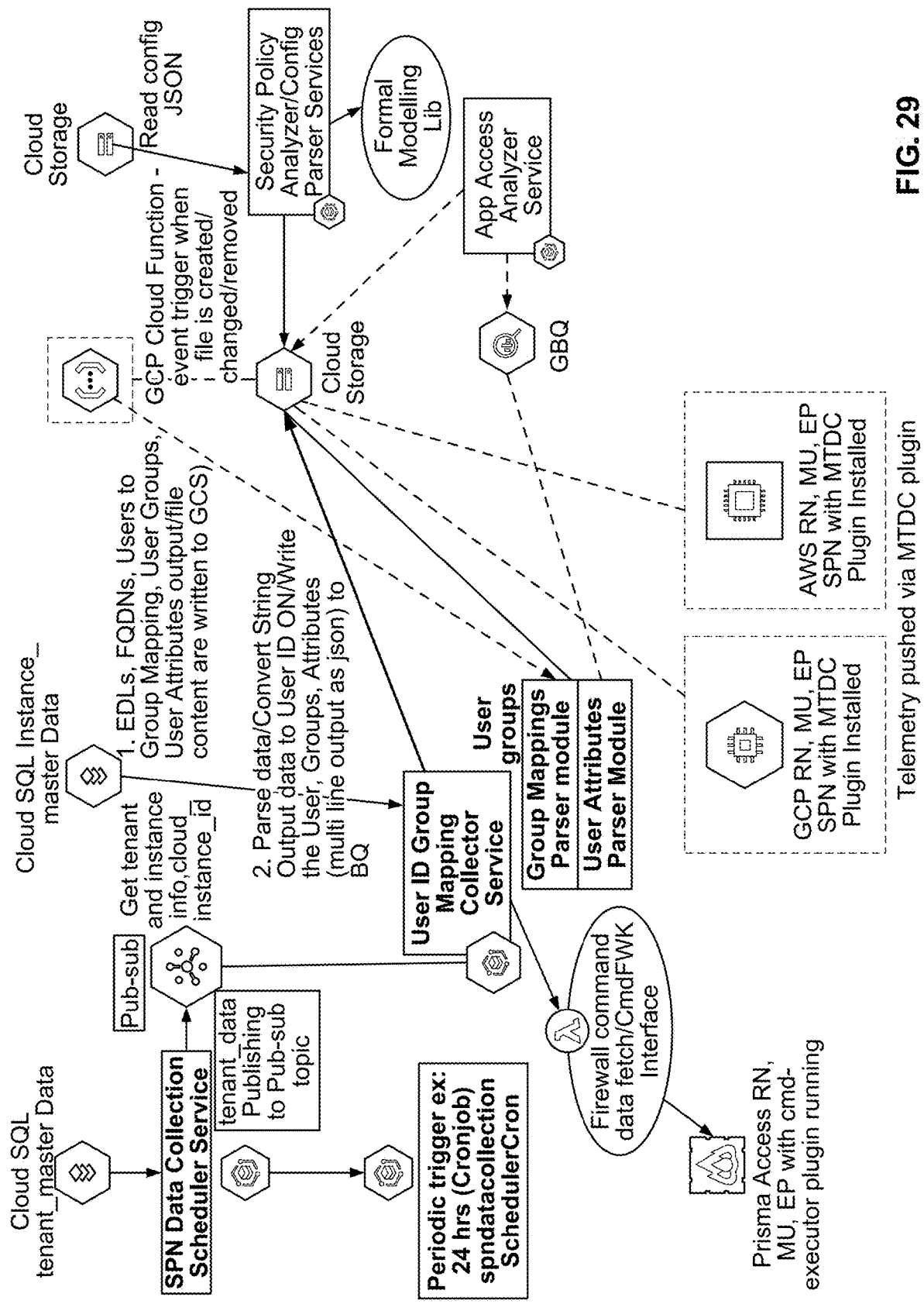
FIG. 29 illustrates an example architecture.

SPN Data Collection Scheduler, Processing Service: EDLs, FQDNs, User ID to Groups Mapping Data Collection and Parsing/Processing An example security policy analyzer service powered by Formal modeling needs Firewall Operational State information including: (1) Exhaustive user-to-group mapping information (necessary for full fidelity formal modeling of the security policy) and (2) Exhaustive user-to-persona mapping information (necessary for full fidelity formal modeling of the security policy). An example implementation is as follows:

A GKE Micro service, "user to Groups mapping collector service," collects the user to group mapping info. FIG. 29 illustrates an example architecture of a user to group mapping collector service. The Scheduler/Dispatcher fetches the total SPNs list (1 RN, MU, EP cloud_instance_ids) for each tenant (periodic trigger service (24 or 48 hrs)) and distributes it to a Process Pool for parallel execution of the worker process collecting User groups and User Attributes. For on-demand requests, an option for on-demand fetch of UserGroups is provided via pubsub notification message. The Collector Service retrieves the user groups, user id to groups mapping, user to persona mapping using the firewall data fetch library. The command output/file output is stored to GCS storage. For large command outputs, the console output can be redirected to a file which is available on the firewall. For larger command outputs (e.g., 100 k user group mapping entries/800 k user-attribute records) a cmd-executor plugin/lib can be used to collect the cmd output dump file so cmdfwk API interface can export the output/dump file to GCS bucket. A parser module is used for user-groups/attributes data. The data can be converted (e.g., from a string or XML) to JSON. The data is normalized for consumption by AIOPS services, such as the Security Policy Analyzer Service (which can perform core formal modeling and intent satisfaction analysis) and App Access Analyzer (which can show a list of user groups allowed to access applications) for the above use cases.

Figure 30:
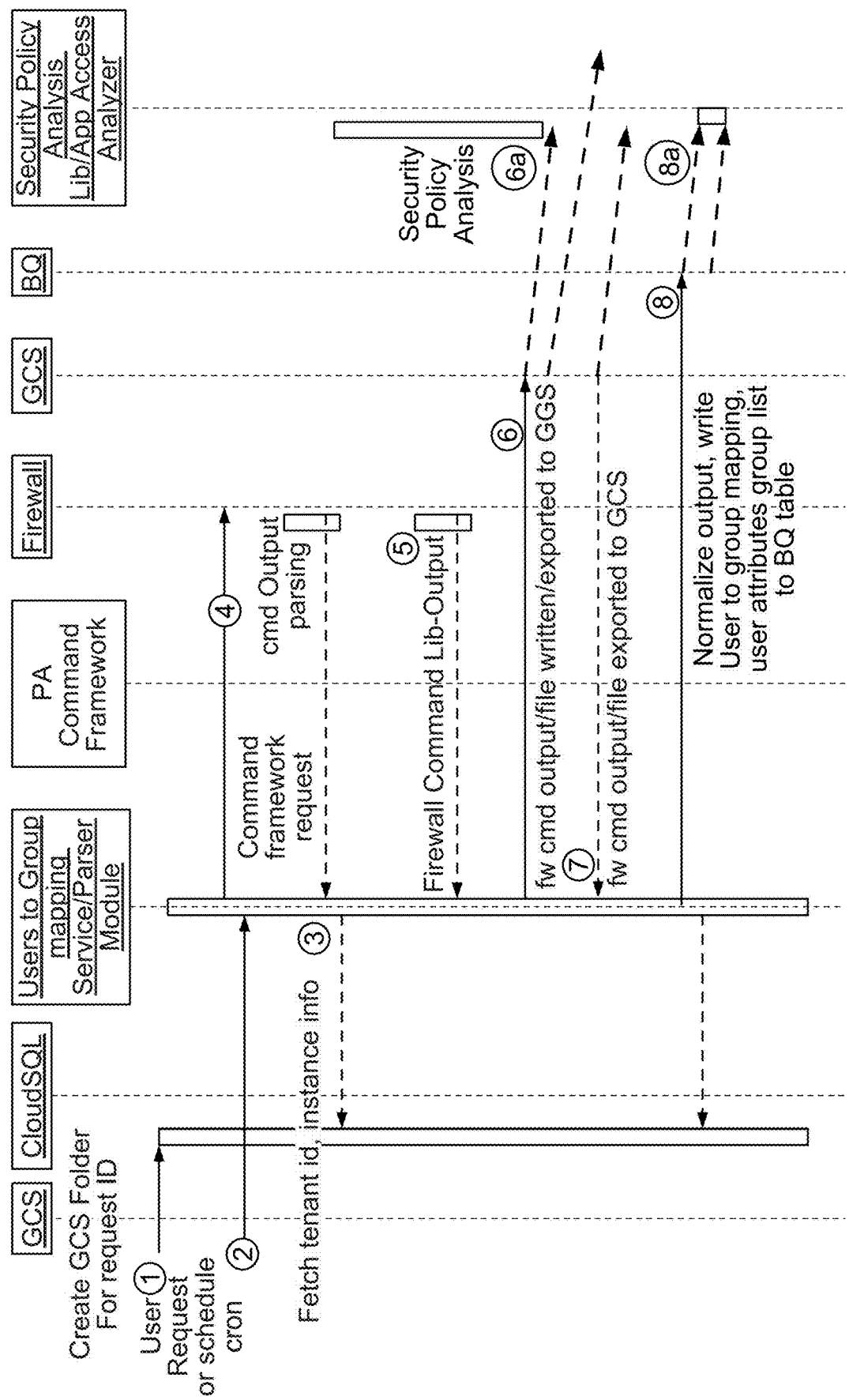
FIG. 30 illustrates an example communication diagram associated with a user to group mapping collector service.

FIG. 30 illustrates an example communication diagram associated with a user to group mapping collector service. A variety of approaches can be used to learn group mappings. A first approach is to use direct communication with on-premise Active Directory services. Information such as LDAP Server configuration and Group-Mapping configuration is used. In order to fetch the Group-Mapping information, in some embodiments, cloud firewalls poll the on-premise Active Directory services and use their existing bandwidth. For any firewalls which are geographically far away, there may be network latency. An include list can be used in Group-Mapping to avoid firewalls from learning all the groups and users on the Active Directory services. A second approach is to use a Directory Sync Proxy (a cloud service) or similar service which stores Group-Mapping information from either on premise or Azure Active Directory. This is a multi-tenant proxy service between RN/MU cloud firewalls and a Directory Sync Service. No LDAP server configuration or Group-Mapping configuration information is needed in this approach. Instead, the Directory Sync Proxy polls the Directory Sync Service and learns the user/group information of only the users/groups in a Panorama template configuration. Also involved is a master device—the firewall from which Panorama (or another service) receives usernames, user group names, and username-to-group mapping information. The master device can be used to automatically populate usernames and user groups.

Example User Interfaces

Figure 31A:

FIGS. 31A-31B illustrate portions of an incident resolution analysis report.

Figure 32:
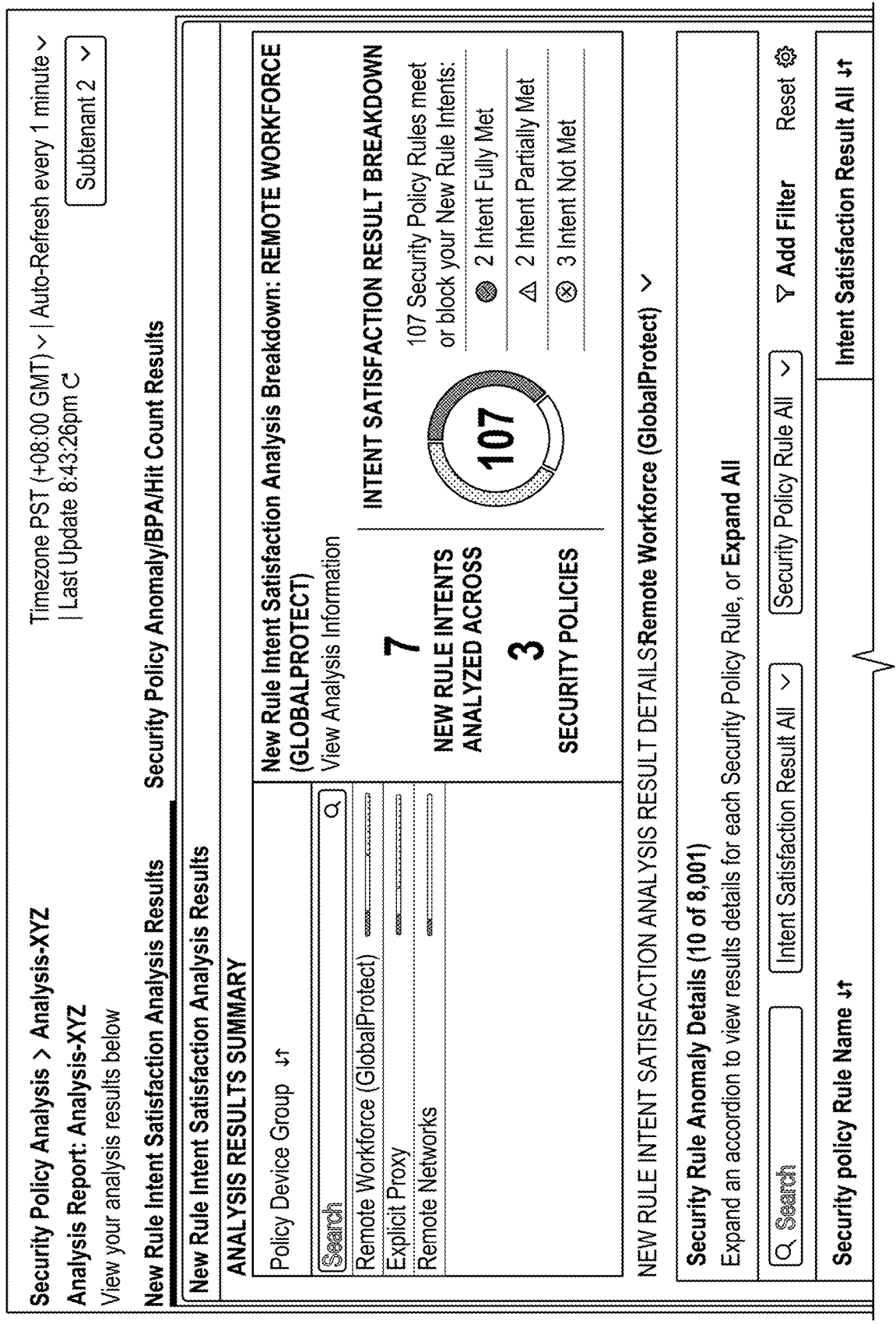
FIG. 32 illustrates an example of a new rule intent satisfaction analysis report.

FIG. 32 illustrates an example of a new rule intent satisfaction analysis report.

FIG. 33 illustrates detail on various portions of the report shown in FIG. 32.

Figure 34A:
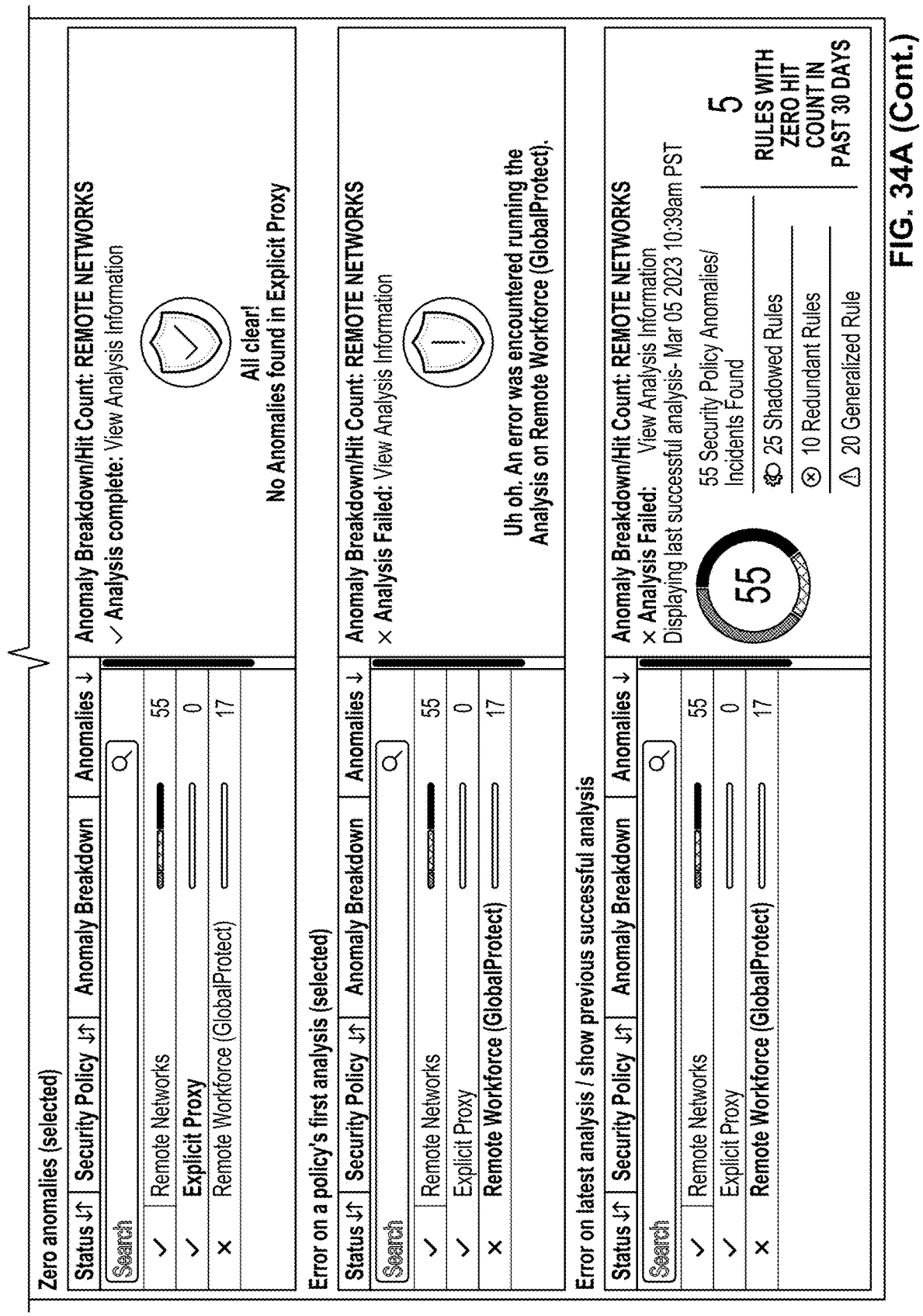
FIGS. 34A-34B illustrate examples of breakdown cards.
Figure 34B:
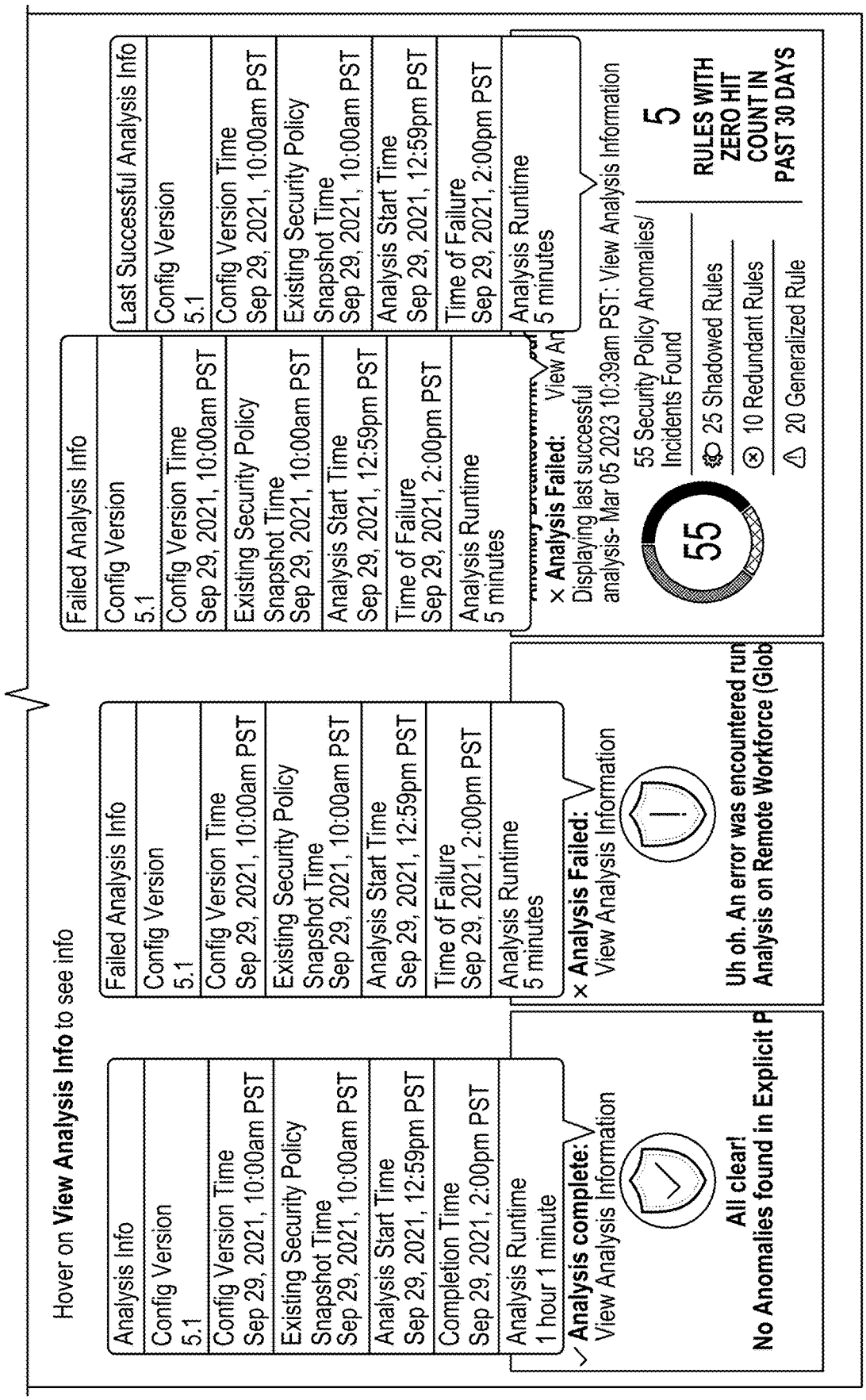

FIGS. 34A-34B illustrate examples of breakdown cards.

FIG. 35 illustrates an example of a portion of a security policy anomaly/hit count result report.

FIGS. 36A-36C illustrate various aspects of security policy incident reports.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive configuration information, including at least one policy, associated with a live production security appliance;
      use the received configuration information to instantiate the at least one policy in a sandbox environment;
      build a model using the received configuration information;
      receive a refresh request with respect to the live production security appliance;
      use the sandbox environment to evaluate a proposed change to the configuration information, including by identifying a difference between a current policy set deployed on the live production security appliance and the instantiated at least one policy in the sandbox environment; and
      provide a result of the evaluation as output; and
   a non-transitory memory coupled to the processor and configured to provide the processor with instructions.

2. The system of claim 1, wherein at least some of the configuration information comprises live state information extracted from the live production security appliance.

3. The system of claim 1, wherein evaluating the proposed change includes determining whether a new anomaly is created as a result of implementing the proposed change.

4. The system of claim 1, wherein the processor is further configured to implement the proposed change and perform a re-evaluation.

5. The system of claim 1, wherein the at least one policy is instantiated in the sandbox environment in response to an incident resolution analysis.

6. The system of claim 1, wherein the processor is further configured to receive a list comprising one or more incidents.

7. The system of claim 6, wherein the processor is further configured to determine whether one or more items on the list are resolved within the sandbox environment.

8. The system of claim 1, wherein the difference is an addition of a rule to the live production security appliance, and wherein the processor is configured to add a copy of the rule to the sandbox environment.

9. The system of claim 1, wherein the difference is a deletion of a rule in the live production security appliance, and wherein the processor is configured to delete a copy of the rule in the sandbox environment.

10. The system of claim 1, wherein the difference is a change to a rule on the live production security appliance, and wherein the processor is further configured to determine whether making the change in the sandbox environment would result in a rule conflict.

11. The system of claim 10, wherein the processor is configured to prompt a user for a resolution of a determined rule conflict.

12. A method, comprising:
   receiving configuration information, including at least one policy, associated with a live production security appliance;
   using the received configuration information to instantiate the at least one policy in a sandbox environment;
   building a model using the received configuration information;
   receiving a refresh request with respect to the live production security appliance;
   using the sandbox environment to evaluate a proposed change to the configuration information, including by identifying a difference between a current policy set deployed on the live production security appliance and the instantiated at least one policy in the sandbox environment; and
   providing a result of the evaluation as output.

13. The method of claim 12, wherein at least some of the configuration information comprises live state information extracted from the live production security appliance.

14. The method of claim 12, wherein evaluating the proposed change includes determining whether a new anomaly is created as a result of implementing the proposed change.

15. The method of claim 12, further comprising implementing the proposed change and performing a re-evaluation.

16. The method of claim 12, wherein the at least one policy is instantiated in the sandbox environment in response to an incident resolution analysis.

17. The method of claim 12, further comprising receiving a list comprising one or more incidents.

18. The method of claim 17, further comprising determining whether one or more items on the list are resolved within the sandbox environment.

19. The method of claim 12, wherein the difference is an addition of a rule to the live production security appliance, and wherein the processor is configured to add a copy of the rule to the sandbox environment.

20. The method of claim 12, wherein the difference is a deletion of a rule in the live production security appliance, and wherein the processor is configured to delete a copy of the rule in the sandbox environment.

21. The method of claim 12, wherein the difference is a change to a rule on the live production security appliance, and wherein the processor is further configured to determine whether making the change in the sandbox environment would result in a rule conflict.

22. The method of claim 21, further comprising prompting a user for a resolution of a determined rule conflict.

23. A computer program product embodied in a non-transitory computer readable medium and comprising computer instructions for:
   receiving configuration information, including at least one policy, associated with a live production security appliance;
   using the received configuration information to instantiate the at least one policy in a sandbox environment;
   building a model using the received configuration information;

receiving a refresh request with respect to the live production security appliance;

using the sandbox environment to evaluate a proposed change to the configuration information, including by identifying a difference between a current policy set deployed on the live production security appliance and the instantiated the at least one policy in the sandbox environment; and providing a result of the evaluation as output.

* * * * *